United States Patent
Morita et al.

(10) Patent No.: US 7,872,447 B2
(45) Date of Patent: Jan. 18, 2011

(54) ELECTRICAL STORAGE APPARATUS FOR USE IN AUXILIARY POWER SUPPLY SUPPLYING ELECTRIC POWER FROM ELECTRIC STORAGE DEVICE UPON VOLTAGE DROP OF MAIN POWER SUPPLY

(75) Inventors: Kazuki Morita, Osaka (JP); Hideaki Hamai, Kyoto (JP); Yohsuke Mitani, Osaka (JP)

(73) Assignee: Panasonic Corporation, Osaka (JP)

( * ) Notice: Subject to any disclaimer, the term of this patent is extended or adjusted under 35 U.S.C. 154(b) by 577 days.

(21) Appl. No.: 11/963,422

(22) Filed: Dec. 21, 2007

(65) Prior Publication Data

US 2008/0150483 A1    Jun. 26, 2008

(30) Foreign Application Priority Data

Dec. 25, 2006   (JP)   ............................. 2006-347135
Aug. 8, 2007    (JP)   ............................. 2007-206550

(51) Int. Cl.
  *H02J 7/00*   (2006.01)
  *H02J 3/32*   (2006.01)
  *H02H 3/00*   (2006.01)

(52) U.S. Cl. ....................... 320/122; 320/119; 320/166; 307/48; 307/49; 361/67; 361/68; 361/79

(58) Field of Classification Search ................. 320/122
See application file for complete search history.

(56) References Cited

U.S. PATENT DOCUMENTS

| 5,959,368 | A  | * | 9/1999 | Kubo et al. | .................... 307/18 |
| 6,351,100 | B1 | * | 2/2002 | Altham | ....................... 320/135 |
| 6,373,225 | B1 | * | 4/2002 | Haraguchi et al. | .......... 320/122 |
| 6,864,669 | B1 | * | 3/2005 | Bucur | ........................ 323/268 |
| 6,987,389 | B1 | * | 1/2006 | Macbeth et al. | ............. 324/536 |
| 2001/0022510 | A1 | * | 9/2001 | Okamura et al. | ............ 320/166 |

FOREIGN PATENT DOCUMENTS

JP    2565018    11/1997

* cited by examiner

*Primary Examiner*—Edward Tso
*Assistant Examiner*—Yalkew Fantu
(74) *Attorney, Agent, or Firm*—Wenderoth, Lind & Ponack, L.L.P.

(57) ABSTRACT

In an electrical storage apparatus including an electric storage device connected between a main power supply and a load, a first bypass FET and a bypass diode which are connected in series between the main power supply and the load are provided, and first and second main path FETs connected in series between the electric storage device and the load are provided. A controller judges that the first bypass FET suffers an open-circuit failure if the voltage (Va) of the load is equal to or smaller than the first threshold value Vth1 or if the voltage (Vc) at the connection point between the first bypass FET and the bypass diode is equal to or smaller than the second threshold value Vth2, when the first bypass FET is turned on and the first main path FET and the second main path FET are turned off.

22 Claims, 20 Drawing Sheets

ELECTRICAL STORAGE APPARATUS FOR USE IN AUXILIARY POWER SUPPLY SUPPLYING ELECTRIC POWER FROM ELECTRIC STORAGE DEVICE UPON VOLTAGE DROP OF MAIN POWER SUPPLY

BACKGROUND OF THE INVENTION

1. Field of the Invention

The present invention relates to an electrical storage apparatus for use in an auxiliary power supply and relates, in particular, to an electrical storage apparatus for use in an auxiliary power supply for supplying an electric power from an electric storage device upon voltage drop of the main power supply.

2. Description of the Related Art

In recent years, a car (hereinafter referred to as a vehicle) equipped with an idling stop function to stop driving the engine at the timing of a stop for consideration for the environment and improving the fuel economy is put on the market. In such a vehicle, the battery voltage is temporarily lowered when a starter that intermittently consumes a large current is driven during use. This has also resulted in a lowered supply voltage to the loads of audio devices, a car navigation device and so on, possibly leading to unstable operation. Moreover, there have been proposed various vehicle braking systems developed from the conventional mechanical hydraulic control to an electrical hydraulic control with regard to the braking of the vehicle, and it has been possible that the load of the vehicle braking circuit or the like has become inoperable when the battery fails.

As a countermeasure against the above problems, an electrical storage apparatus as an auxiliary power supply for supplying a sufficient power to the loads also at the timing of temporary battery voltage fall and supplying a power to the vehicle braking system at the timing of battery failure is proposed in, for example, Japanese Registered Utility Model No. 2565018. FIG. 20 is a circuit diagram of the electrical storage apparatus of the prior art disclosed in the document. In FIG. 20, the part enclosed by the dashed lines corresponds to the circuit part disclosed in the Japanese Utility Model No. 2565018.

First of all, the circuit part enclosed by the dashed lines will be described referring to FIG. 20. A switch 103 as an ignition switch is connected to a battery 101 corresponding to the main power supply. When the switch 103 is turned on at the startup time of the vehicle, the power of an output voltage $V_{CC}$ is supplied to the entire vehicle via a diode 105 connected in series to the switch. On the other hand, the output voltage of the battery 101 is branched to the loads of a clock, a semiconductor memory and the like that need to be consistently driven regardless of the use of the vehicle, so that an output voltage $V_{DD}$ is consistently supplied to the loads via a diode 107 and a resistor 109. Moreover, a capacitor 111 as an auxiliary power supply is connected so that the output voltage $V_{DD}$ is maintained even when the battery 101 is removed for replacement or another purpose. With this arrangement, the capacitor 111 supplies a power, and therefore, the clock, the semiconductor memory and so on can be continuously driven.

Reference is next made to a case where the circuit constructed as above is applied as an auxiliary power supply for an idling-stop car, a vehicle braking system or the like with reference to FIG. 20 that shows the circuit diagram of the electrical storage apparatus of the prior art. That is, the output voltage $V_{CC}$ is connected to the load 113 as it is, and the output voltage $V_{DD}$ including the output voltage of the capacitor 111 is connected to the load 113 via a switch 115 and a diode 117 interlocked with the switch 103 as indicated by the oblique dashed lines. This therefore corresponds to the powers of two systems connected to the load 113.

The operation of the auxiliary power supply will be described next. It is noted that the switch 103 and the switch 115 are described on the basis of the configuration in which the two are interlocked with each other as shown in FIG. 20. Moreover, the capacitor 111, which is always connected to the battery 101, is therefore in a fully charged state.

When the switch 103 and the switch 115 are turned on in this state, the output voltage $V_{CC}$ is supplied to the load 113 when the output voltage $V_{CC}$ of the battery 101 is normal. Because the two of the diode 107 and the diode 117 are connected in series on the output voltage $V_{DD}$ side, a voltage drop becomes larger than on the output voltage $V_{CC}$ side. As a result, the output voltage $V_{DD}$ is not outputted, and the output voltage $V_{CC}$ is preferentially supplied to the load 113.

In this case, assuming that the output voltage $V_{CC}$ of the battery 101 becomes lower than the output voltage $V_{DD}$ due to a failure or the like of starter driving or the battery 101, then the voltages across the diode 105 and across the diode 117 are each reversed. Therefore, the diode 105 is turned off, and the diode 117 is turned on. As a result, the output voltage $V_{DD}$ of the capacitor 111 is supplied to the load 113. By the operation as described above, the output voltage $V_{DD}$ of the capacitor 111 is automatically supplied to the load 113 by the diode 105 and the diode 117 even if the voltage of the battery 101 is lowered, and therefore, the driving is not stopped.

Although the load 113 can actually be continuously driven by the electrical storage apparatus as described above even when the voltage of the battery 101 falls, the diode 105 and the diode 117 need to be reliably switched over when the voltage of the battery 101 falls particularly in a case where the apparatus is applied to a vehicle. However, since no judgment of the failure of the switchover circuit part can be made in the prior art configuration, there has been a problem that no sufficient reliability has been able to be obtained.

SUMMARY OF THE INVENTION

An object of the present invention is to solve the aforementioned conventional problems and provide a highly reliable electrical storage apparatus capable of making a failure judgment of the switchover circuit part.

According to the first aspect of the present invention, there is provided an electrical storage apparatus connected between a main power supply and a load. The electrical storage apparatus includes a first bypass FET (Field Effect Transistor) and a bypass diode connected in series between the main power supply and the load, an electric charger circuit connected to the main power supply, an electric storage device, a voltage detector, and a controller. The electric storage device is connected to the electric charger circuit, a first main path FET (Field Effect Transistor) and a second main path FET (Field Effect Transistor) connected in series between the electric storage device and the load. The voltage detector circuit detects a voltage (Vb) of the main power supply, a voltage (Va) of the load, a voltage (Vc) at a connection point between the first bypass FET and the bypass diode, and a voltage (Vd) at a connection point between the first main path FET and the second main path FET. The controller is connected to the first bypass FET, the first main path FET, the second main path FET, the electric charger circuit and the voltage detector circuit.

The bypass diode has an anode connected to the first bypass FET and a cathode connected to the load. The controller judges that the first bypass FET suffers an open-circuit failure in either one of a case where the voltage (Va) of the load detected by the voltage detector circuit is equal to or smaller than a first threshold value Vth$1$, and another case where the voltage (Vc) at the connection point between the first bypass FET and the bypass diode is equal to or smaller than a second threshold value Vth$2$, in such a state that the first bypass FET is turned on and the first main path FET and the second main path FET are turned off. The controller judges that the bypass diode suffers an open-circuit failure if the voltage (Va) of the load is equal to or smaller than a third threshold value Vth$3$, in such a state that the first bypass FET is turned on and the first main path FET and the second main path FET are turned off. The controller judges that the second main path FET suffers an open-circuit failure if the voltage (Va) of the load is equal to or smaller than a sixth threshold value Vth$6$, in such a state that the first bypass FET is turned off and the first main path FET and the second main path FET are turned on while or after the electric storage device is charged by the electric charger circuit. The controller judges that the second main path FET suffers an open-circuit failure if the voltage (Vd) at the connection point between the first main path FET and the second main path FET is equal to or smaller than a seventh threshold value Vth$7$, in such a state that the first bypass FET and the second main path FET are turned on and the first main path FET is turned off while or after the electric storage device is charged by the electric charger circuit. The controller judges that the first bypass FET suffers a short-circuit failure if the voltage (Vc) at the connection point between the first bypass FET and the bypass diode is equal to or larger than an eighth threshold value Vth$8$, in such a state that the first bypass FET is turned off. The controller judges that the bypass diode suffers a short-circuit failure if the voltage (Vc) at the connection point between the first bypass FET and the bypass diode is equal to or larger than a ninth threshold value Vth$9$, in such a state that the first bypass FET is turned off and the first main path FET is turned on while or after the electric storage device is charged by the electric charger circuit.

In the above-mentioned electrical storage apparatus, each of the first bypass FET, the first main path FET and the second main path FET has a voltage drop ($\Delta V$) generated by a parasitic diode in an off state, and the bypass diode has the voltage drop ($\Delta V$). The controller judges that the first bypass FET suffers an open-circuit failure if the voltage (Va) of the load is equal to or smaller than the first threshold value Vth$1$, and judges that the bypass diode suffers an open-circuit failure if the voltage (Va) of the load is equal to or smaller than the third threshold value Vth$3$, in such a state that the first bypass FET is turned on and the first main path FET and the second main path FET are turned off. The controller judges that the first main path FET suffers a short-circuit failure if the voltage (Vd) at the connection point between the first main path FET and the second main path FET is equal to or larger than a tenth threshold value Vth$10$, and judges that the second main path FET suffers a short-circuit failure if the voltage (Vd) at the connection point is equal to or larger than an eleventh threshold value Vth$11$, in such a state that the first bypass FET is turned on and the first main path FET and the second main path FET are turned off while or after the electric storage device is charged by the electric charger circuit. The controller judges that the first main path FET suffers an open-circuit failure if the voltage (Vd) at the connection point between the first main path FET and the second main path FET is equal to or smaller than a fifth threshold value Vth$5$, in such a state that the first bypass FET and the first main path FET are turned on and the second main path FET is turned off while or after the electric storage device is charged by the electric charger circuit. The controller judges that the second main path FET suffers an open-circuit failure if the voltage (Vd) at the connection point between the first main path FET and the second main path FET is equal to or smaller than the seventh threshold value Vth$7$, in such a state that the first bypass FET and the second main path FET are turned on and the first main path FET is turned off in a case where the voltage (Vt) of the electric storage device is equal to or larger than a difference (Vb$-\Delta V \times 2$) between the voltage (Vb) of the main power supply and the voltage drop ($\Delta V$) while or after the electric storage device is charged by the electric charger circuit. The controller judges that the first bypass FET suffers a short-circuit failure if the voltage (Vc) at the connection point between the first bypass FET and the bypass diode is equal to or larger than the eighth threshold value Vth$8$, and judges that the bypass diode suffers a short-circuit failure if the voltage (Vc) at the connection point is equal to or larger than the ninth threshold value Vth$9$, in such a state that the first bypass FET is turned off and the first main path FET and the second main path FET are turned on in a case where an absolute value (|Vb$-$Vt|) of a difference between the voltage (Vb) of the main power supply and the voltage (Vt) of the electric storage device is equal to or smaller than the voltage drop ($\Delta V$) while or after the electric storage device is charged by the electric charger circuit.

According to the second aspect of the present invention, there is provided an electrical storage apparatus connected between a main power supply and a load. The electrical storage apparatus includes a first bypass FET and a second bypass FET which are connected in series between the main power supply and the load, an electric charger circuit connected to the main power supply, an electric storage device connected to the electric charger circuit, a first main path FET and a main path diode which are connected in series between the electric storage device and the load, a voltage detector, and a controller. The voltage detector circuit detects a voltage (Vb) of the main power supply, a voltage (Va) of the load, a voltage (Vc) at a connection point between the first bypass FET and the second bypass FET, and a voltage (Vd) at a connection point between the first main path FET and the main path diode. The controller is connected to the first bypass FET, the second bypass FET, the first main path FET, the electric charger circuit and the voltage detector circuit. The main path diode has an anode connected to the first main path FET and a cathode connected to the load.

The controller judges that the first bypass FET suffers an open-circuit failure in either one of a case where the voltage (Va) of the load detected by the voltage detector circuit is equal to or smaller than a first threshold value Vth$1$, and another case where the voltage (Vc) at the connection point between the first bypass FET and the second bypass FET is equal to or smaller than a second threshold value Vth$2$, in such a state that the first bypass FET is turned on and the first main path FET is turned off. The controller judges that the second bypass FET suffers an open-circuit failure if the voltage (Va) of the load is equal to or smaller than a third threshold value Vth$3$, in such a state that the first bypass FET is turned on and the first main path FET is turned off. The controller judges that the second bypass FET suffers an open-circuit failure if the voltage (Vc) at the connection point between the first bypass FET and the second bypass FET is equal to or smaller than a fourth threshold value Vth$4$, in such a state that the first bypass FET is turned off and the second bypass FET and the first main path FET are turned on while or after the electric storage device is charged by the electric charger circuit. The controller judges that the first main path FET suffers an open-circuit failure if the voltage (Vd) at the connection point between the first main path FET and the main path diode is equal to or smaller than a fifth threshold value Vth5, in such a state that the first main path FET is turned on while or after the electric storage device is charged by the electric charger circuit. The controller judges that the main path diode suffers an open-circuit failure if the voltage (Va) of the load is equal to or smaller than a sixth threshold value Vth6, in such a state that the first bypass FET and the second bypass FET are turned off and the first main path FET is turned on while or after the electric storage device is charged by the electric charger circuit. The controller judges that the first main path FET suffers a short-circuit failure if the voltage (Vd) at the connection point between the first main path FET and the main path diode is equal to or larger than a tenth threshold value Vth10, in such a state that the first main path FET is turned off while or after the electric storage device is charged by the electric charger circuit. The controller judges that the main path diode suffers a short-circuit failure if the voltage (Vd) at the connection point between the first main path FET and the main path diode is equal to or larger than an eleventh threshold value Vth11, in such a state that the first bypass FET is turned on and the first main path FET is turned off.

In the above-mentioned electrical storage apparatus, each of the first bypass FET, the second bypass FET and the first main path FET has a voltage drop ($\Delta V$) generated by a parasitic diode in an off state, and the main path diode has a voltage drop ($\Delta V$). The controller judges that the first bypass FET suffers an open-circuit failure if the voltage (Va) of the load is equal to or smaller than the first threshold value Vth1, and judges that the second bypass FET suffers an open-circuit failure if the voltage (Va) of the load is equal to or smaller than the third threshold value Vth3, in such a state that the first bypass FET and the second bypass FET are turned on and the first main path FET is turned off. The controller judges that the first main path FET suffers a short-circuit failure if the voltage (Vd) at the connection point between the first main path FET and the main path diode is equal to or larger than the tenth threshold value Vth10, and judges that the main path diode suffers a short-circuit failure if the voltage (Vd) at the connection point is equal to or larger than the eleventh threshold value Vth11, in such a state that the first bypass FET and the second bypass FET are turned on and the first main path FET is turned off while or after the electric storage device is charged by the electric charger circuit. The controller judges that the first main path FET suffers an open-circuit failure if the voltage (Vd) at the connection point between the first main path FET and the main path diode is equal to or smaller than the fifth threshold value Vth5, in such a state that the first bypass FET, the second bypass FET and the first main path FET are turned on in a case where the voltage (Vb) of the main power supply is equal to or larger than a difference (Vt–$\Delta V$) between the voltage (Vt) of the electric storage device and the voltage drop ($\Delta V$). The controller judges that the main path diode suffers an open-circuit failure if the voltage (Va) of the load is equal to or smaller than the sixth threshold value Vth6, in such a state that the first bypass FET and the second bypass FET are turned off and the first main path FET is turned on in a case where the voltage (Vb) of the main power supply is equal to or larger than a difference (Vt–$\Delta V\times 2$) between the voltage (Vt) of the electric storage device and the voltage drop ($\Delta V$) due to the parasitic diode and the main path diode, while or after the electric storage device is charged by the electric charger circuit. The controller judges that the first bypass FET suffers a short-circuit failure if the voltage (Vc) at the connection point between the first bypass FET and the second bypass FET is equal to or larger than an eighth threshold value Vth8, and judges that the second bypass FET suffers a short-circuit failure if the voltage (Vc) at the connection point is equal to or larger than a ninth threshold value Vth9, in such a state that the first bypass FET and the second bypass FET are turned off and the first main path FET is turned on in the case where the voltage (Vb) of the main power supply is equal to or larger than the difference (Vt–$\Delta V\times 2$) between the voltage (Vt) of the electric storage device and the voltage drop ($\Delta V$) due to the parasitic diode and the main path diode while or after the electric storage device is charged by the electric charger circuit.

According to the third aspect of the present invention, there is provided an electrical storage apparatus connected between a main power supply and a load. The electrical storage apparatus includes a first bypass FET and a bypass diode which are connected in series between the main power supply and the load, an electric charger circuit connected to the main power supply, an electric storage device connected to the electric charger circuit, a first main path FET and a main path diode which are connected in series between the electric storage device and the load, a voltage detector, and a controller. The voltage detector circuit detects a voltage (Vb) of the main power supply, a voltage (Va) of the load, a voltage (Vc) at a connection point between the first bypass FET and the bypass diode, and a voltage (Vd) at a connection point between the first main path FET and the main path diode. The controller is connected to the first bypass FET, the first main path FET, the electric charger circuit and the voltage detector circuit. The bypass diode has an anode connected to the first bypass FET and a cathode connected to the load. The main path diode has an anode connected to the first main path FET and a cathode connected to the load.

The controller judges that the first bypass FET suffers an open-circuit failure if the voltage (Va) of the load detected by the voltage detector circuit is equal to or smaller than a first threshold value Vth1, in such a state that the first bypass FET is turned on and the first main path FET is turned off. The controller judges that the first bypass FET suffers an open-circuit failure if the voltage (Vc) at the connection point between the first bypass FET and the bypass diode is equal to or smaller than a second threshold value Vth2, in such a state that the first bypass FET is turned on. The controller judges that the bypass diode suffers an open-circuit failure if the voltage (Va) of the load is equal to or smaller than a third threshold value Vth3, in such a state that the first bypass FET is turned on and the first main path FET is turned off. The controller judges that the first main path FET suffers an open-circuit failure if the voltage (Vd) at the connection point between the first main path FET and the main path diode is equal to or smaller than a fifth threshold value Vth5, in such a state that the first main path FET is turned on while or after the electric storage device is charged by the electric charger circuit. The controller judges that the main path diode suffers an open-circuit failure if the voltage (Va) of the load is equal to or smaller than a sixth threshold value Vth6, in such a state that the first bypass FET is turned off and the first main path FET is turned on while or after the electric storage device is charged by the electric charger circuit. The controller judges that the first bypass FET suffers a short-circuit failure if the voltage (Vc) at the connection point between the first bypass FET and the bypass diode is equal to or larger than an eighth threshold value Vth8, in such a state that the first bypass FET is turned off. The controller judges that the bypass diode suffers a short-circuit failure if the voltage (Vc) at the connection point between the first bypass FET and the bypass diode is equal to or larger than a ninth threshold value Vth9, in such a state that the first bypass FET is turned off and the first main path FET is turned on while or after the electric storage device is charged by the electric charger circuit. The controller judges that the first main path FET suffers a short-circuit failure if the voltage (Vd) at the connection point between the first main path FET and the main path diode is equal to or larger than a tenth threshold value Vth10, in such a state that the first main path FET is turned off while or after the electric storage device is charged by the electric charger circuit. The controller judges that the main path diode suffers a short-circuit failure if the voltage (Vd) at the connection point between the first main path FET and the main path diode is equal to or larger than an eleventh threshold value Vth11, in such a state that the first bypass FET is turned on and the first main path FET is turned off.

In the above-mentioned electrical storage apparatus, each of the first bypass FET and the first main path FET has a voltage drop ($\Delta V$) generated by a parasitic diode in an off state, and the bypass diode and the main path diode have a voltage drop ($\Delta V$). The controller judges that the first bypass FET suffers an open-circuit failure if the voltage (Va) of the load is equal to or smaller than the first threshold value Vth1, and judges that the bypass diode suffers an open-circuit failure if the voltage (Va) of the load is equal to or smaller than the third threshold value Vth3, in such a state that the first bypass FET is turned on and the first main path FET is turned off. The controller judges that the first main path FET suffers a short-circuit failure if the voltage (Vd) at the connection point between the first main path FET and the main path diode is equal to or larger than the tenth threshold value Vth10, and judges that the main path diode suffers a short-circuit failure if the voltage (Vd) at the connection point is equal to or larger than the eleventh threshold value Vth11, in such a state that the first bypass FET is turned on and the first main path FET is turned off while or after the electric storage device is charged by the electric charger circuit. The controller judges that the first main path FET suffers an open-circuit failure if the voltage (Vd) at the connection point between the first main path FET and the main path diode is equal to or smaller than the fifth threshold value Vth5, in such a state that the first bypass FET and the first main path FET are turned on while or after the electric storage device is charged by the electric charger circuit. The controller judges that the main path diode suffers an open-circuit failure if the voltage (Va) of the load is equal to or smaller than the sixth threshold value Vth6, in such a state that the first bypass FET is turned off and the first main path FET is turned on in a case where the voltage (Vb) of the main power supply is equal to or larger than a difference (Vt−$\Delta V$×2) between the voltage (Vt) of the electric storage device and the voltage drop ($\Delta V$) due to the parasitic diode and the main path diode while or after the electric storage device is charged by the electric charger circuit. The controller judges that the first bypass FET suffers a short-circuit failure if the voltage (Vc) at the connection point between the first bypass FET and the bypass diode is equal to or larger than the eighth threshold value Vth8, and judges that the bypass diode suffers a short-circuit failure if the voltage (Vc) at the connection point is equal to or larger than the ninth threshold value Vth9, in such a state that the first bypass FET is turned off and the first main path FET is turned on in the case where the voltage (Vb) of the main power supply is equal to or larger than the difference (Vt−$\Delta V$×2) between the voltage (Vt) of the electric storage device and the voltage drop ($\Delta V$) due to the parasitic diode and the main path diode while or after the electric storage device is charged by the electric charger circuit.

According to the fourth aspect of the present invention, there is provided an electrical storage apparatus connected between a main power supply and a load. The electrical storage apparatus includes a second bypass FET connected between the main power supply and the load, an electric charger circuit connected to the main power supply, an electric storage device connected to the electric charger circuit, a first main path FET and a second main path FET which are connected in series between the electric storage device and the load, a voltage detector, and a controller. The voltage detector circuit detects a voltage (Vb) of the main power supply, a voltage (Va) of the load, and a voltage (Vd) at a connection point between the first main path FET and the second main path FET. The controller is connected to the second bypass FET, the first main path FET, the second main path FET, the electric charger circuit and the voltage detector circuit.

The controller judges that the second bypass FET suffers an open-circuit failure if the voltage (Va) of the load is equal to or smaller than a third threshold value Vth3, in such a state that the first main path FET and the second main path FET are turned off. The controller judges that the first main path FET suffers an open-circuit failure if the voltage (Vd) at the connection point between the first main path FET and the second main path FET is equal to or smaller than a fifth threshold value Vth5, in such a state that the first main path FET is turned on and the second main path FET is turned off while or after the electric storage device is charged by the electric charger circuit. The controller judges that the second main path FET suffers an open-circuit failure if the voltage (Vd) at the connection point between the first main path FET and the second main path FET is equal to or smaller than a seventh threshold value Vth7, in such a state that the second main path FET is turned on and the first main path FET is turned off while or after the electric storage device is charged by the electric charger circuit. The controller judges that the second bypass FET suffers a short-circuit failure if a difference between the voltage (Vb) of the main power supply and the voltage (Va) of the load is equal to or smaller than a twelfth threshold value Vth12, in such a state that the second bypass FET, the first main path FET and the second main path FET are turned off. The controller judges that the first main path FET suffers a short-circuit failure if the voltage (Vd) at the connection point between the first main path FET and the second main path FET is equal to or larger than a tenth threshold value Vth10, in such a state that the first main path FET and the second main path FET are turned off while or after the electric storage device is charged by the electric charger circuit. The controller judges that the second main path FET suffers a short-circuit failure if the voltage (Vd) at the connection point between the first main path FET and the second main path FET is equal to or larger than an eleventh threshold value Vth11, in such a state that the first main path FET and the second main path FET are turned off.

In the above-mentioned electrical storage apparatus, each of the second bypass FET, the first main path FET and the second main path FET has a voltage drop ($\Delta V$) generated by a parasitic diode in an off state. The controller judges that the second bypass FET suffers an open-circuit failure if the voltage (Va) of the load is equal to or smaller than the third threshold value Vth3, in such a state that the second bypass FET is turned on and the first main path FET and the second main path FET are turned off. The controller judges that the second bypass FET suffers a short-circuit failure if the difference between the voltage (Vb) of the main power supply and the voltage (Va) of the load is equal to or smaller than the twelfth threshold value Vth12, in such a state that the second bypass FET, the first main path FET and the second main path FET are turned off. The controller judges that the first main path FET suffers a short-circuit failure if the voltage (Vd) at the connection point between the first main path FET and the second main path FET is equal to or larger than the tenth threshold value Vth10, and judges that the voltage (Vd) at the connection point is equal to or larger than the eleventh threshold value Vth11, in such a state that the second bypass FET is turned on and the first main path FET and the second main path FET are turned off while or after the electric storage device is charged by the electric charger circuit. The controller judges that the first main path FET suffers an open-circuit failure if the voltage (Vd) at the connection point between the first main path FET and the second main path FET is equal to or smaller than the fifth threshold value Vth5, in such a state that the second bypass FET and the first main path FET are turned on and the second main path FET is turned off in a case where the voltage (Vb) of the main power supply is equal to or larger than a difference (Vt−ΔV) between the voltage (Vt) of the electric storage device and the voltage drop (ΔV) while or after the electric storage device is charged by the electric charger circuit. The controller judges that the second main path FET suffers an open-circuit failure if the voltage (Vd) at the connection point between the first main path FET and the second main path FET is equal to or smaller than the seventh threshold value Vth7, in such a state that the second bypass FET and the second main path FET are turned on and the first main path FET is turned off in the case where the voltage (Vt) of the electric storage device is equal to or larger than the difference (Vb−ΔV) between the voltage (Vb) of the main power supply and the voltage drop (ΔV) while or after the electric storage device is charged by the electric charger circuit.

The above-mentioned electrical storage apparatus further includes a first bypass FET which is connected between the main power supply and the second bypass FET and connected to the controller. The controller judges that the first bypass FET suffers an open-circuit failure in either one of a case where the voltage (Va) of the load is equal to or smaller than a first threshold value Vth1, and another case where the voltage (Vc) at the connection point between the first bypass FET and the second bypass FET is equal to or smaller than the second threshold value Vth2, in such a state that the first bypass FET is turned on and the first main path FET and the second main path FET are turned off. The controller judges that the second bypass FET suffers an open-circuit failure in either one of a case where the voltage (Va) of the load is equal to or smaller than the third threshold value Vth3 in such a state that the first bypass FET is turned on and the first main path FET and the second main path FET are turned off, and another case where the voltage (Vc) at the connection point between the first bypass FET and the second bypass FET is equal to or smaller than the fourth threshold value Vth4, in such a state that the first bypass FET is turned off and the second bypass FET and the first main path FET are turned on while or after the electric storage device is charged by the electric charger circuit. The controller judges that the first main path FET suffers an open-circuit failure if the voltage (Vd) at the connection point between the first main path FET and the second main path FET is equal to or smaller than the fifth threshold value Vth5 in either one of such a state that the first bypass FET is turned off and the first main path FET is turned on while or after the electric storage device is charged by the electric charger circuit, and such another state that the first main path FET is turned on and the second main path FET is turned off while or after the electric storage device is charged by the electric charger circuit. The controller judges that the second main path FET suffers an open-circuit failure in either one of a case where the voltage (Va) of the load is equal to or smaller than a sixth threshold value Vth6 in such a case that the first bypass FET and the second bypass FET are turned off and the first main path FET and the second main path FET are turned on while or after the electric storage device is charged by the electric charger circuit, and another case where the voltage (Vd) at the connection point between the first main path FET and the second main path FET is equal to or smaller than the seventh threshold value Vth7 in such a state that the first bypass FET and the second main path FET are turned on and the first main path FET is turned off while or after the electric storage device is charged by the electric charger circuit. The controller judges that the first bypass FET suffers a short-circuit failure if the voltage (Vc) at the connection point between the first bypass FET and the second bypass FET is equal to or larger than an eighth threshold value Vth8, in either one of such a state that the first bypass FET and the second bypass FET are turned off, and such another state that the first bypass FET and the first main path FET are turned off. The controller judges that the second bypass FET suffers a short-circuit failure if the voltage (Vc) at the connection point between the first bypass FET and the second bypass FET is equal to or larger than a ninth threshold value Vth9, in such a state that the first bypass FET and the second bypass FET are turned off and the first main path FET is turned on while or after the electric storage device is charged by the electric charger circuit. The controller judges that the first main path FET suffers a short-circuit failure if the voltage (Vd) at the connection point between the first main path FET and the second main path FET is equal to or larger than the tenth threshold value Vth10, in either one of such a state that the first main path FET and the second main path FET are turned off while or after the electric storage device is charged by the electric charger circuit, and such another state that the first bypass FET and the first main path FET are turned off while or after the electric storage device is charged by the electric charger circuit. The controller judges that the second main path FET suffers a short-circuit failure if the voltage (Vd) at the connection point between the first main path FET and the second main path FET is equal to or larger than the eleventh threshold value Vth11, in such a state that the first bypass FET is turned on and the first main path FET and the second main path FET are turned off.

In the above-mentioned electrical storage apparatus, each of the first bypass FET, the second bypass FET, the first main path FET and the second main path FET has a voltage drop (ΔV) generated by a parasitic diode in an off state. The controller judges that the first bypass FET suffers an open-circuit failure if the voltage (Va) of the load is equal to or smaller than the first threshold value Vth1, and judges that the second bypass FET suffers an open-circuit failure if the voltage (Va) of the load is equal to or smaller than the third threshold value Vth3, in such a state that the first bypass FET and the second bypass FET are turned on and the first main path FET and the second main path FET are turned off. The controller judges that the first main path FET suffers a short-circuit failure if the voltage (Vd) at the connection point between the first main path FET and the second main path FET is equal to or larger than the tenth threshold value Vth10, and judges that the second main path FET suffers a short-circuit failure if the voltage (Vd) at the connection point is equal to or larger than the eleventh threshold value Vth11, in such a state that the first bypass FET and the second bypass FET are turned on and the first main path FET and the second main path FET are turned off while or after the electric storage device is charged by the electric charger circuit. The controller judges that the first main path FET suffers an open-circuit failure if the voltage (Vd) at the connection point between the first main path FET and the second main path FET is equal to or smaller than the fifth threshold value Vth5, in such a state that the first bypass FET, the second bypass FET and the first main path FET are turned on and the second main path FET is turned off in the case where the voltage (Vb) of the main power supply is equal to or larger than a difference (Vt−ΔV) between the voltage (Vt) of the electric storage device and the voltage drop (ΔV) while or after the electric storage device is charged by the electric charger circuit. The controller judges that the second main path FET suffers an open-circuit failure if the voltage (Vd) at the connection point between the first main path FET and the second main path FET is equal to or smaller than the seventh threshold value Vth7, in such a state that the first bypass FET, the second bypass FET and the second main path FET are turned on and the first main path FET is turned off in the case where the voltage (Vt) of the electric storage device is equal to or larger than the difference (Vb−ΔV) between the voltage (Vb) of the main power supply and the voltage drop (ΔV) while or after the electric storage device is charged by the electric charger circuit. The controller judges that the first bypass FET suffers a short-circuit failure if the voltage (Vc) at the connection point between the first bypass FET and the second bypass FET is equal to or larger than the eighth threshold value Vth8, and judges that the second bypass FET suffers a short-circuit failure if the voltage (Vc) at the connection point is equal to or larger than the ninth threshold value Vth9 in such a state that the first bypass FET and the second bypass FET are turned off and the first main path FET and the second main path FET are turned on in a case where an absolute value (|Vb−Vt|) of a difference between the voltage (Vb) of the main power supply and the voltage (Vt) of the electric storage device is equal to or smaller than the voltage drop (ΔV) while or after the electric storage device is charged by the electric charger circuit.

According to the fifth aspect of the present invention, there is provided an electrical storage apparatus connected between a main power supply and a load. The electrical storage apparatus includes a bypass diode connected between the main power supply and the load, an electric charger circuit connected to the main power supply, an electric storage device connected to the electric charger circuit, a first main path FET and a second main path FET which are connected between the electric storage device and the load, a voltage detector, and a controller. The voltage detector circuit detects a voltage (Vb) of the main power supply, a voltage (Va) of the load, and a voltage (Vd) at a connection point between the first main path FET and the second main path FET. The controller is connected to the first main path FET, the second main path FET, the electric charger circuit and the voltage detector circuit. The bypass diode has an anode connected to the main power supply and a cathode connected to the load.

The controller judges that the bypass diode suffers an open-circuit failure if the voltage (Va) of the load is equal to or smaller than a third threshold value Vth3, in such a state that the first main path FET and the second main path FET are turned off. The controller judges that the first main path FET suffers an open-circuit failure if the voltage (Vd) at the connection point between the first main path FET and the second main path FET is equal to or smaller than a fifth threshold value Vth5, in such a state that the first main path FET is turned on and the second main path FET is turned off while or after the electric storage device is charged by the electric charger circuit. The controller judges that the second main path FET suffers an open-circuit failure if the voltage (Vd) at the connection point between the first main path FET and the second main path FET is equal to or smaller than a seventh threshold value Vth7, in such a state that the second main path FET is turned on and the first main path FET is turned off while or after the electric storage device is charged by the electric charger circuit. The controller judges that the bypass diode suffers a short-circuit failure if a difference between the voltage (Vb) of the main power supply and the voltage (Va) of the load is equal to or smaller than a twelfth threshold value Vth12, in such a state that the first main path FET and the second main path FET are turned off. The controller judges that the first main path FET suffers a short-circuit failure if the voltage (Vd) at the connection point between the first main path FET and the second main path FET is equal to or larger than a tenth threshold value Vth10, in such a state that the first main path FET and the second main path FET are turned off while or after the electric storage device is charged by the electric charger circuit. The controller judges that the second main path FET suffers a short-circuit failure if the voltage (Vd) at the connection point between the first main path FET and the second main path FET is equal to or larger than an eleventh threshold value Vth11, in such a state that the first main path FET and the second main path FET are turned off.

In addition, in the above-mentioned electrical storage apparatus, each of the first main path FET and the second main path FET has a voltage drop (ΔV) generated by a parasitic diode in an off state, and the bypass diode has the voltage drop (ΔV). The controller judges that the bypass diode suffers an open-circuit failure if the voltage (Va) of the load is equal to or smaller than the third threshold value Vth3, in such a state that the first main path FET and the second main path FET are turned off. The controller judges that the bypass diode suffers a short-circuit failure if the difference between the voltage (Vb) of the main power supply and the voltage (Va) of the load is equal to or smaller than the twelfth threshold value Vth12, in such a state that the first main path FET and the second main path FET are turned off. The controller judges that the first main path FET suffers a short-circuit failure if the voltage (Vd) at the connection point between the first main path FET and the second main path FET is equal to or larger than the tenth threshold value Vth10, and judges that the second main path FET suffers a short-circuit failure if the voltage (Vd) at the connection point is equal to or larger than the eleventh threshold value Vth11, in such a state that the first main path FET and the second main path FET are turned off while or after the electric storage device is charged by the electric charger circuit. The controller judges that the first main path FET suffers an open-circuit failure if the voltage (Vd) at the connection point between the first main path FET and the second main path FET is equal to or smaller than the fifth threshold value Vth5, in such a state that the first main path FET is turned on and the second main path FET is turned off in a case where the voltage (Vt) of the electric storage device is equal to or larger than a difference (Vt−ΔV×2) between the voltage (Vb) of the main power supply and the voltage drop (ΔV) due to the parasitic diode and the bypass diode while or after the electric storage device is charged by the electric charger circuit. The controller judges that the second main path FET suffers an open-circuit failure if the voltage (Vd) at the connection point between the first main path FET and the second main path FET is equal to or smaller than the seventh threshold value Vth7, in such a state that the second main path FET is turned on and the first main path FET is turned off while or after the electric storage device is charged by the electric charger circuit.

Further, in the above-mentioned electrical storage apparatus, the controller makes a judgment of the open-circuit failure of either one of the first bypass FET and the second bypass FET after startup of the electrical storage apparatus, thereafter makes a judgment of the short-circuit failure of the second bypass FET and failure judgments of the devices other than the first bypass FET and the second bypass FET after the electric storage device is charged and operates to turn off the first bypass FET and the second bypass FET and to turn on the first main path FET upon making a judgment of the short-circuit failure of the first bypass FET.

Still further, in the above-mentioned electrical storage apparatus, the controller makes a judgment of the open-circuit failure of either one of the first bypass FET and the bypass diode after startup of the electrical storage apparatus, thereafter makes a judgment of the short-circuit failure of the bypass diode and failure judgments of the devices other than the first bypass FET and the bypass diode after the electric storage device is charged and operates to turn on the first main path FET upon making a judgment of the short-circuit failure of the first bypass FET.

In addition, in the above-mentioned electrical storage apparatus, the controller makes a judgment of the open-circuit failure of either one of the first bypass FET and the bypass diode after startup of the electrical storage apparatus, thereafter makes a judgment of the short-circuit failure of the bypass diode and failure judgments of the devices other than the first bypass FET and the bypass diode after the electric storage device is charged and operates to turn on the first main path FET upon making a judgment of the short-circuit failure of the first bypass FET.

Further, in the above-mentioned electrical storage apparatus, the controller makes a judgment of the open-circuit failure of the second bypass FET after startup of the electrical storage apparatus, thereafter makes a judgment of the short-circuit failure of the second bypass FET and failure judgments of devices other than the second bypass FET after the electric storage device is charged.

Still further, in the above-mentioned electrical storage apparatus, the controller outputs a failure signal upon making a judgment of any failure.

In addition, in the above-mentioned electrical storage apparatus, the controller makes a failure judgment after ending use and stores a failure judgment result into a built-in memory of the controller.

Further, in the above-mentioned electrical storage apparatus, the controller transmits a signal that represents the failure judgment result to an external control circuit after the startup of the electrical storage apparatus.

Still further, in the above-mentioned electrical storage apparatus, the power of the electric storage device is discharged after the failure judgment.

In addition, in the above-mentioned electrical storage apparatus, the controller makes a failure judgment after ending use and transmits a signal that represents its result to an external control circuit.

Further, in the above-mentioned electrical storage apparatus, the external control circuit is driven by the power of the electric storage device when the signal that represents the failure judgment is transmitted to the external control circuit.

According to the electrical storage apparatus of the present invention, the judgments of the short-circuit failure and the open-circuit failure of the four FETs and the main path diode can be made on the basis of the voltage (Va) of the load, the voltage (Vc) at the connection point between the first bypass FET and the second bypass FET, and the voltage (Vd) at the connection point between the first main path FET and the main path diode when the first bypass FET, the second bypass FET and the first main path FET of the switchover circuit part are controlled to be turned on/off. Therefore, such an advantageous effect is obtained that the electrical storage apparatus of higher reliability can be provided.

Further, according to the electrical storage apparatus of the present invention, the judgments of the short-circuit failure and the open-circuit failure of the three FETs and the main path diode can be made on the basis of the voltage (Va) of the load, the voltage (Vc) at the connection point between the first bypass FET and the second bypass FET, and the voltage (Vd) at the connection point between the first main path FET and the main path diode when the first bypass FET, the second bypass FET and the first main path FET of the switchover circuit part are controlled to be turned on/off. Therefore, such an advantageous effect is obtained that the electrical storage apparatus of higher reliability can be provided.

Still further, according to the electrical storage apparatus of the present invention, the judgments of the short-circuit failure and the open-circuit failure of the two FETs and the two diodes can be made on the basis of the voltage (Va) of the load, the voltage (Vc) at the connection point between the first bypass FET and the bypass diode, and the voltage (Vd) at the connection point between the first main path FET and the main path diode when the first bypass FET and the first main path FET of the switchover circuit part are controlled to be turned on/off. Therefore, such an advantageous effect is obtained that the electrical storage apparatus of higher reliability can be provided.

Further, according to the electrical storage apparatus of the present invention, the judgments of the short-circuit failure and the open-circuit failure of the three FETs can be made on the basis of the voltage (Va) of the load, the voltage (Vb) of the main power supply, and the voltage (Vd) at the connection point between the first main path FET and the second main path FET when the second bypass FET, the first main path FET and the second main path FET of the switchover circuit part are controlled to be turned on/off. Therefore, such an advantageous effect is obtained that the electrical storage apparatus of higher reliability can be provided.

Still Further, according to the electrical storage apparatus of the present invention, the judgments of the short-circuit failure and the open-circuit failure of the four FETs can be made on the basis of the voltage (Va) of the load, the voltage (Vc) at the connection point between the first main path FET and the second main path FET, and the voltage (Vd) at the connection point between the first main path FET and the second main path FET in such a state that the fluctuation of the voltage supplied to the load is reduced by arbitrarily controlling turning on/off of the first bypass FET, the second bypass FET, the first main path FET and the second main path FET of the switchover circuit part within the limited conditions. Therefore, such an advantageous effect is obtained that the electrical storage apparatus of higher reliability can be provided.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The best mode for carrying out the present invention will be described below with reference to the drawings. It is noted that the following description is made on the basis of a case where an electrical storage apparatus is applied to an idling-stop car. Moreover, switches and FETs (Field Effect Transistors) whose on/off states are not particularly as described in the description may have either state.

First Preferred Embodiment

Figure 1:
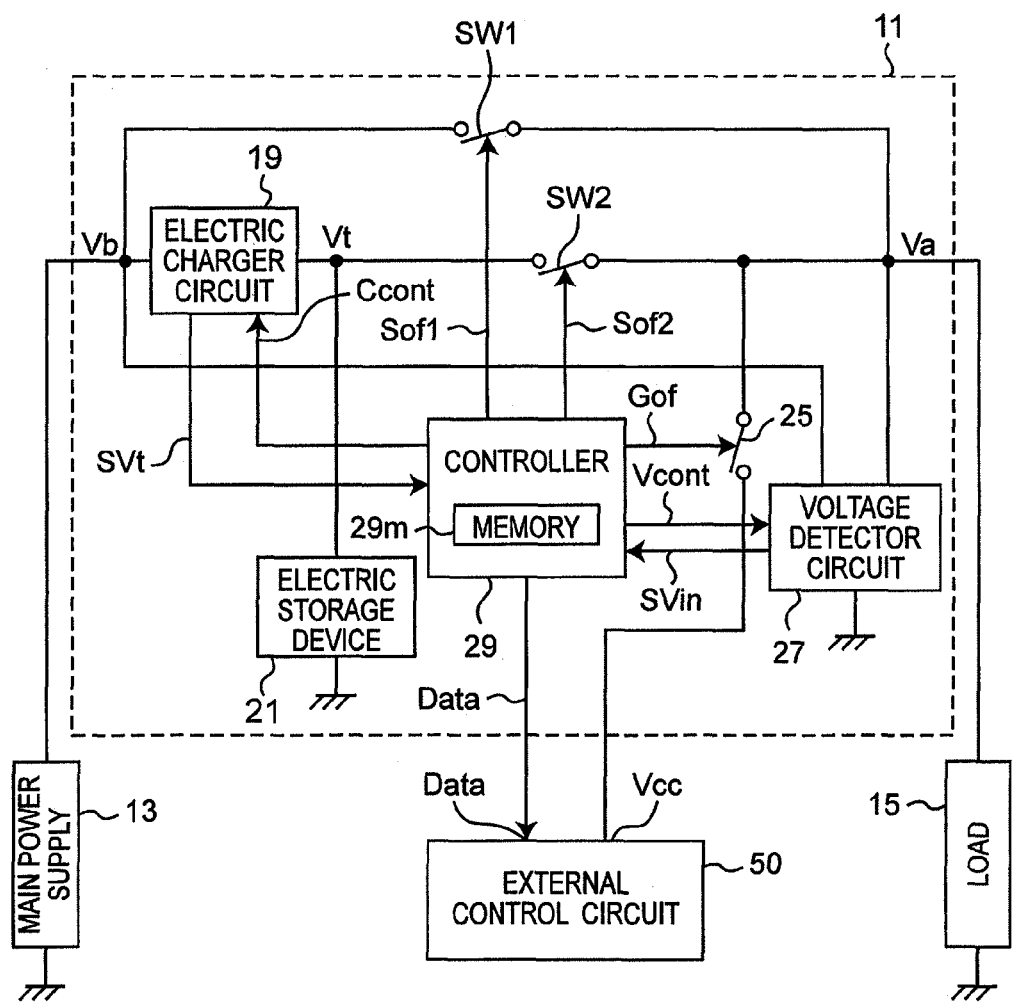
FIG. 1 is a block diagram of an electrical storage apparatus according to a first preferred embodiment of the present invention.
Figure 2:
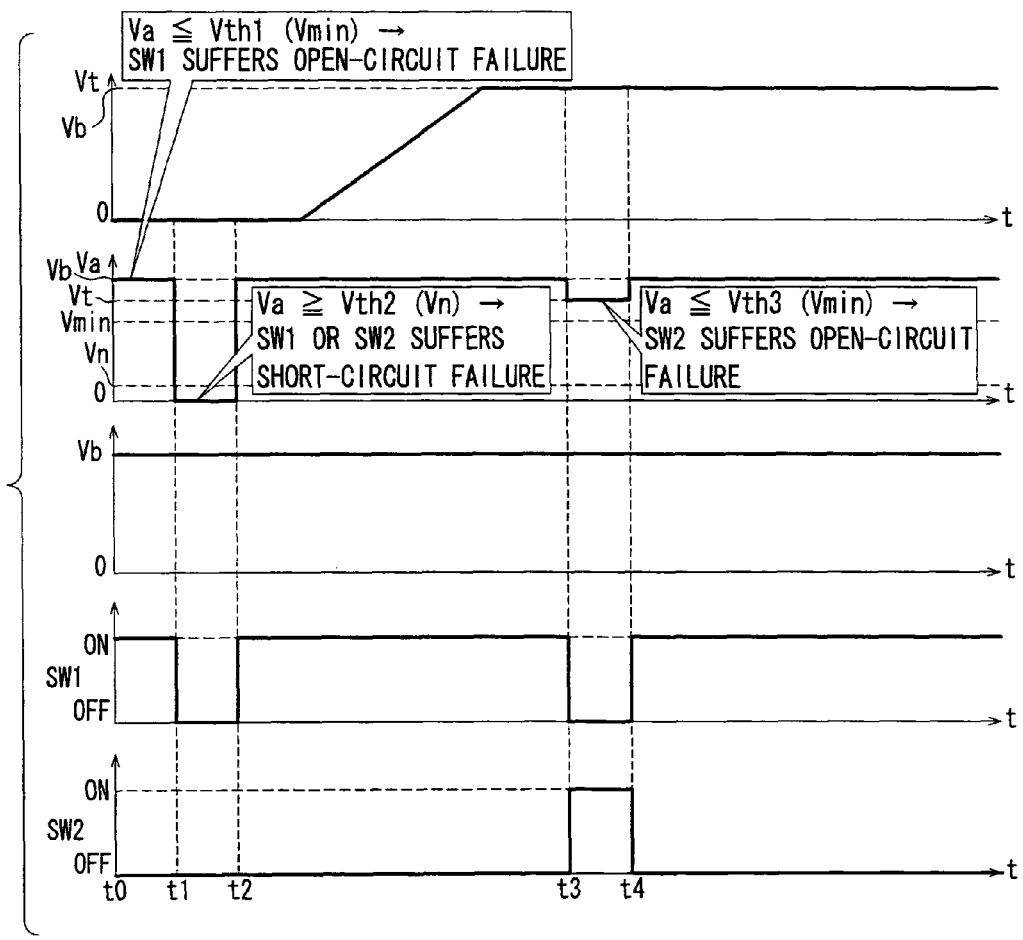
FIG. 2 is a timing chart of respective voltages upon failure judgments of the electrical storage apparatus according to the first preferred embodiment of the present invention.

FIG. 1 is a block diagram of an electrical storage apparatus according to the first preferred embodiment of the present invention. FIG. 2 is a timing chart of respective voltages upon failure judgments of the electrical storage apparatus according to the first preferred embodiment of the present invention. In FIG. 1, the electrical storage apparatus 11 is connected between a main power supply 13 and a load 15. The main power supply 13 is a battery, and the load 15 is an audio device, a navigation device or the like.

The electrical storage apparatus 11 has the following configuration. First of all, a switch SW1 is connected between the main power supply 13 and the load 15. Therefore, when the switch SW1 is turned on, a power can be supplied directly from the main power supply 13 to the load 15 by bypassing the electrical storage circuit system. It is noted that, for example, a relay that has the smallest possible internal resistance value and is able to be externally controlled to be turned on/off is employed as the switch SW1.

Moreover, an electric charger circuit 19 is connected to the main power supply 13, and an electric storage device 21 is further connected to the electric charger circuit 19. Therefore, the electric storage device 21 is charged up to a prescribed voltage by the electric charger circuit 19. It is noted that the electric charger circuit 19 detects a voltage Vt of the electric storage device 21 upon controlling electric charging, and then, outputs a voltage signal SVt that represents the voltage Vt to a controller 29. Moreover, an electric double layer capacitor having excellent rapid charge/discharge characteristics is employed as the electric storage device 21.

A switch SW2 is connected between the electric storage device 21 and the load 15. Therefore, when the switch SW2 is turned on, the power of the electric storage device 21 is supplied to the load 15. A relay is employed as the switch SW2 in a manner similar to that of the case of the switch SW1. Moreover, an external power supply switch 25 is connected to the output side of the switch SW2. The output of the external power supply switch 25 is connected to a power terminal $V_{CC}$ of an external control circuit (not shown) on the vehicle side. Therefore, when the external control circuit is driven, for example, after the use of the vehicle is ended, a power can be supplied from the electric storage device 21 by turning on the external power supply switch 25. It is noted that the external power supply switch 25 is constructed of a relay, an FET or the like that can be externally controlled to be turned on/off.

To the main power supply 13 is connected a voltage detector circuit 27 for detecting the voltage Vb thereof. Moreover, since the voltage detector circuit 27 is also connected to the load 15, the voltage Va can be also detected. It is noted that the voltage detector circuit 27 has a configuration that detects the voltage Vb of the main power supply 13 and the voltage Va of the load 15, sequentially and selectively by switching over the respective same voltages.

The controller 29 is connected to the switch SW1, the switch SW2, the external power supply switch 25, the electric charger circuit 19 and the voltage detector circuit 27. The controller 29 is constructed of a microcomputer and its peripheral circuits and controls turning on/off of the switch SW1, the switch SW2 and the external power supply switch 25 by on/off control signals Sof1, Sof2 and Gof, respectively. Moreover, the controller 29 performs charge control by transmitting a charge control signal Ccont to the electric charger circuit 19 and takes in the information of the voltage Vt of the electric storage device 21 on the basis of the voltage signal SVt. Further, the controller 29 selects the voltage that is desired to be detected by transmitting a voltage switchover signal Vcont to the voltage detector circuit 27 and takes in the information of the voltage selected by a voltage signal SVin from the detector 27. Moreover, the controller 29 transmits and receives various control signals and data signals to and from an external control circuit 50 by a data signal Data.

The operation of the electrical storage apparatus constructed as above will be described next. The fundamental flow of the operation of the controller 29 is to first turn on the switch SW1 after the startup of the vehicle to supply the power of the main power supply 13 to the load 15 and to charge the electric storage device 21 with the power of the main power supply 13 by the electric charger circuit 19. Subsequently, the voltage Vb of the main power supply 13 is detected by the voltage detector circuit 27. When the voltage of the main power supply 13 falls below a minimum voltage (e.g., 10.5 V) for driving the load 15 by driving the starter (not shown) of the vehicle, the switch SW 1 is turned off and the switch SW2 for supplying the power of the electric storage device 21 to the load 15 is simultaneously turned on. At this time, since the switch SW1 is turned off, the power of the electric storage device 21 does not flow backward to the main power supply 13.

Subsequently, when the starter driving is completed and the voltage Vb of the main power supply 13 is restored, the switch SW2 is turned off and the switch SW1 is turned on to resupply a power directly from the main power supply 13 to the load 15. At this time, the electric storage device 21 is recharged in preparation for a subsequent fall of the voltage Vb. Since the power can be continuously supplied to the load 15 even when the voltage Vb of the main power supply 13 is lowered after the idling stop by repeating the operation as described above, the load 15 can be continuously driven. If the use of the vehicle is ended, the power of the electric storage device 21 is discharged to prolong the lifetime of the electric double layer capacitor that constitutes the electric storage device 21.

The above-mentioned operation is the fundamental operation of the electrical storage apparatus 11, and in order to obtain the high reliability of the switch SW1 and the switch SW2 of the switchover circuit part, the controller 29 makes failure judgments of them as follows. The failure judgment operation will be described with reference to FIG. 2.

In FIG. 2, the horizontal axis represents the time, and the vertical axis represents the voltage Vt of the electric storage device 21, the voltage Va of the load 15 and the voltage Vb of the main power supply 13 in an order from the top thereof. Moreover, the bottom two graphs show the timing chart of the signal levels of the switch SW1 and the switch SW2 in FIG. 2.

Referring to FIG. 2, when the vehicle is started at the timing t0, the controller 29 turns on the switch SW 1 and turns off the switch SW2. In this state, the voltage Va of the load 15 is detected by the voltage detector circuit 27. If the switch SW1 is normal, the voltage Va becomes equal to the voltage Vb of the main power supply 13. Therefore, it is judged that the switch SW1 suffers an open-circuit failure if the voltage Va of the load 15 is equal to or smaller than a first threshold value Vth1 (which is set to a minimum voltage Vmin=10.5 V capable of driving the load 15 in the first preferred embodiment). It is noted that the open-circuit failure is defined as a failure that the switch remains off and is not turned on.

In this case, if the switch SW1 suffers an open-circuit failure, the controller 29 immediately informs the external control circuit 50 of the fact that the electrical storage apparatus 11 fails by a failure signal. In response to this, the external control circuit 50 urges the driver to perform repair by warning or the like. In this case, since the electrical storage apparatus 11 cannot operate if only one place fails, the subsequent failure judgment is not carried out. It is postulated that the subsequent failure judgment is not carried out at a timing when some failure is judged to be caused in the following description.

On the other hand, if the switch SW1 does not suffer an open-circuit failure, then the controller 29 turns off the switch SW1 at the timing t1. Since the switch SW1 and the switch SW2 are turned off by this operation, the voltage Va of the load 15 ideally falls to 0 V. However, due to the influences of a leakage current flow, noises and so on in practice, the voltage does not completely become 0 V but has a slight voltage. The voltage value Vn (hereinafter referred to as a zero proximity threshold voltage which means a threshold voltage close to zero voltage) did not exceed 0.1 V as the results of various examinations. Therefore, the voltage is hereinafter regarded as 0 V when it is smaller than 0.1 V. Therefore, it is judged that the switch SW1 or the switch SW2 suffers a short-circuit failure if the voltage Va of the load 15 detected by the voltage detector circuit 27 becomes a voltage equal or larger than a second threshold value Vth2 (which is set to the zero proximity threshold voltage Vn=0.1 V for the reasons described above) in such a state that the switch SW1 and the switch SW2 are turned off. It is noted that the short-circuit failure is defined as a failure that the switch remains on and is not turned off.

If the switch SW1 or the switch SW2 suffers a short-circuit failure, the failure signal is transmitted to the external control circuit 50 as described above. If the short-circuit failure is not caused, then the switch SW1 is turned on at the timing t2. By this operation, the power of the main power supply 13 is resupplied to the load 15. Therefore, the power supply to the load 15 is temporarily stopped for the failure judgment from the timing t1 to the timing t2.

Subsequently, the controller 29 controls the electric charger circuit 19 to charge the electric storage device 21. When the charging is ended, the switch SW1 is turned off and the switch SW2 is turned on at the timing t3. By this operation, the power of the electric storage device 21 is temporarily supplied to the load 15, and therefore, the voltage Va of the load 15 becomes equal to the voltage Vt of the electric storage device 21. In this case, assuming that the voltage Vb of the main power supply 13 is about 14 V when, for example, the engine is being driven and the voltage Vt when the electric storage device 21 is fully charged is 12.8 V, then the voltage Vt becomes smaller than the voltage Vb, and therefore, the voltage Va becomes slightly lowered at the timing t3 as shown in FIG. 2. However, since the sufficiently drivable voltage Vt (12.8 V) is supplied to the load 15, the load 15 does not stop.

In this state, if the voltage Va of the load 15 detected by the voltage detector circuit 27 is equal to or smaller than a third threshold value Vth3 (which is set to the load driving minimum voltage Vmin also in this case in a manner similar to that of case of the first threshold value Vth1), meaning that the voltage of the electric storage device 21 is not correctly applied to the load 15, then the controller 29 judges that the switch SW2 suffers an open-circuit failure. The operation when the switch SW2 suffers an open-circuit failure is similar to the operation in the cases of other failures. If the switch SW2 does not suffer an open-circuit failure, the controller 29 turns on the switch SW1 and turns off the switch SW2 at the timing t4. By this operation, the power of the main power supply 13 is supplied to the load 15.

The failure judgments of the switch SW1 and the switch SW2 are ended by the operation as described above, and the fundamental operation is subsequently continued. It is noted that the time interval necessary for the failure judgments is extremely short, the original operation of the electrical storage apparatus 11 is not obstructed. Moreover, since the controller 29 outputs the failure signal when judging any failure, high reliability is obtained.

By the operation of the electrical storage apparatus constructed as above, the judgments of the short-circuit failure and the open-circuit failure of the switch SW1 and the switch SW2 can be made on the basis of the voltage Va of the load 15 when the switch SW1 and the switch SW2 of the switchover circuit part are controlled to be turned on/off, and therefore, the electrical storage apparatus that has higher reliability can be provided.

Although the failure judgments of the electrical storage apparatus 11 are made after the startup of the vehicle in the first preferred embodiment, the judgments may be made after the use of the vehicle. In this case, the controller 29 makes a failure judgment by the power of the electric storage device 21, stores a failure judgment result into a built-in memory 29m of the controller 29, discharges the power of the electric storage device 21 and transmits a signal that represents the failure judgment result to the external control circuit 50 immediately after the vehicle is started up next time. Since the failure of the electrical storage apparatus 11 can be found immediately after the vehicle runs, higher reliability is obtained.

Moreover, the signal that represents the failure judgment result may be immediately transmitted to the external control circuit 50 after the use of the vehicle. In this case, since the failure judgment result of the electrical storage apparatus 11 has been already obtained after the vehicle is started up next time, still higher reliability is obtained. However, since the power supply of the external control circuit 50 is disconnected after the use of the vehicle, it is necessary to drive the external control circuit 50 by the power of the electric storage device 21 so that the external control circuit 50 can receive the signal that represents the failure judgment result. In concrete, the switch SW2 is turned on to discharge the electric storage device 21 after the use of the vehicle, and the power of the electric storage device 21 is simultaneously supplied to the external control circuit 50 by turning on the external power supply switch 25. By this operation, the discharging can be performed by effectively using the power of the electric storage device 21.

Second Preferred Embodiment

Figure 3:
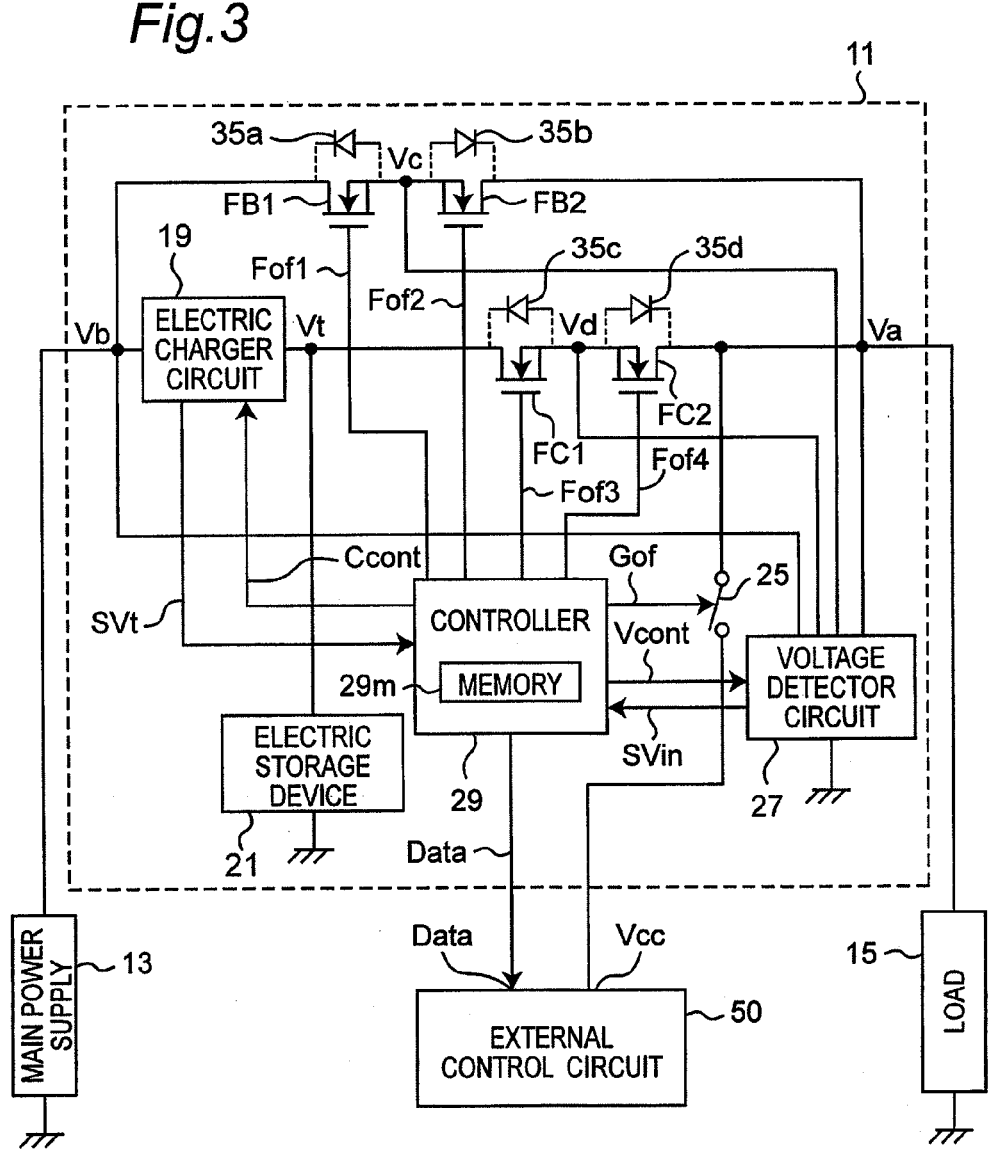
FIG. 3 is a block diagram of an electrical storage apparatus according to a second preferred embodiment of the present invention.
Figure 4:
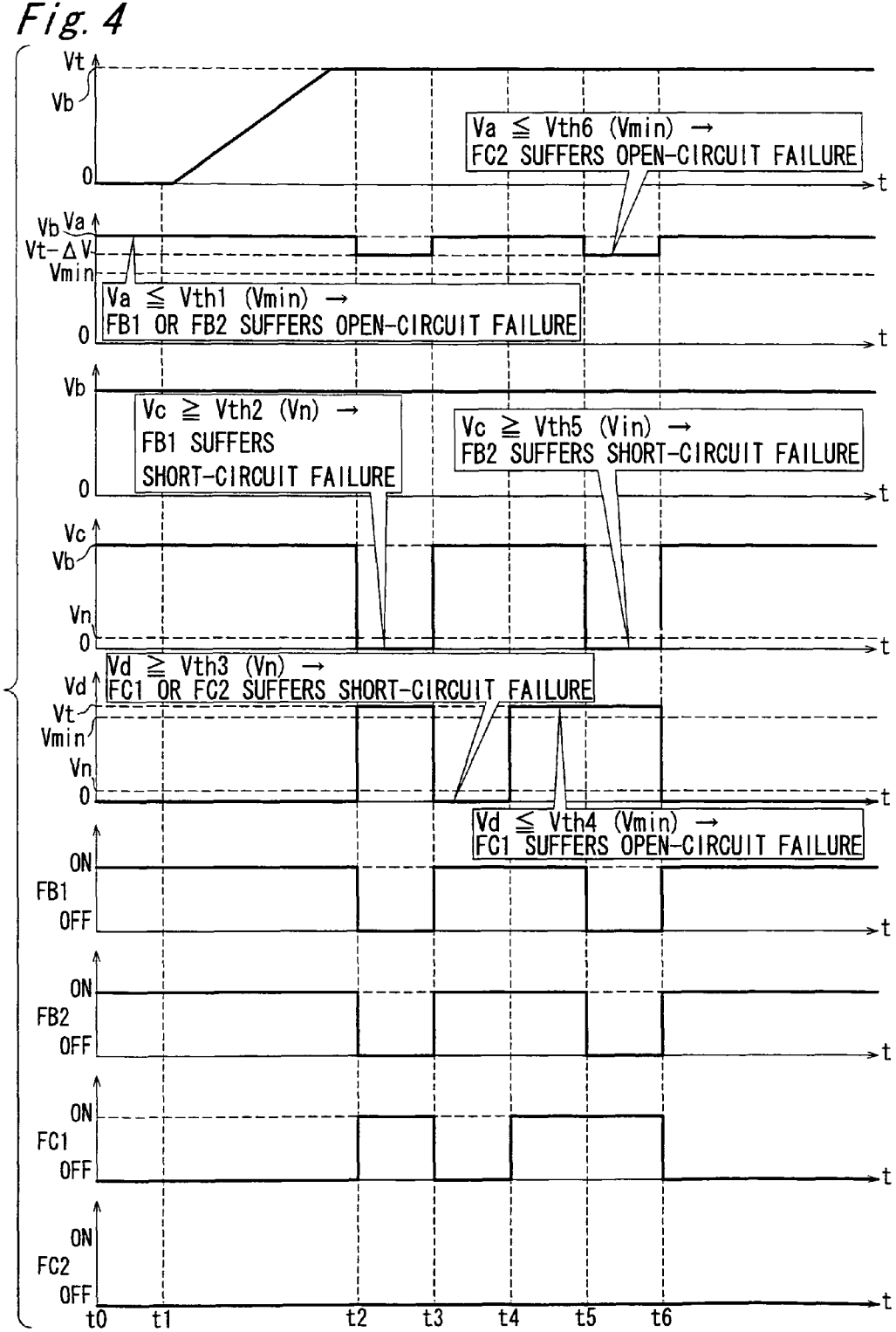
FIG. 4 is a timing chart of respective voltages upon failure judgments of the electrical storage apparatus according to the second preferred embodiment of the present invention.

FIG. 3 is a block diagram of an electrical storage apparatus according to the second preferred embodiment of the present invention. FIG. 4 is a timing chart of respective voltages upon failure judgments of the electrical storage apparatus according to the second preferred embodiment of the present invention.

In the configuration of the second preferred embodiment in FIG. 3, components similar to those of the configuration of FIG. 1 are denoted by same reference numerals, and no description is provided therefor. That is, the features of the second preferred embodiment are as follows.

(1) A first bypass FET FB1 and a second bypass FET FB2 are connected in series between the main power supply 13 and the load 15 in place of the switch SW1. It is noted that parasitic diodes 35a and 35b are formed in the bypass FETs FB1 and FB2, respectively.

(2) A first main path FET FC1 and a second main path FET FC2 are connected in series between the electric storage device 21 and the load 15 in place of the switch SW2. It is noted that parasitic diodes 35c and 35d are formed in the main path FETs FC1 and FC2, respectively. Since the FETs are thus employed in place of the relays that constitute the switch SW1 and the switch SW2, a highly reliable configuration without the movable parts is obtained.

(3) The controller 29 is constructed so that on/off control signals Fof1, Fof2, Fof3 and Fof4 are transmitted in order to independently control turning on/off of the four FETs of the first bypass FET FB1, the second bypass FET FB2, the first main path FET FC1 and the second main path FET FC2, respectively, are transmitted.

(4) A voltage Vc at a connection point between the first bypass FET FB1 and the second bypass FET FB2 and a voltage Vd at a connection point between the first main path FET FC1 and the second main path FET FC2 are detected by the voltage detector circuit 27. With this arrangement, the voltage detector circuit 27 detects the voltages Va, Vb, Vc and Vd, sequentially and selectively by switching over the respective same voltages.

The operation of the electrical storage apparatus 11 as described above will be described next. The fundamental operation is almost the same as that of the first preferred embodiment. The operation may be done so as to simultaneously turn on/off the first bypass FET FB1 and the second bypass FET FB2 when the switch SW1 is turned on/off in the second preferred embodiment, and it may be done so as to simultaneously turn on/off the first main path FET FC1 and the second main path FET FC2 when the switch SW2 is turned on/off in the second preferred embodiment.

The failure judgment operation of the four FETs of the switchover circuit part will be described next with reference to FIG. 4. Referring to FIG. 4, the horizontal axis represents the time, and the vertical axis represents the voltage Vt of the electric storage device 21, the voltage Va of the load 15, the voltage Vb of the main power supply 13, the voltage Vc at the connection point between the first bypass FET FB1 and the second bypass FET FB2, and the voltage Vd at the connection point between the first main path FET FC1 and the second main path FET FC2 in an order from the top thereof. Moreover, the bottom four graphs show the timing chart of the four FETs FB1, FB2, FC1 and FC2.

The controller 29 turns on the first bypass FET FB1 and the second bypass FET FB2 and turns off the first main path FET FC1 and the second main path FET FC2 at the timing t0. By this operation, the power of the main power supply 13 is supplied to the load 15. Assuming that the on/off setting of the first bypass FET FB1 and the second bypass FET FB2 is made normally on and the on/off setting of the first main path FET FC1 and the second main path FET FC2 is made normally off, then the first bypass FET FB1 and the second bypass FET FB2 can be kept on and the first main path FET FC1 and the second main path FET FC2 can be kept off from the startup time.

In this state, the controller 29 detects the voltage Va of the load 15 by the voltage detector circuit 27. If the first bypass FET FB1 and the second bypass FET FB2 are normal, the voltage Va becomes equal to the voltage Vb of the main power supply 13. Therefore, if the voltage Va of the load 15 is equal to or smaller than a first threshold value Vth1 (which is set to the load driving minimum voltage Vmin also in the second preferred embodiment), the controller 29 judges that the first bypass FET FB1 or the second bypass FET FB2 suffers an open-circuit failure. It is noted that the failure judgment may also be made when the second bypass FET FB2 is turned off. However, since a voltage drop $\Delta V$ ($\approx 0.7$ V) is caused due to the parasitic diode 35b of the second bypass FET FB2 in this case, the voltage Va becomes the voltage difference (Vb−$\Delta V$).

If neither the first bypass FET FB1 nor the second bypass FET FB2 suffers an open-circuit failure, the controller 29 charges the electric storage device 21 at the timing t1. At the timing t2 after the charging, the controller 29 turns off the first bypass FET FB1 and the second bypass FET FB2 and turns on the first main path FET FC1. By this operation, the power of the electric storage device 21 is supplied to the load 15. However, since the second main path FET FC2 is turned off, the voltage Va is lowered by the voltage drop ΔV of the parasitic diode 35d from the voltage Vt of the electric storage device 21, whereas the load 15 can be continuously driven. Since the first bypass FET FB1 and the second bypass FET FB2 are turned off in this state, the voltage Vc at the connection point between the first bypass FET FB1 and the second bypass FET FB2, which is detected by the voltage detector circuit 27, becomes close to 0 V if these FETs are normal. If the voltage is equal to or larger than a second threshold value Vth2 (which is set to the zero proximity threshold voltage Vn=0.1 V as described in the first preferred embodiment), it is judged that the first bypass FET FB1 suffers a short-circuit failure. Although the failure judgment may be made by turning off the first main path FET FC1 instead of the second bypass FET FB2, the power supply to the load 15 is interrupted during the failure judgment in this case. Moreover, the failure judgment is made after the electric storage device 21 is charged, and this is to continue supplying the power of the electric storage device 21 to the load 15 during the failure judgment. It is acceptable to make the failure judgment before the electric storage device 21 is charged when the power supply to the load 15 may be interrupted.

Next, at the timing t3, the controller 29 turns on the first bypass FET FB1 and the second bypass FET FB2 and turns off the first main path FET FC1 and the second main path FET FC2. By this operation, the power of the main power supply 13 is resupplied to the load 15. At this time, since the electric storage device 21 is in the charged state, the voltage Vd at the connection point between both of them becomes close to 0 V if the first main path FET FC1 and the second main path FET FC2 are normally in the off state. However, the voltage Vd becomes the voltage Vt of the electric storage device 21 if the first main path FET FC1 suffers a short-circuit failure, and the voltage Vd becomes the voltage Va of the load 15 if the second main path FET FC2 suffers a short-circuit failure. Therefore, if the voltage Vd at the connection point between the first main path FET FC1 and the second main path FET FC2, which is detected by the voltage detector circuit 27 in the states of the four FETs, is equal to or larger than a third threshold value Vth3 (which is set to the zero proximity threshold voltage Vn), it is judged that the first main path FET FC1 or the second main path FET FC2 suffers a short-circuit failure. It is noted that the second bypass FET FB2 may be turned off during the failure judgment. However, since the power is supplied to the load 15 via the parasitic diode 35b in this case, the voltage Va of the load 15 becomes the voltage difference (Vb−ΔV).

Next, the controller 29 turns on the first main path FET FC1 at the timing t4. By this operation, the voltage Vd at the connection point between the first main path FET FC1 and the second main path FET FC2 rises up to the voltage Vt of the electric storage device 21 if the first main path FET FC1 is normal. Therefore, the voltage Vd at the connection point between the first main path FET FC1 and the second main path FET FC2, which is detected by the voltage detector circuit 27, is equal to or smaller than a fourth threshold value Vth4 (which is set to the load driving minimum voltage Vmin also in this case), it is judged that the first main path FET FC1 suffers an open-circuit failure. Although only the first main path FET FC1 is turned on from the states of the four FETs during the failure judgment from the timing t3 to the timing t4 for the failure judgment from the timing t4 to time t5, the conditions to make a failure judgment from the timing t4 to the timing t5 need to turn off the first bypass FET FB1 or the second main path FET FC2 and to turn on the first main path FET FC1.

Next, the controller 29 turns off the first bypass FET FB1 and the second bypass FET FB2 at the timing t5. At this time, since the first main path FET FC1 is turned on from the timing t4 to the timing t5, the power of the electric storage device 21 is supplied to the load 15. However, since the second main path FET FC2 is turned off, the voltage drop ΔV of the parasitic diode 35d is caused, and the voltage Va of the load 15 becomes the voltage difference (Vt−ΔV). In this state, if the first bypass FET FB1 and the second bypass FET FB2 are normally made off, the voltage Vc at the connection point between both of them becomes close to 0 V. Therefore, the voltage Va of the load 15 enters the connection point if the voltage Vc at the connection point between the first bypass FET FB1 and the second bypass FET FB2, which is detected by the voltage detector circuit 27, is equal to or larger than a fifth threshold value Vth5 (which is set to the zero proximity threshold voltage Vn), and therefore, it is judged that the second bypass FET FB2 suffers a short-circuit failure. It is noted that the conditions to make the judgment of the short-circuit failure need to turn off the first bypass FET FB1 and the second bypass FET FB2 and to turn on the first main path FET FC1.

The controller 29 also makes a judgment of an open-circuit failure of the second main path FET FC2 simultaneously with the judgment of the short-circuit failure of the second bypass FET FB2 described above. In concrete, if the second main path FET FC2 is normal, the voltage Va of the load 15 becomes the voltage difference (Vt−ΔV) as described above. Therefore, it is judged that the second main path FET FC2 suffers an open-circuit failure if the voltage Va of the load 15 is equal to or smaller than a sixth threshold value Vth6 (which is set to the load driving minimum voltage Vmin also in this case).

The states of the four FETs when the failure judgment is made are quite the same as those in the case of the timing t2 to the timing t3, and therefore, it is acceptable to simultaneously make the failure judgment from the timing t2 to the timing t3 and the failure judgment from the timing t5 to the timing t6 when the failure judgment from the timing t2 to the timing t3 is made after charging. In this case, it is judged that the first bypass FET FB1 or the second bypass FET FB2 suffers a short-circuit failure if the voltage Vc is equal to or larger than the second threshold value Vth2 (=fifth threshold value Vth5=Vn). By thus configured, the three failure judgments can be simultaneously made, and therefore, the failure judgments can be made in a shorter time. However, when the failure judgment from the timing t2 to the timing t3 is made before the electric storage device 21 is charged, it is necessary to separately make a judgment of the short-circuit failure of the first bypass FET FB1.

The failure judgments are thus ended. Therefore, after the first bypass FET FB1 and the second bypass FET FB2 are turned on and the first main path FET FC1 and the second main path FET FC2 are turned off at the timing t6, the normal operation state is established.

By the operation of the electrical storage apparatus constructed as above, the judgments of the short-circuit failure and the open-circuit failure of the four FETs can be made on the basis of the voltage Va of the load, the voltage Vc at the connection point between the first bypass FET FB1 and the second bypass FET FB2 and the voltage Vd at the connection point between the first main path FET FC1 and the second main path FET FC2 when the first bypass FET FB1, the second bypass FET FB2 and the first main path FET FC1 of the switchover circuit part are controlled to be turned on/off. Therefore, the electrical storage apparatus that has higher reliability can be provided.

As described in the second preferred embodiment, the controller 29 makes the judgment of the open-circuit failure of the first bypass FET FB1 or the second bypass FET FB2 after the startup of the vehicle, thereafter makes the remaining failure judgments after the electric storage device 21 is charged and performs control so that the first bypass FET FB1 and the second bypass FET FB2 are turned off and the first main path FET FC1 is turned on upon making a judgment of the short-circuit failure of the first bypass FET FB1 (from the timing t2 to the timing t3), and this leads to that the failure judgments of the four FETs can be made without interrupting the power supply to the load 15. In this case, the second main path FET FC2 may be turned on or off. However, since the voltage drop ΔV due to the parasitic diode 35d is caused in the off state, it is better to turn on the second main path FET FC2 in order to supply the most stable possible voltage to the load 15. For similar reasons, it is better to turn on the second main path FET FC2 from the timing t5 to the timing t6.

Moreover, the failure judgments may be made after the use of the vehicle in a manner similar to that of the first preferred embodiment. The operations of signal communications with the external control circuit 50 and so on in this case are quite the same as those of the first preferred embodiment.

Third Preferred Embodiment

Figure 5:
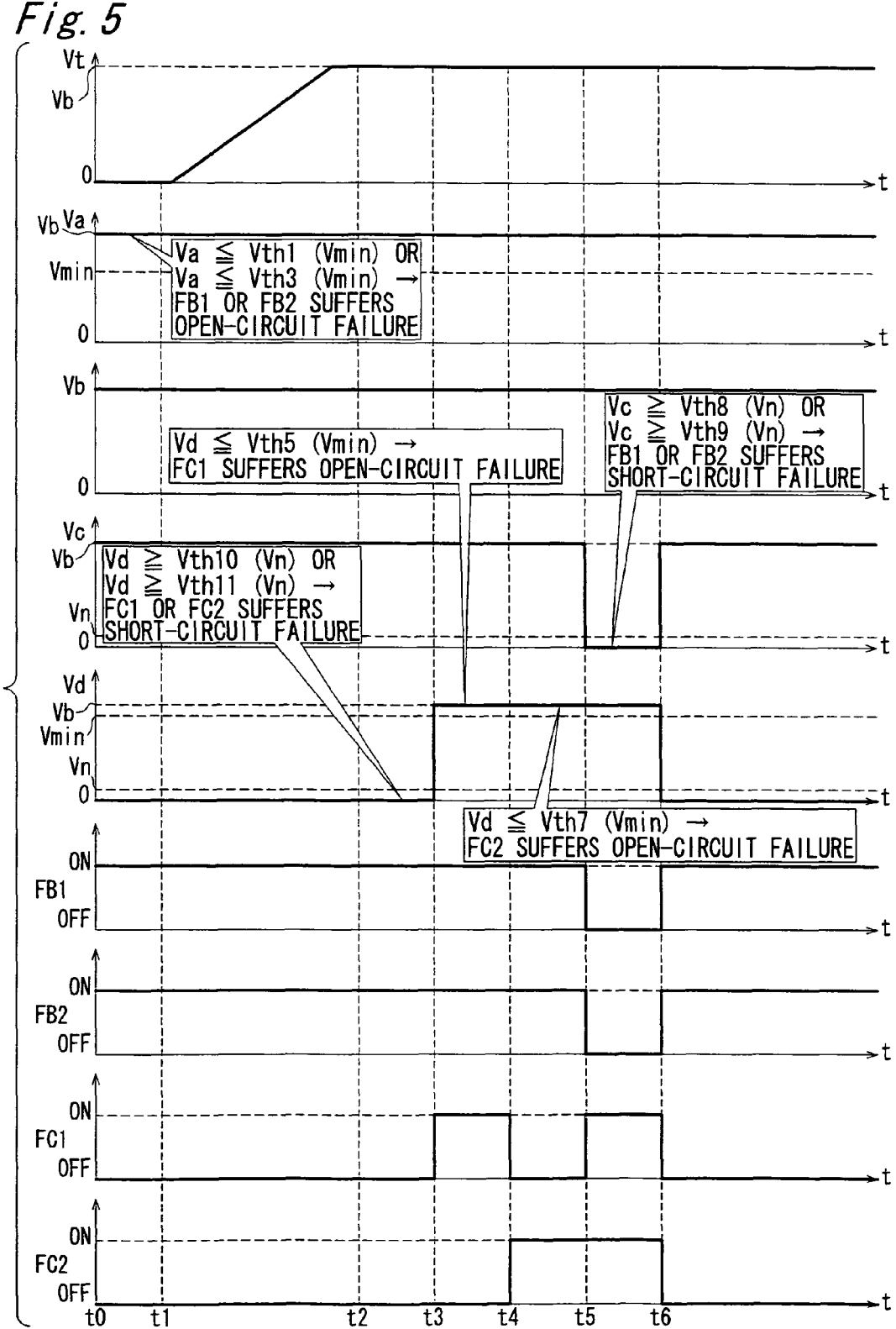
FIG. 5 is a timing chart of respective voltages upon failure judgments of an electrical storage apparatus according to a third preferred embodiment of the present invention.

FIG. 5 is a timing chart of respective voltages upon failure judgments of an electrical storage apparatus according to the third preferred embodiment of the present invention. Since the configuration of the electrical storage apparatus 11 according to the third preferred embodiment is the same as that of FIG. 3, no description is provided for the configuration, and a failure judgment method which is the features of the third preferred embodiment will be described.

The failure judgments of the first bypass FET FB1, the second bypass FET FB2, the first main path FET FC1 and the second main path FET FC2 can be made by the following combinations of conditions including the method of the second preferred embodiment. It is noted that the FETs which are not particularly described may be either on or off. Moreover, when plural conditions are described, any one of the conditions may be used.

(1) When a judgment of the open-circuit failure of the first bypass FET FB1 is made:

(1-1) It is judged that the first bypass FET FB1 suffers an open-circuit failure if the voltage Va of the load 15 is equal to or smaller than a first threshold value Vth1 or if the voltage Vc at the connection point between the first bypass FET FB1 and the second bypass FET FB2 is equal to or smaller than a second threshold value Vth2 in such a state that the first bypass FET FB1 is turned on and the first main path FET FC1 and the second main path FET FC2 are turned off.

(2) When a judgment of the open-circuit failure of the second bypass FET FB2 is made:

(2-1) It is judged that the second bypass FET FB2 suffers an open-circuit failure if the voltage Va of the load 15 is equal to or smaller than a third threshold value Vth3 in such a state that the first bypass FET FB1 is turned on and the first main path FET FC1 and the second main path FET FC2 are turned off.

(2-2) It is judged that the second bypass FET FB2 suffers an open-circuit failure if the voltage Vc at the connection point between the first bypass FET FB1 and the second bypass FET FB2 is equal to or smaller than a fourth threshold value Vth4 in such a state that the first bypass FET FB1 is turned off and the second bypass FET FB2 and the first main path FET FC1 are turned on while or after the electric storage device 21 is charged by the electric charger circuit 19.

(3) When a judgment of the open-circuit failure of the first main path FET FC1 is made:

(3-1) It is judged that the first main path FET FC1 suffers an open-circuit failure if the voltage Vd at the connection point between the first main path FET FC1 and the second main path FET FC2 is equal to or smaller than a fifth threshold value Vth5 in such a state that the first bypass FET FB1 is turned off and the first main path FET FC1 is turned on while or after the electric storage device 21 is charged by the electric charger circuit 19.

(3-2) It is judged that the first main path FET FC1 suffers an open-circuit failure if the voltage Vd at the connection point between the first main path FET FC1 and the second main path FET FC2 is equal to or smaller than the fifth threshold value Vth5 in such a state that the first main path FET FC1 is turned on and the second main path FET FC2 is turned off while or after the electric storage device 21 is charged by the electric charger circuit 19.

(4) When a judgment of the open-circuit failure of the second main path FET FC2 is made:

(4-1) It is judged that the second main path FET FC2 suffers an open-circuit failure if the voltage Va of the load 15 is equal to or smaller than a sixth threshold value Vth6 in such a state that the first bypass FET FB1 and the second bypass FET FB2 are turned off and the first main path FET FC1 and the second main path FET FC2 are turned on while or after the electric storage device 21 is charged by the electric charger circuit 19.

(4-2) It is judged that the second main path FET FC2 suffers an open-circuit failure if the voltage Vd at the connection point between the first main path FET FC1 and the second main path FET FC2 is equal to or smaller than a seventh threshold value Vth7 in such a state that the first bypass FET FB1 and the second main path FET FC2 are turned on and the first main path FET FC1 is turned off while or after the electric storage device 21 is charged by the electric charger circuit 19.

(5) When a judgment of the short-circuit failure of the first bypass FET FB1 is made:

(5-1) It is judged that the first bypass FET FB1 suffers a short-circuit failure if the voltage Vc at the connection point between the first bypass FET FB1 and the second bypass FET FB2 is equal to or larger than an eighth threshold value Vth8 in such a state that the first bypass FET FB1 and the second bypass FET FB2 are turned off.

(5-2) It is judged that the first bypass FET FB1 suffers a short-circuit failure if the voltage Vc at the connection point between the first bypass FET FB1 and the second bypass FET FB2 is equal to or larger than the eighth threshold value Vth8 in such a state that the first bypass FET FB1 and the first main path FET FC1 are turned off.

(6) When a judgment of the short-circuit failure of the second bypass FET FB2 is made:

(6-1) It is judged that the second bypass FET FB2 suffers a short-circuit failure if the voltage Vc at the connection point between the first bypass FET FB1 and the second bypass FET FB2 is equal to or larger than a ninth threshold value Vth9 in such a state that the first bypass FET FB1 and the second bypass FET FB2 are turned off and the first main path FET FC1 is turned on while or after the electric storage device 21 is charged by the electric charger circuit 19.

(7) When a judgment of the short-circuit failure of the first main path FET FC1 is made:

(7-1) It is judged that the first main path FET FC1 suffers a short-circuit failure if the voltage Vd at the connection point between the first main path FET FC1 and the second main path FET FC2 is equal to or larger than a tenth threshold value Vth10 in such a state that the first main path FET FC1 and the second main path FET FC2 are turned off while or after the electric storage device 21 is charged by the electric charger circuit 19.

(7-2) It is judged that the first main path FET FC1 suffers a short-circuit failure if the voltage Vd at the connection point between the first main path FET FC1 and the second main path FET FC2 is equal to or larger than the tenth threshold value Vth10 in such a state that the first bypass FET FB1 and the first main path FET FC1 are turned off while or after the electric storage device 21 is charged by the electric charger circuit 19.

(8) When a judgment of the short-circuit failure of the second main path FET FC2 is made:

(8-1) It is judged that the second main path FET FC2 suffers a short-circuit failure if the voltage Vd at the connection point between the first main path FET FC1 and the second main path FET FC2 is equal to or larger than an eleventh threshold value Vth11 in such a state that the first bypass FET FB1 is turned on and the first main path FET FC1 and the second main path FET FC2 are turned off.

The operation may be done so as to appropriately determine the first threshold value Vth1 to the eleventh threshold value Vth11 in consideration of the state of charge of the electric storage device 21, variations in the characteristics of the FETs and so on during the failure judgments. For example, considering the correspondence to the case of the second preferred embodiment, the first threshold value Vth1 to the seventh threshold value Vth7 correspond to the load driving minimum voltage Vmin, and the eighth threshold value Vth8 to the eleventh threshold value Vth11 correspond to the zero proximity threshold value Vn. Moreover, when the failure judgments are made while the electric storage device 21 is charged, it may be done so as to determine the first threshold value Vth1 to the seventh threshold values Vth7 in accordance with the changes in the voltages (Va, Vc, Vd) during the failure judgments. Further, the eighth threshold value Vth8 to the eleventh threshold value Vth11 are influenced by variations in the leakage current characteristics of the FETs, noises and so on, and therefore, the values may be determined taking the factors into account in advance. It is noted that the first threshold value Vth1 to the sixth threshold value Vth6 as described in the second preferred embodiment are different from the first threshold value Vth1 to the sixth threshold value Vth6, respectively, as described in the third preferred embodiment.

Among the combinations of conditions as described above, an optimal failure judgment operation example will be described with reference to FIG. 5. It is noted that the form of the graphs of FIG. 5 is similar to that of FIG. 4. Moreover, the first threshold value Vth1 to the seventh threshold value Vth7 are set to the load driving minimum voltage Vmin, and the eighth threshold value Vth8 to the eleventh threshold value Vth11 are set to the zero proximity threshold voltage Vn. It is noted that the present invention is not limited to this, and the first threshold value Vth1 to the seventh threshold value Vth7 may have mutually different values close to the load driving minimum voltage Vmin. Moreover, the eighth threshold value Vth8 to the eleventh threshold value Vth11 may have mutually different values close to the zero proximity threshold value Vn.

First of all, the controller 29 turns on the first bypass FET FB1 and the second bypass FET FB2 and turns off the first main path FET FC1 and the second main path FET FC2 at the timing t0. Since this state is the same as that at the timing t0 of FIG. 4, it is judged that the first bypass FET FB1 or the second bypass FET FB2 suffers an open-circuit failure if the voltage Va of the load 15, which is detected by the voltage detector circuit 27, is equal to or smaller than the first threshold value Vth1 (which is set to the load driving minimum voltage Vmin), equal to or smaller than the third threshold value Vth3 (which is set to the load driving minimum voltage Vmin).

When neither the first bypass FET FB1 nor the second bypass FET FB2 suffers an open-circuit failure, the controller 29 charges the electric storage device 21 at the timing t1. In this case, the charging is performed so that the voltage Vt of the electric storage device 21 coincides with the voltage Vb of the main power supply 13 within the charge accuracy of the electric charger circuit 19. Therefore, the voltage Vt of the electric storage device 21 becomes almost equal to the voltage Vb of the main power supply 13 at the timing t2 after the charging as shown in FIG. 5.

Next, at the timing t2 after the electric storage device 21 is charged, the controller 29 turns on the first bypass FET FB1 and the second bypass FET FB2 and turns off the first main path FET FC1 and the second main path FET FC2. Since this state is the same as that at the timing t0, the controller 29 needs not perform the on/off control of the FETs at the timing t2 in the third preferred embodiment. With the combinations of the failure judgment conditions as described above, the burden of the controller 29 is reduced.

The states of the FETs are the same as those at the timing t3 to the timing t4 of FIG. 4. Therefore, in a manner similar to that of the second preferred embodiment, it is judged that the first main path FET FC1 or the second main path FET FC2 suffers a short-circuit failure if the voltage Vd at the connection point between the first main path FET FC1 and the second main path FET FC2, which is detected by the voltage detector circuit 27, is equal to or larger than the tenth threshold value Vth10 (which is set to the zero proximity threshold voltage Vn), equal to or larger than the eleventh threshold value Vth11 (which is set to the zero proximity threshold voltage Vn).

Next, the controller 29 reads out the information of the voltage Vb of the main power supply 13 from the voltage detector circuit 27 and reads out the information of the voltage Vt of the electric storage device 21 from the electric charger circuit 19 at the timing t3. In this case, it is judged whether or not the voltage Vb of the main power supply 13 is equal to or larger than the voltage difference (=Vt−ΔV) between the voltage Vt of the electric storage device 21 and the voltage drop ΔV due to the parasitic diodes 35c and 35d. Since a current flows backward from the electric storage device 21 to the main power supply 13 when the FETs are controlled at the timing t3 if the voltage Vb is smaller than the voltage difference, the above judgment is made in order to avoid this occurrence.

In this case, a description is made on the assumption that the voltage drop ΔV due to the parasitic diodes 35c and 35d of the FETs is consistently equal in the third preferred embodiment. However, since there is a variation in the voltage drop ΔV in practice, it is acceptable to preparatorily obtain the voltage drop ΔV every FET and to use the value of the voltage drop ΔV of the FET applied in carrying out the calculations. Moreover, if the voltage Vb is indeed but slightly smaller than the voltage difference (Vt−ΔV), the backflow of the current is very little, posing no practical problem. Therefore, it is acceptable to provide a prescribed variation width for the voltage drop ΔV within the allowable range of the backflow current. In this case, it is acceptable to provide a variation width including the variation of the voltage drop ΔV.

Upon judging that the voltage Vb is equal to or larger than the voltage difference (Vt−ΔV), the controller 29 turns on the first bypass FET FB1, the second bypass FET FB2 and the first main path FET FC1 and turns off the second main path FET FC2. However, since the first bypass FET FB1 and the second bypass FET FB2 have been already turned on and the second main path FET FC2 is turned off from the timing t2 to the timing t3 of FIG. 5, it is turned only necessary to turn on the first main path FET FC1 in the third preferred embodiment. By this operation, the voltage Vd at the connection point between the first main path FET FC1 and the second main path FET FC2 rises up to the voltage Vt of the electric storage device 21 if the first main path FET FC1 is normal. Therefore, it is judged that the first main path FET FC1 suffers an open-circuit failure if the voltage Vd at the connection point between the first main path FET FC1 and the second main path FET FC2, which is detected by the voltage detector circuit 27, is equal to or smaller than the fifth threshold value Vth5 (which is set to the load driving minimum voltage Vmin).

Next, the controller 29 reads out the information of the voltage Vb of the main power supply 13 from the voltage detector circuit 27 and reads out the information of the voltage Vt of the electric storage device 21 from the electric charger circuit 19 at the timing t4. In this case, it is judged whether or not the voltage Vt of the electric storage device 21 is equal to or larger than the difference (=Vb−ΔV) between the voltage Vb of the main power supply 13 and the voltage drop ΔV due to the parasitic diodes 35c and 35d. If the voltage Vt is smaller than the difference, a current suddenly flows from the main power supply 13 to the electric storage device 21 when the FETs are controlled at the timing t4, and therefore, the above judgment is made to avoid this occurrence. Upon judging that the voltage Vb is equal to or larger than the difference, the controller 29 turns on the first bypass FET FB1, the second bypass FET FB2 and the second main path FET FC2 and turns off the first main path FET FC1. However, since the first bypass FET FB1 and the second bypass FET FB2 have been already turned on from the timing t3 to the timing t4 of FIG. 5, it is turned only necessary to turn off the first main path FET FC1 and to turn on the second main path FET FC2 in the third preferred embodiment. By this operation, the voltage Vd at the connection point between the first main path FET FC1 and the second main path FET FC2 becomes almost equal to the voltage Vb of the main power supply 13 if the second main path FET FC2 is normal. Therefore, it is judged that the second main path FET FC2 suffers an open-circuit failure if the voltage Vd at the connection point between the first main path FET FC1 and the second main path FET FC2, which is detected by the voltage detector circuit 27, is equal to or smaller than the seventh threshold value Vth7 (which is set to the load driving minimum voltage Vmin).

Next, the controller 29 reads out the information of the voltage Vb of the main power supply 13 from the voltage detector circuit 27 and reads out the information of the voltage Vt of the electric storage device 21 from the electric charger circuit 19 at the timing t5. In this case, it is judged whether or not the absolute value (=|Vb−Vt|) of a difference between the voltage Vb of the main power supply 13 and the voltage Vt of the electric storage device 21 is equal to or smaller than the voltage drop ΔV due to the parasitic diodes 35c and 35d. When the absolute value is larger than the voltage drop ΔV, a current suddenly flows backward from the main power supply 13 to the electric storage device 21 if the first bypass FET FB1 suffers a short-circuit failure or in the reverse direction if the second bypass FET FB2 suffers a short-circuit failure when the FETs are controlled at the timing t5, and therefore, the above judgment is made in order to avoid this occurrence. Upon judging that the absolute value is equal to or smaller than the voltage drop ΔV, the controller 29 turns off the first bypass FET FB1 and the second bypass FET FB2 and turns on the first main path FET FC1 and the second main path FET FC2. However, since the second main path FET FC2 has been already turned on from the timing t4 to the timing t5 of FIG. 5, the second main path FET FC2 needs not be controlled to be turned on at the timing t5 in the third preferred embodiment. By this operation, since the first bypass FET FB1 and the second bypass FET FB2 are turned off, the voltage Vc at the connection point between the first bypass FET FB1 and the second bypass FET FB2, which is detected by the voltage detector circuit 27, becomes close to 0 V by the voltage detector circuit 27 if these FETs are normal. If the voltage is equal to or larger than the eighth threshold value Vth8 (which is set to the zero proximity threshold voltage Vn), equal to or larger than the ninth threshold value Vth9 (which is set to the zero proximity threshold voltage Vn), it is judged that the first bypass FET FB1 or the second bypass FET FB2 suffers a short-circuit failure.

The failure judgments are thus ended. Therefore, after the first main path FET FC1 and the second main path FET FC2 are turned off and the first bypass FET FB1 and the second bypass FET FB2 are turned on at the timing t6 in a manner similar to that of the second preferred embodiment, the normal operation state is established.

By thus performing the failure judgment operation, the judgments of the open-circuit failure and the short-circuit failure of the four FETs can be made, and as is apparent from FIG. 5, it can be understood that the voltage Va of the load 15 scarcely fluctuates even when the failure judgments are made in comparison with FIG. 4. Therefore, a voltage more stable than in the second preferred embodiment can be supplied to the load 15 during the failure judgments.

By the operation of the electrical storage apparatus constructed as above, the first main path FET FC1 and the second main path FET FC2 of the switchover circuit part within the limited conditions, the judgments of the short-circuit failure and the open-circuit failure of the four FETs can be made on the basis of the voltage Va of the load 15, the voltage Vc at the connection point between the first bypass FET FB1 and the second bypass FET FB2 and the voltage Vd at the connection point between the first main path FET FC1 and the second main path FET FC2 in such a state that the fluctuation of the voltage supplied to the load 15 is reduced by arbitrarily controlling turning on/off of the first bypass FET FB1, the second bypass FET FB2. Therefore, an electrical storage apparatus that has still higher reliability can be provided.

In a manner similar to that of the second preferred embodiment, the controller 29 makes a judgment of the open-circuit failure of the first bypass FET FB1 and the second bypass FET FB2 after the startup of the vehicle, thereafter makes the remaining failure judgments after the electric storage device 21 is charged and performs control so that the first bypass FET FB1 and the second bypass FET FB2 are turned off and the first main path FET FC1 is turned on upon making a judgment of the short-circuit failure of the first bypass FET FB1 (from the timing t5 to the timing t6) also in the third preferred embodiment. By this operation, the failure judgments of the four FETs can be made without interrupting the power supply to the load 15.

Moreover, the failure judgments may be made after the use of the vehicle in a manner similar to that of the first preferred embodiment. The operations of signal communications with the external control circuit 50 and so on in this case are quite the same as those of the first preferred embodiment.

Fourth Preferred Embodiment

Figure 6:
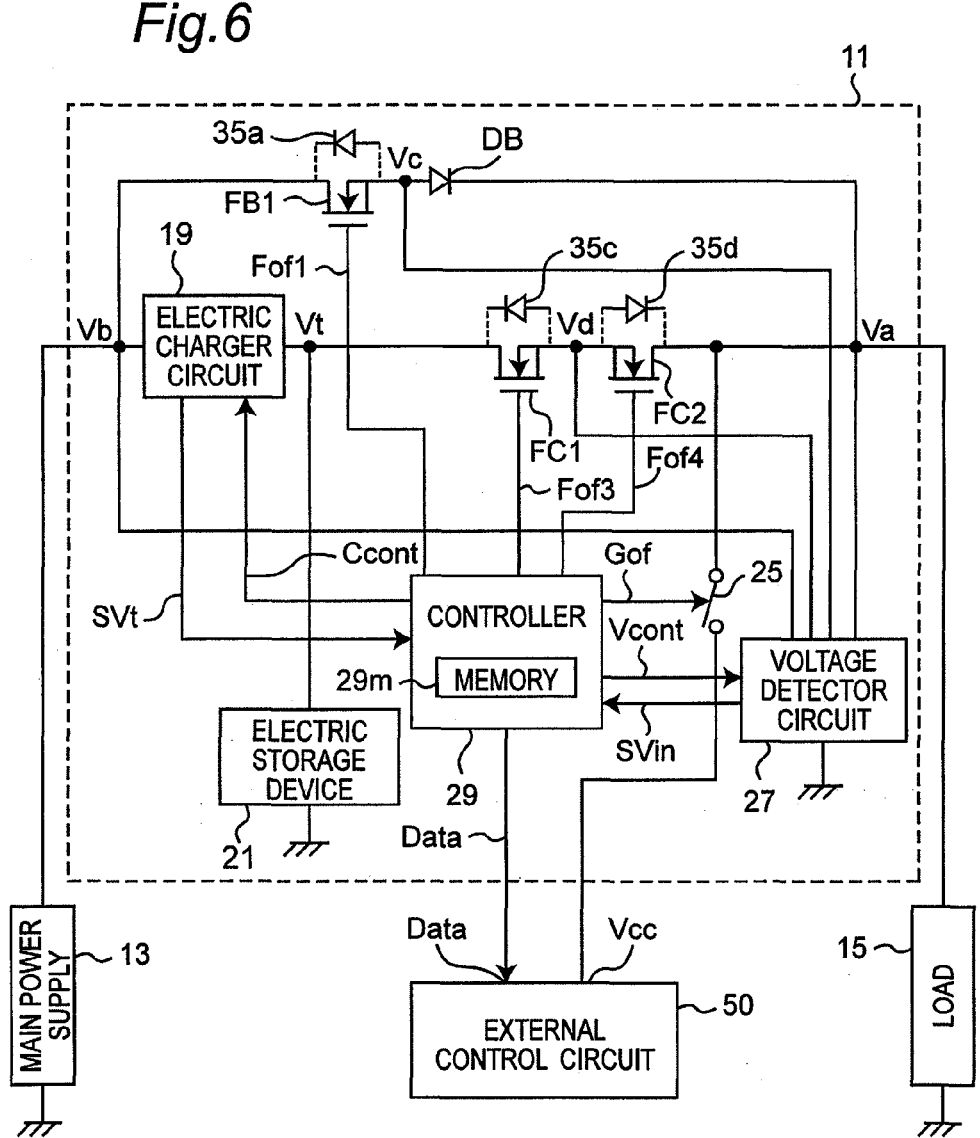
FIG. 6 is a block diagram of an electrical storage apparatus according to a fourth preferred embodiment of the present invention.
Figure 7:
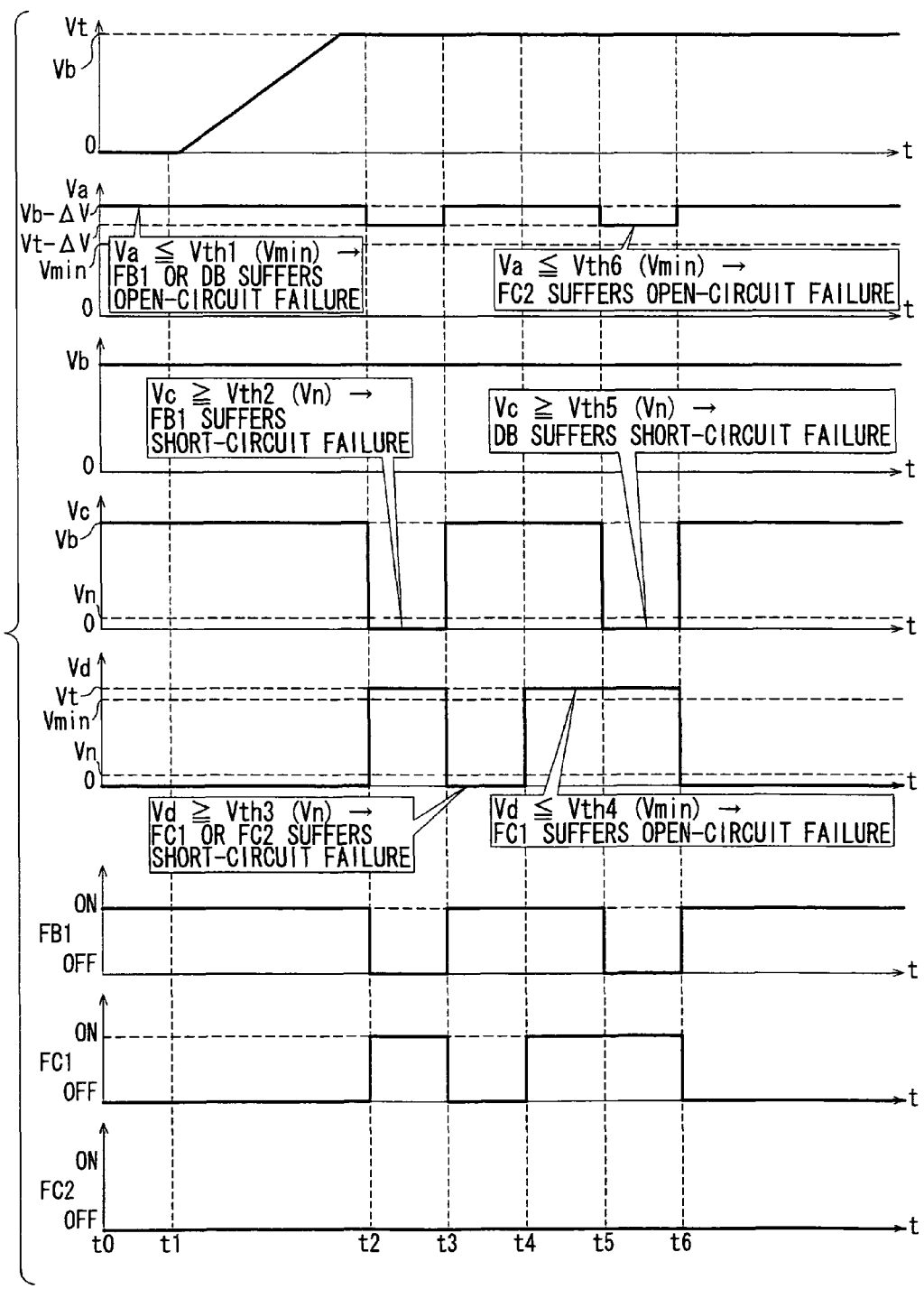
FIG. 7 is a timing chart of respective voltages upon failure judgments of the electrical storage apparatus according to the fourth preferred embodiment of the present invention.

FIG. 6 is a block diagram of an electrical storage apparatus according to the fourth preferred embodiment of the present invention. FIG. 7 is a timing chart of respective voltages upon failure judgments of the electrical storage apparatus according to the fourth preferred embodiment of the present invention. In the fourth preferred embodiment shown in FIG. 6, components similar to those of the configuration of FIG. 3 are denoted by the same reference numerals, and no detailed description is provided therefor. That is, the features of the fourth preferred embodiment are as follows.

(1) A bypass diode DB having an anode connected to the first bypass FET FB1 and a cathode connected to the load 15 is provided in place of the second bypass FET FB2. Therefore, the first bypass FET FB1 and the bypass diode DB are connected in series.

(2) The controller 29 is constructed to transmit on/off control signals Fof1, Fof3 and Fof4 in order to independently control turning on/off of the three FETs of the first bypass FET FB1, the first main path FET FC1 and the second main path FET FC2, respectively. This arrangement obviates the need for the second bypass FET FB2 and the control of the same, and therefore, a configuration simpler than that of the second preferred embodiment results.

The operation of the electrical storage apparatus 11 as described above will be described next. The fundamental operation is almost the same as that of the second preferred embodiment, and it may be done so as to perform on/off control of power supply directly from the main power supply 13 to the load 15 by turning on/off of only the first bypass FET FB1.

The failure judgment operation of the three FETs and the bypass diodes DB of the switchover circuit part will be described next with reference to FIG. 7. In FIG. 7, the horizontal axis represents the time, and the vertical axis represents the voltage Vt of the electric storage device 21, the voltage Va of the load 15, the voltage Vb of the main power supply 13, the voltage Vc at the connection point between the first bypass FET FB1 and the bypass diode DB, and the voltage Vd at the connection point between the first main path FET FC1 and the second main path FET FC2 in an order from the top thereof. Moreover, in FIG. 7, the bottom three graphs indicate the timing chart of the three FETs.

The controller 29 turns on the first bypass FET FB1 and turns off the first main path FET FC1 and the second main path FET FC2 at the timing t0. By this operation, the power of the main power supply 13 is supplied to the load 15. Assuming that the on/off setting of the first bypass FET FB1 is made normally on, and the on/off setting of the first main path FET FC1 and the second main path FET FC2 is made normally off, then it is allowed to turn on the first bypass FET FB1 and to turn off the first main path FET FC1 and the second main path FET FC2 from the startup time.

In this state, the voltage Va of the load 15 is detected by the voltage detector circuit 27. If the first bypass FET FB1 and the bypass diode DB are normal, then the voltage Va becomes equal to the value (Vb−ΔV) obtained by subtracting the voltage drop ΔV of the bypass diode DB from the voltage Vb of the main power supply 13. Therefore, it is judged that the first bypass FET FB1 or the bypass diode DB suffers an open-circuit failure if the voltage Va of the load 15 is equal to or smaller than a first threshold value Vth1 (which is set to the load driving minimum voltage Vmin also in the fourth preferred embodiment).

If neither the first bypass FET FB1 nor the bypass diode DB suffers an open-circuit failure, the controller 29 charges the electric storage device 21 at the timing t1. At the timing t2 after the charging, the controller 29 turns off the first bypass FET FB1 and turns on the first main path FET FC1. By this operation, the power of the electric storage device 21 is supplied to the load 15. However, since the second main path FET FC2 is turned off, the voltage Va is lowered by the voltage drop ΔV of the parasitic diodes 35*c* and 35*d* from the voltage Vt of the electric storage device 21, whereas the load 15 can be continuously driven. If the first bypass FET FB1 is normally off in this state, the voltage Vc at the connection point between the first bypass FET FB1 and the bypass diode DB, which is detected by the voltage detector circuit 27, becomes close to 0 V. If the voltage is equal to or larger than the second threshold value Vth2 (which is set to the zero proximity threshold voltage Vn also in this case), it is judged that the first bypass FET FB1 suffers a short-circuit failure. The failure judgment can be made even when the first main path FET FC1 is turned off, and the power supply to the load 15 is interrupted during the failure judgment in this case. Moreover, the failure judgment is made after the electric storage device 21 is charged, and this is intended to continue supplying the power of the electric storage device 21 to the load 15 during the failure judgment. The failure judgment may be made before the electric storage device 21 is charged when the power supply to the load 15 may be interrupted.

Next, the controller 29 turns on the first bypass FET FB1 and turns off the first main path FET FC1 and second main path FET FC2 at the timing t3. By this operation, the power of the main power supply 13 is resupplied to the load 15. At this time, since the electric storage device 21 is in the charged state, if the first main path FET FC1 and the second main path FET FC2 are normally in the off state, the voltage Vd at the connection point between both of them becomes close to 0 V. However, the voltage Vd becomes the voltage Vt of the electric storage device 21 if the first main path FET FC1 suffers a short-circuit failure, and the voltage Vd becomes the voltage Va of the load 15 if the second main path FET FC2 suffers a short-circuit failure. Therefore, it is judged that the first main path FET FC1 or the second main path FET FC2 suffers a short-circuit failure if the voltage Vd at the connection point between the first main path FET FC1 and the second main path FET FC2, which is detected by the voltage detector circuit 27, is equal to or larger than a third threshold value Vth3 (which is set to the zero proximity threshold voltage Vn) in the aforementioned states of the three FETs.

Next, the controller 29 turns on the first main path FET FC1 at the timing t4. By this operation, the voltage Vd at the connection point between the first main path FET FC1 and the second main path FET FC2 rises up to the voltage Vt of the electric storage device 21 if the first main path FET FC1 is normal. Therefore, it is judged that the first main path FET FC1 suffers an open-circuit failure, if the voltage Vd at the connection point between the first main path FET FC1 and the second main path FET FC2, which is detected by the voltage detector circuit 27, is equal to or smaller than a fourth threshold value Vth4 (which is set to the load driving minimum voltage Vmin also in this case). Although only the first main path FET FC1 is turned on from the states of the three FETs during the failure judgment from the timing t3 to the timing t4 for the failure judgment from the timing t4 to the timing t5, the conditions to make the failure judgment from the timing t4 to the timing t5 need to turn off the first bypass FET FB1 or the second main path FET FC2 and to turn on the first main path FET FC1.

Next, the controller 29 turns off the first bypass FET FB1 at the timing t5. At this time, since the first main path FET FC1 is turned on from the timing t4 to the timing t5, the power of the electric storage device 21 is supplied to the load 15. However, the voltage drop $\Delta V$ of the parasitic diode 35$d$ is caused since the second main path FET FC2 is turned off, and therefore, the voltage Va of the load 15 becomes the voltage difference (Vt−$\Delta V$). In this state, the first bypass FET FB1 is normally off, and the voltage Vc at the connection point between both of them becomes close to 0 V if the bypass diode DB is normal. Therefore, the voltage Va of the load 15 enters the connection point if the voltage Vc at the connection point between the first bypass FET FB1 and the bypass diode DB, which is detected by the voltage detector circuit 27, is equal to or larger than a fifth threshold value Vth5 (which is set to the zero proximity threshold voltage Vn), and therefore, it is judged that the bypass diode DB suffers a short-circuit failure. It is noted that the conditions to make a judgment of the short-circuit failure need to turn off the first bypass FET FB1 and to turn on the first main path FET FC1.

The controller 29 also makes a judgment of the open-circuit failure of the second main path FET FC2 simultaneously with the judgment of the short-circuit failure of the bypass diode DB described above. In concrete, if the second main path FET FC2 is normal, the voltage Va of the load 15 becomes the voltage difference (Vt−$\Delta V$) as described above. Therefore, it is judged that the second main path FET FC2 suffers an open-circuit failure if the voltage Va of the load 15 is equal to or smaller than a sixth threshold value Vth6 (which is set to the load driving minimum voltage Vmin also in this case).

Since the states of the three FETs upon making the failure judgment is quite the same in a manner similar to that of the case of the timing t2 to the timing t3, it is acceptable to simultaneously make the failure judgments of both of them as described in the second preferred embodiment. In this case, it is judged that the first bypass FET FB1 or the bypass diode DB suffers a short-circuit failure if the voltage Vc is equal to or larger than the second threshold value Vth2 (=fifth threshold value Vth5=Vn). By thus configured, the three failure judgments can be simultaneously made, and therefore, the failure judgments can be made in a shorter time. However, when the failure judgment from the timing t2 to the timing t3 is made before the electric storage device 21 is charged, it is necessary to separately make a judgment of the short-circuit failure of the first bypass FET FB1.

The failure judgments are thus ended. Therefore, after the first bypass FET FB1 is turned on and the first main path FET FC1 and the second main path FET FC2 are turned off at the timing t6, the normal operation state is established.

By the operation of the electrical storage apparatus constructed as above, the judgments of the short-circuit failure and the open-circuit failure of the three FETs and the bypass diode DB can be made on the basis of the voltage Va of the load 15, the voltage Vc at the connection point between the first bypass FET FB1 and the bypass diode DB and the voltage Vd at the connection point between the first main path FET FC1 and the second main path FET FC2 when the first bypass FET FB1 and the first main path FET FC1 of the switchover circuit part are controlled to be turned on/off. Therefore, the electrical storage apparatus that has higher reliability can be provided.

As described in the fourth preferred embodiment, when the controller 29 makes a judgment of the open-circuit failure of the first bypass FET FB1 or the bypass diode DB after the startup of the vehicle, makes the remaining failure judgments after the electric storage device 21 is charged and makes a judgment of the short-circuit failure of the first bypass FET FB1 (from the timing t2 to the timing t3), the failure judgments of the three FETs and the bypass diode DB can be made without interrupting the power supply to the load 15 by controlling the first main path FET FC1 so that it is turned on. In this case, it is more desirable to turn on the second main path FET FC2 also from the timing t5 to the timing t6 for the same reasons as described in the second preferred embodiment.

Moreover, the failure judgments may be made after the use of the vehicle in a manner similar to that of the first preferred embodiment. The operations of signal communications with the external control circuit 50 and so on in this case are quite the same as those of the first preferred embodiment.

Fifth Preferred Embodiment

Figure 8:
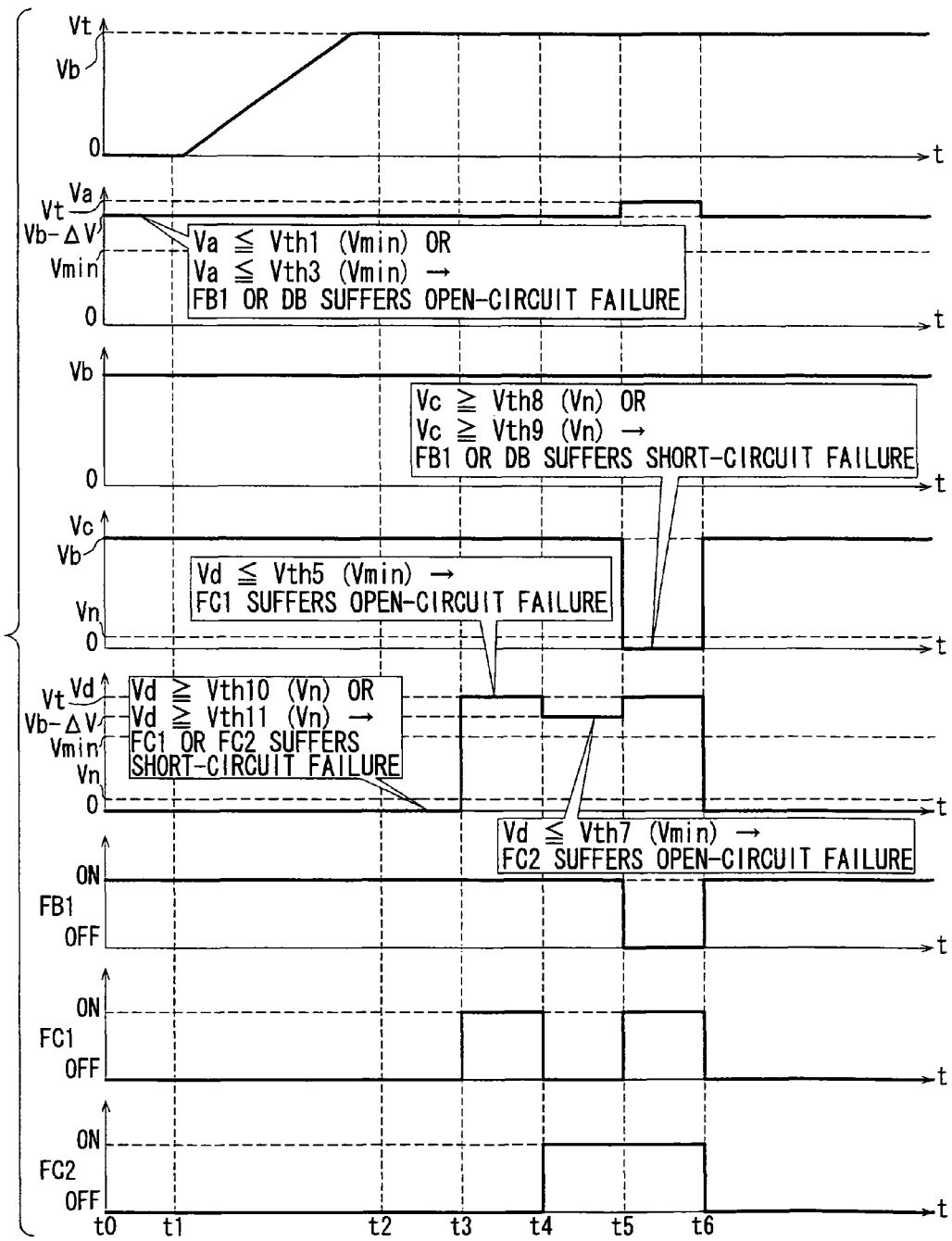
FIG. 8 is a timing chart of respective voltages upon failure judgments of an electrical storage apparatus according to a fifth preferred embodiment of the present invention.

FIG. 8 is a timing chart of respective voltages upon failure judgments of an electrical storage apparatus according to the fifth preferred embodiment of the present invention. Since the configuration of the electrical storage apparatus 11 according to the fifth preferred embodiment is the same as that of FIG. 6, no description for the structure is provided, and a failure judgment method which is the features of the fifth preferred embodiment will be described.

The failure judgments of the first bypass FET FB1, the bypass diode DB, the first main path FET FC1 and the second main path FET FC2 can be made by the following combinations of conditions including the method of the fourth preferred embodiment. It is noted that the FETs which are not particularly described may be either on or off. Moreover, when plural conditions are described, any one of them may be used.

(1) When a judgment of the open-circuit failure of the first bypass FET FB1 is made:

(1-1) It is judged that the first bypass FET FB1 suffers an open-circuit failure if the voltage Va of the load 15 is equal to or smaller than a first threshold value Vth1 or if the voltage Vc at the connection point between the first bypass FET FB1 and the bypass diode DB is equal to or smaller than a second threshold value Vth2 in such a state that the first bypass FET FB1 is turned on and the first main path FET FC1 and the second main path FET FC2 are turned off.

(2) When a judgment of the open-circuit failure of the bypass diode DB is made:

(2-1) It is judged that the bypass diode DB suffers an open-circuit failure if the voltage Va of the load 15 is equal to or smaller than a third threshold value Vth3 in such a state that the first bypass FET FB1 is turned on and the first main path FET FC1 and the second main path FET FC2 are turned off.

(3) When a judgment of the open-circuit failure of the first main path FET FC1 is made:

(3-1) It is judged that the first main path FET FC1 suffers an open-circuit failure if the voltage Vd at the connection point between the first main path FET FC1 and the second main path FET FC2 is equal to or smaller than a fifth threshold value Vth5 in such a state that the first bypass FET FB1 is turned off and the first main path FET FC1 is turned on while or after the electric storage device 21 is charged by the electric charger circuit 19.

(3-2) It is judged that the first main path FET FC1 suffers an open-circuit failure if the voltage Vd at the connection point between the first main path FET FC1 and the second main path FET FC2 is equal to or smaller than the fifth threshold value Vth5 in such a state that the first main path FET FC1 is turned on and the second main path FET FC2 is turned off while or after the electric storage device 21 is charged by the electric charger circuit 19.

(4) When a judgment of the open-circuit failure of the second main path FET FC2 is made:

(4-1) It is judged that the second main path FET FC2 suffers an open-circuit failure if the voltage Va of the load 15 is equal to or smaller than a sixth threshold value Vth6 in such a state that the first bypass FET FB1 is turned off and the first main path FET FC1 and the second main path FET FC2 are turned on while or after the electric storage device 21 is charged by the electric charger circuit 19.

(4-2) It is judged that the second main path FET FC2 suffers an open-circuit failure if the voltage Vd at the connection point between the first main path FET FC1 and the second main path FET FC2 is equal to or smaller than a seventh threshold value Vth7 in such a state that the first bypass FET FB1 and the second main path FET FC2 are turned on and the first main path FET FC1 is turned off while or after the electric storage device 21 is charged by the electric charger circuit 19.

(5) When a judgment of the short-circuit failure of the first bypass FET FB1 is made:

(5-1) It is judged that the first bypass FET FB1 suffers a short-circuit failure if the voltage Vc at the connection point between the first bypass FET FB1 and the bypass diode DB is equal to or larger than an eighth threshold value Vth8 in such a state that the first bypass FET FB1 is turned off.

(6) When a judgment of the short-circuit failure of the bypass diode DB is made:

(6-1) It is judged that the bypass diode DB suffers a short-circuit failure if the voltage Vc at the connection point between the first bypass FET FB1 and the bypass diode DB is equal to or larger than a ninth threshold value Vth9 in such a state that the first bypass FET FB1 is turned off and the first main path FET FC1 is turned on while or after the electric storage device 21 is charged by the electric charger circuit 19.

(7) When a judgment of the short-circuit failure of the first main path FET FC1 is made:

(7-1) It is judged that the first main path FET FC1 suffers a short-circuit failure if the voltage Vd at the connection point between the first main path FET FC1 and the second main path FET FC2 is equal to or larger than a tenth threshold value Vth10 in such a state that the first main path FET FC1 and the second main path FET FC2 are turned off while or after the electric storage device 21 is charged by the electric charger circuit 19.

(7-2) It is judged that the first main path FET FC1 suffers a short-circuit failure if the voltage Vd at the connection point between the first main path FET FC1 and the second main path FET FC2 is equal to or larger than the tenth threshold value Vth10 in such a state that the first bypass FET FB1 and the first main path FET FC1 are turned off while or after the electric storage device 21 is charged by the electric charger circuit 19.

(8) When a judgment of the short-circuit failure of the second main path FET FC2 is made:

(8-1) It is judged that the second main path FET FC2 suffers a short-circuit failure if the voltage Vd at the connection point between the first main path FET FC1 and the second main path FET FC2 is equal to or larger than an eleventh threshold value Vth11 in such a state that the first bypass FET FB1 is turned on and the first main path FET FC1 and the second main path FET FC2 are turned off.

The operation may be done so as to appropriately determine the first threshold value Vth1 to the eleventh threshold value Vth11 in consideration of the state of charge of the electric storage device 21, variations in the characteristics of the FETs and so on during the failure judgments as described in the third preferred embodiment. In addition, in the fifth preferred embodiment, the first threshold value Vth1 to the seventh threshold value Vth7 are set to the load driving minimum voltage Vmin, and the eighth threshold value Vth8 to the eleventh threshold value Vth11 are set to the zero proximity threshold value Vn. Moreover, the first threshold value Vth1 to the sixth threshold value Vth6 as described in the fourth preferred embodiment are different from the first threshold value Vth1 to the sixth threshold value Vth6, respectively, as described in the fifth preferred embodiment.

Among the combinations of conditions as described above, an optimal failure judgment operation example will be described with reference to FIG. 8. It is noted that the form of the graphs of FIG. 8 is similar to that of FIG. 7.

First of all, the controller 29 turns on the first bypass FET FB1 and turns off the first main path FET FC1 and the second main path FET FC2 at the timing t0. Since this state is the same as that at the timing t0 of FIG. 7, it is judged that the first bypass FET FB1 or the bypass diode DB suffers an open-circuit failure if the voltage Va of the load 15 detected by the voltage detector circuit 27 is equal to or smaller than the first threshold value Vth1 (which is set to the load driving minimum voltage Vmin), equal to or smaller than the third threshold value Vth3 (which is set to the load driving minimum voltage Vmin).

When neither the first bypass FET FB1 nor the bypass diode DB suffers an open-circuit failure, the controller 29 charges the electric storage device 21 at the timing t1. In this case, the charging is performed so that the voltage Vt of the electric storage device 21 coincides with the voltage Vb of the main power supply 13 within the charge accuracy of the electric charger circuit 19. Therefore, the voltage Vt of the electric storage device 21 becomes almost equal to the voltage Vb of the main power supply 13 at the timing t2 after the charging as shown in FIG. 8.

Next, at the timing t2 after the electric storage device 21 is charged, the controller 29 turns on the first bypass FET FB1 and turns off the first main path FET FC1 and the second main path FET FC2. Since this state is the same as that at the timing t0, the on/off control of the FETs may not be performed at the timing t2 also in the fifth preferred embodiment in a manner similar to that of the third preferred embodiment.

The states of the FETs are the same as those at the timing t3 to the timing t4 of FIG. 7. Therefore, in a manner similar to that of the fourth preferred embodiment, it is judged that the first main path FET FC1 or the second main path FET FC2 suffers a short-circuit failure if the voltage Vd at the connection point between the first main path FET FC1 and the second main path FET FC2, which is detected by the voltage detector circuit 27, is equal to or larger than the tenth threshold value Vth10 (which is set to the zero proximity threshold voltage Vn), equal to or larger than the eleventh threshold value Vth11 (which is set to the zero proximity threshold voltage Vn).

Next, the controller 29 turns on the first bypass FET FB1 and the first main path FET FC1 and turns off the second main path FET FC2 at the timing t3. However, since the first bypass FET FB1 has been already turned on and the second main path FET FC2 is turned off from the timing t2 to the timing t3 of FIG. 8, it is turned only necessary to turn on the first main path FET FC1 in the fifth preferred embodiment. By this operation, the voltage Vd at the connection point between the first main path FET FC1 and the second main path FET FC2 rises up to the voltage Vt of the electric storage device 21 if the first main path FET FC1 is normal. Therefore, it is judged that the first main path FET FC1 suffers an open-circuit failure if the voltage Vd at the connection point between the first main path FET FC1 and the second main path FET FC2, which is detected by the voltage detector circuit 27, is equal to or smaller than the fifth threshold value Vth5 (which is set to the load driving minimum voltage Vmin).

Next, the controller 29 reads out the information of the voltage Vb of the main power supply 13 from the voltage detector circuit 27 and reads out the information of the voltage Vt of the electric storage device 21 from the electric charger circuit 19 at the timing t4. In this case, it is judged whether or not the voltage Vt of the electric storage device 21 is equal to or larger than the voltage difference ($=Vb-\Delta V \times 2$) between the voltage Vb of the main power supply 13 and the voltage drop $\Delta V$. It is noted that the voltage drop $\Delta V$ represents both of one caused due to the parasitic diode 35a and another one caused due to the bypass diode DB, and the voltage drop $\Delta V$ is consistently equal in the fifth preferred embodiment. If the voltage Vt is smaller than the voltage difference, a current suddenly flows from the main power supply 13 to the electric storage device 21 when the FETs are controlled at the timing t4, and therefore, the above judgment is made in order to avoid this occurrence. Since the parasitic diode 35a and the bypass diode DB exist in the path through which the current flows, the voltage drop $\Delta V$ is doubled. Upon judging that the voltage Vb is equal to or larger than the difference, the controller 29 turns on the first bypass FET FB1 and the second main path FET FC2 and turns off the first main path FET FC1. However, since the first bypass FET FB1 has been already turned on from the timing t3 to the timing t4 of FIG. 8, it is turned only necessary to turn off the first main path FET FC1 and to turn on the second main path FET FC2 in the fifth preferred embodiment. By this operation, if the second main path FET FC2 is normal, the voltage Vd at the connection point between the first main path FET FC1 and the second main path FET FC2 becomes almost equal to a value ($=Vb-\Delta V$) obtained by subtracting the voltage drop $\Delta V$ of the bypass diode DB from the voltage Vb of the main power supply 13. Therefore, it is judged that the second main path FET FC2 suffers an open-circuit failure if the voltage Vd at the connection point between the first main path FET FC1 and the second main path FET FC2, which is detected by the voltage detector circuit 27, is equal to or smaller than the seventh threshold value Vth7 (which is set to the load driving minimum voltage Vmin).

Next, the controller 29 reads out the information of the voltage Vb of the main power supply 13 from the voltage detector circuit 27 and reads out the information of the voltage Vt of the electric storage device 21 from the electric charger circuit 19 at the timing t5. In this case, it is judged whether or not the absolute value ($=|Vb-Vt|$) of a difference between the voltage Vb of the main power supply 13 and the voltage Vt of the electric storage device 21 is equal to or smaller than the voltage drop $\Delta V$. When the absolute value is larger than the voltage drop $\Delta V$, a current suddenly flows backward from the main power supply 13 to the electric storage device 21 if the first bypass FET FB1 suffers a short-circuit failure or in the reverse direction if the bypass diode DB suffers a short-circuit failure when the FETs are controlled at the timing t5, and therefore, the above judgment is made in order to avoid this occurrence. Upon judging that the absolute value is equal to or smaller than the voltage drop $\Delta V$, the controller 29 turns off the first bypass FET FB1 and turns on the first main path FET FC1 and the second main path FET FC2. By this operation, since the first bypass FET FB1 is turned off and the bypass diode DB is equivalent to the off state of an FET, the voltage Vc at the connection point between the first bypass FET FB1 and the bypass diode DB, which is detected by the voltage detector circuit 27, becomes close to 0 V by the voltage detector circuit 27 if the first bypass FET FB1 and the bypass diode DB are normal. If the voltage is equal to or larger than the eighth threshold value Vth8 (which is set to the zero proximity threshold voltage Vn), equal to or larger than the ninth threshold value Vth9 (which is set to the zero proximity threshold voltage Vn), it is judged that the first bypass FET FB1 or the bypass diode DB suffers a short-circuit failure. It is noted that the voltage Va of the load 15 at this time becomes equal to the voltage Vt of the electric storage device 21 since the first main path FET FC1 and the second main path FET FC2 are turned on. In this case, since the charging is performed so that the voltage Vb of the main power supply 13 and the voltage Vt of the electric storage device 21 become almost equal to each other, the voltage Va of the load 15 is raised by the voltage drop $\Delta V$ from the timing t5 to the timing t6 as shown in FIG. 8.

The failure judgments are thus ended. Therefore, after the first main path FET FC1 and the second main path FET FC2 are turned off and the first bypass FET FB1 is turned on at the timing t6 in a manner similar to that of the fourth preferred embodiment, the normal operation state is established. At this time, since the power is supplied from the main power supply 13 to the load 15, the voltage Va returns to the voltage difference ($Vb-\Delta V$) as shown in FIG. 8.

By thus performing the failure judgment operation, the judgments of the open-circuit failure and the short-circuit failure of the three FETs and the bypass diode DB can be made, and as is apparent from FIG. 8, it can be understood that the voltage Va of the load 15 scarcely fluctuates as a whole although the voltage value slightly rises at the timing t5 to the timing t6 in comparison with FIG. 7 even when the failure judgment is made. Therefore, a voltage more stable than in the fourth preferred embodiment can be supplied to the load 15 during the failure judgments.

By the operation of the electrical storage apparatus constructed as above, the judgments of the short-circuit failure and the open-circuit failure of the three FETs and the bypass diode DB can be made on the basis of the voltage Va of the load 15, the voltage Vc at the connection point between the first bypass FET FB1 and the bypass diode DB and the voltage Vd at the connection point between the first main path FET FC1 and the second main path FET FC2 in such a state that the fluctuation of the voltage supplied to the load 15 is reduced by arbitrarily controlling turning on/off of the first bypass FET FB1, the first main path FET FC1 and the second main path FET FC2 within the limited conditions. Therefore, an electrical storage apparatus that has still higher reliability can be provided.

In a manner similar to that of the second preferred embodiment, the controller 29 makes a judgment of the open-circuit failure of the first bypass FET FB1 or the bypass diode DB after the startup of the vehicle, thereafter makes the remaining failure judgments after the electric storage device 21 is charged and performs control so that the first bypass FET FB1 is turned off and the first main path FET FC1 is turned on upon making a judgment of the short-circuit failure of the first bypass FET FB1 (from the timing t5 to the timing t6) also in the fifth preferred embodiment. By this operation, the failure judgments of the three FETs and the bypass diode DB can be made without interrupting the power supply to the load 15.

Moreover, the failure judgments may be made after the use of the vehicle in a manner similar to that of the first preferred embodiment. The operations of signal communications with the external control circuit 50 and so on in this case are quite the same as those of the first preferred embodiment.

Sixth Preferred Embodiment

Figure 9:
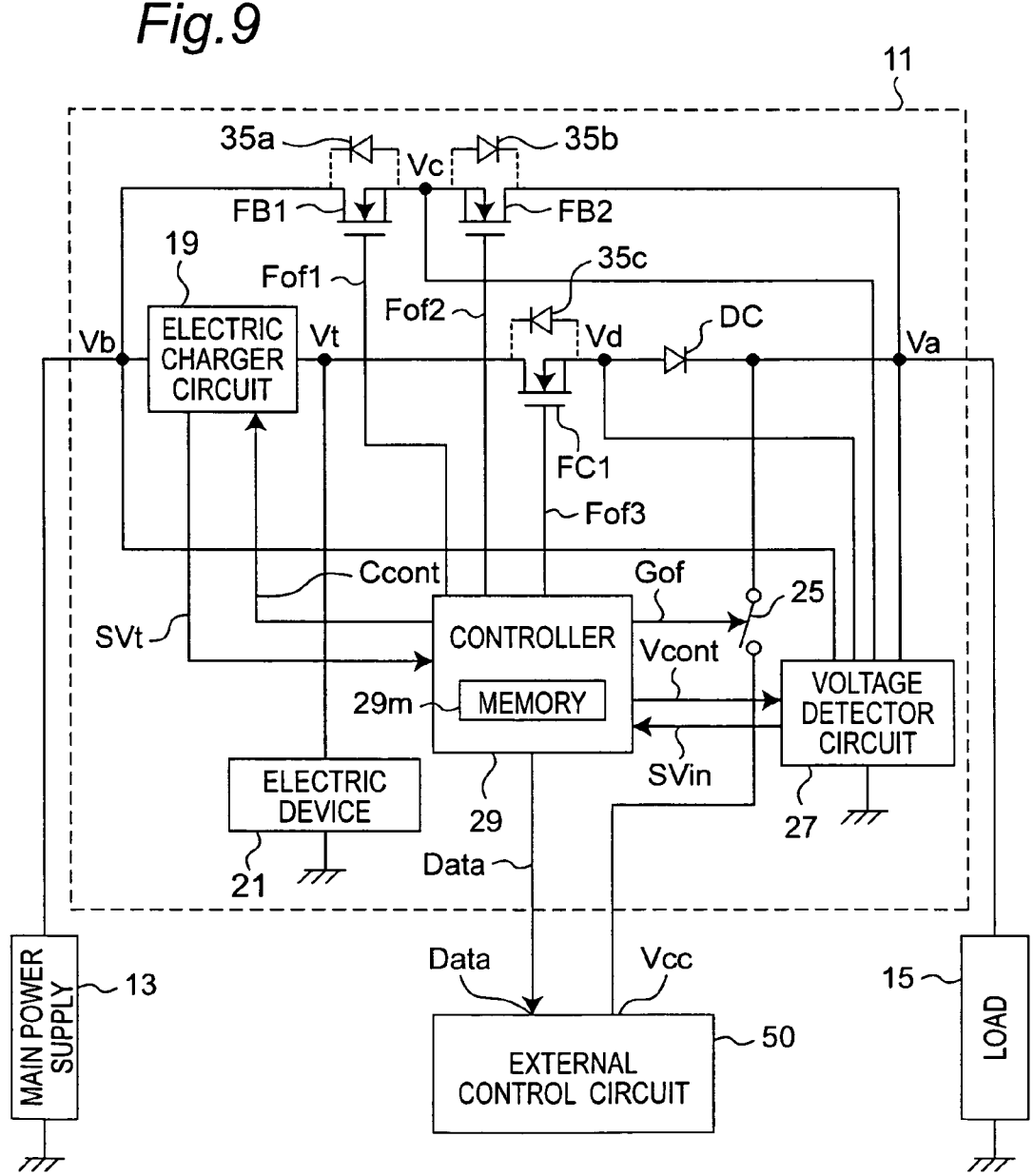
FIG. 9 is a block diagram of an electrical storage apparatus according to a sixth preferred embodiment of the present invention.
Figure 10:
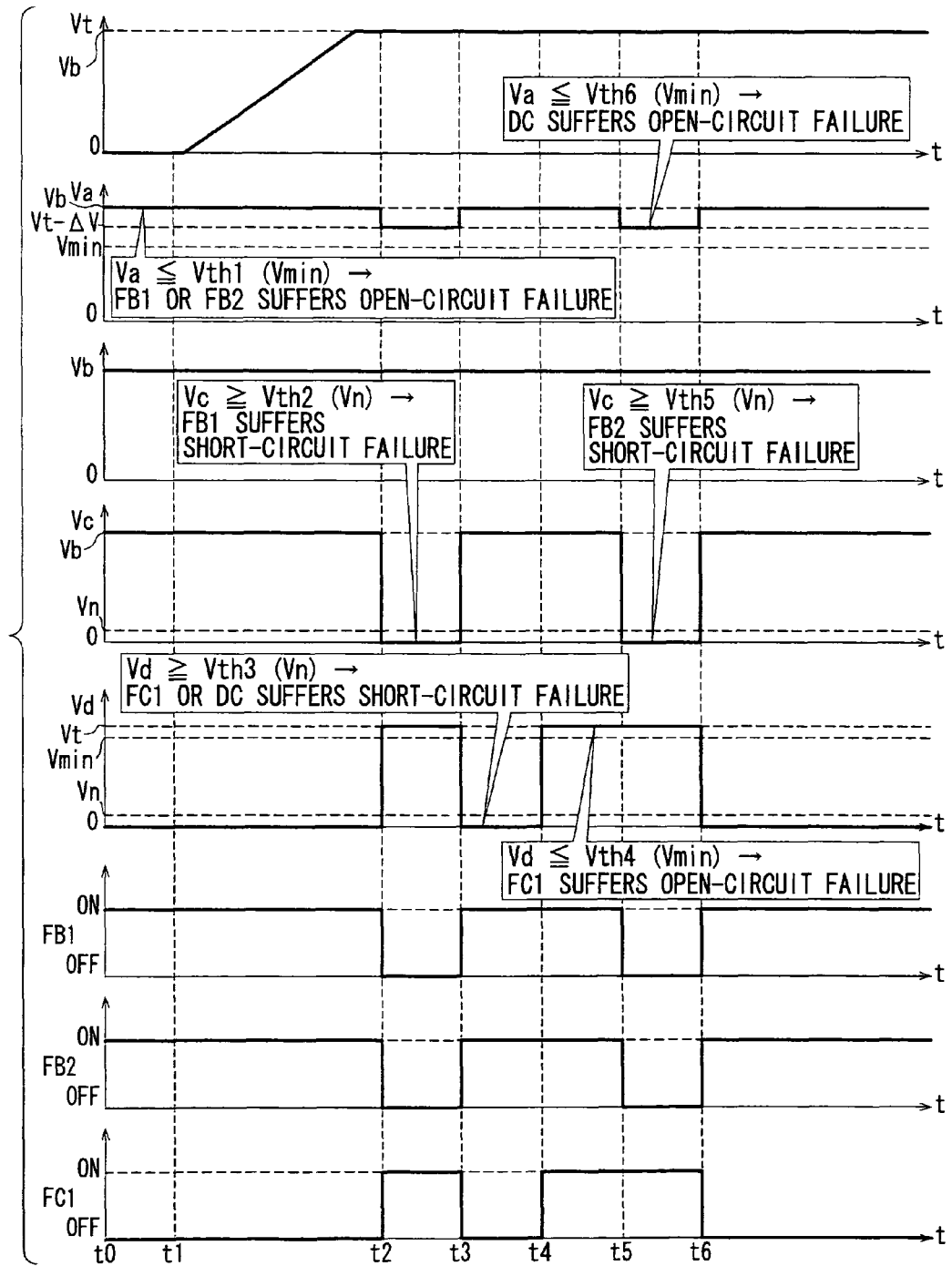
FIG. 10 is a timing chart of respective voltages upon failure judgments of the electrical storage apparatus according to the sixth preferred embodiment of the present invention.

FIG. 9 is a block diagram of an electrical storage apparatus according to the sixth preferred embodiment of the present invention. FIG. 10 is a timing chart of respective voltages upon failure judgments of the electrical storage apparatus according to the sixth preferred embodiment of the present invention. In the configuration of the sixth preferred embodiment shown in FIG. 9, the components similar to those of the configuration of FIG. 3 are denoted by the same reference numerals, and no detailed description is provided therefor. That is, the features of the sixth preferred embodiment are as follows.

(1) A main path diode DC having an anode connected to the first main path FET FC1 and a cathode connected to the load 15 is provided in place of the second main path FET FC2. Therefore, the first main path FET FC1 and the main path diode DC are connected in series.

(2) The controller 29 is constructed to transmit on/off control signals Fof1, Fof2 and Fof3 in order to control turning on/off of the three FETs of the first bypass FET FB1, the second bypass FET FB2 and the first main path FET FC1, respectively. This arrangement obviates the need for the second main path FET FC2 and the control of the same, and therefore, a configuration simpler than that of the second preferred embodiment results.

The operation of the electrical storage apparatus 11 as described above will be described next. The fundamental operation is almost the same as that of the second preferred embodiment, and it may be done so as to perform on/off control of power supply from the electric storage device 21 to the load 15 by turning on/off of only the first bypass FET FB1.

The failure judgment operation of the three FETs and the main path diode DC of the switchover circuit part will be described next with reference to FIG. 10. In FIG. 10, the horizontal axis represents the time, and the vertical axis represents the voltage Vt of the electric storage device 21, the voltage Va of the load 15, the voltage Vb of the main power supply 13, the voltage Vc at the connection point between the first bypass FET FB1 and the second bypass FET FB2, and the voltage Vd at the connection point between the first main path FET FC1 and the main path diode DC. Moreover, in FIG. 10, the bottom three graphs indicate the timing chart of the three FETs.

The controller 29 turns on the first bypass FET FB1 and the second bypass FET FB2 and turns off the first main path FET FC1 at the timing t0. By this operation, the power of the main power supply 13 is supplied to the load 15. Assuming that the on/off setting of the first bypass FET FB1 and the second bypass FET FB2 is made normally on and the on/off setting of the first main path FET FC1 is made normally off, then it is allowed to turn on the first bypass FET FB1 and the second bypass FET FB2 and to turn off the first main path FET FC1 from the startup time.

In this state, the voltage Va of the load 15 is detected by the voltage detector circuit 27. If the first bypass FET FB1 and the second bypass FET FB2 are normal, the voltage Va becomes equal to the voltage Vb of the main power supply 13. Therefore, it is judged that the first bypass FET FB1 or the second bypass FET FB2 suffers an open-circuit failure if the voltage Va of the load 15 is equal to or smaller than a first threshold value Vth1 (which is set to the load driving minimum voltage Vmin also in the sixth preferred embodiment). It is noted that the second bypass FET FB2 may be turned off during the failure judgment. However, since a voltage drop $\Delta V$ ($\approx 0.7$ V) is caused due to the parasitic diode 35b of the second bypass FET FB2 in this case, the voltage Va becomes the voltage difference (Vb−$\Delta V$).

If neither the first bypass FET FB1 nor the second bypass FET FB2 suffers an open-circuit failure, the controller 29 charges the electric storage device 21 at the timing t1. The controller 29 turns off the first bypass FET FB1 and the second bypass FET FB2 and turns on the first main path FET FC1 at the timing t2 after the charging. By this operation, the power of the electric storage device 21 is supplied to the load 15. However, the voltage Va is lowered by the voltage drop $\Delta V$ of the main path diode DC from the voltage Vt of the electric storage device 21 by way of the main path diode DC, whereas the load 15 can be continuously driven. In this state, the first bypass FET FB1 and the second bypass FET FB2 are turned off, and therefore, the voltage Vc at the connection point between the first bypass FET FB1 and the second bypass FET FB2, which is detected by the voltage detector circuit 27, becomes close to 0 V if these FETs are normal. If the voltage is equal to or larger than a second threshold value Vth2 (which is set to the zero proximity threshold voltage Vn also in this case), it is judged that the first bypass FET FB1 suffers a short-circuit failure. Although the first main path FET FC1 may be turned off instead of the second bypass FET FB2 for the failure judgment, the power supply to the load 15 is interrupted during the failure judgment in this case. Moreover, the failure judgment is made after the electric storage device 21 is charged, and this is to continue supplying the power of the electric storage device 21 to the load 15 during the failure judgment. When the power supply to the load 15 may be interrupted, the failure judgment may be made before the electric storage device 21 is charged.

Next, the controller 29 turns on the first bypass FET FB1 and the second bypass FET FB2 and turns off the first main path FET FC1 at the timing t3. By this operation, the power of the main power supply 13 is resupplied to the load 15. At this time, since the electric storage device 21 is in the charged state, the first main path FET FC1 is normally in the off state, and if the main path diode DC is normal, the voltage Vd at the connection point between both of them becomes close to 0 V. However, the voltage Vd becomes the voltage Vt of the electric storage device 21 if the first main path FET FC1 suffers a short-circuit failure, and the voltage Vd becomes the voltage Va of the load 15 if the main path diode DC suffers a short-circuit failure. Therefore, it is judged that the first main path FET FC1 or the main path diode DC suffers a short-circuit failure if the voltage Vd at the connection point between the first main path FET FC1 and the main path diode DC, which is detected by the voltage detector circuit 27 in the aforementioned states of the three FETs, is equal to or larger than a third threshold value Vth3 (which is set to the zero proximity threshold voltage Vn). It is noted that the second bypass FET FB2 may be turned off during the failure judgment. However, since the power is supplied to the load 15 via the parasitic diode 35b in this case, the voltage Va of the load 15 becomes the voltage difference (Vb−$\Delta V$).

Next, the controller 29 turns on the first main path FET FC1 at the timing t4. By this operation, the voltage Vd at the connection point between the first main path FET FC1 and the main path diode DC rises up to the voltage Vt of the electric storage device 21 if the first main path FET FC1 is normal. Therefore, it is judged that the first main path FET FC1 suffers an open-circuit failure if the voltage Vd at the connection point between the first main path FET FC1 and the main path diode DC, which is detected by the voltage detector circuit 27, is equal to or smaller than a fourth threshold value Vth4 (which is set to the load driving minimum voltage Vmin also in this case).

Next, the controller 29 turns off the first bypass FET FB1 and the second bypass FET FB2 at the timing t5. At this time, since the first main path FET FC1 is turned on from the timing t4 to the timing t5, the power of the electric storage device 21 is supplied to the load 15. However, since the voltage drop ΔV of the main path diode DC is caused by way of the main path diode DC, the voltage Va of the load 15 becomes the voltage difference (Vt−ΔV). In this state, if the first bypass FET FB1 and the second bypass FET FB2 are normally off, the voltage Vc at the connection point between both of them becomes close to 0 V. Therefore, since the voltage Va of the load 15 enters the connection point if the voltage Vc at the connection point between the first bypass FET FB1 and the second bypass FET FB2, which is detected by the voltage detector circuit 27, is equal to or larger than a fifth threshold value Vth5 (which is set to the zero proximity threshold voltage Vn), it is judged that the second bypass FET FB2 suffers a short-circuit failure. With regard to the conditions to make a judgment of the short-circuit failure, it is necessary to turn off the first bypass FET FB1 and the second bypass FET FB2 and to turn on the first main path FET FC1. Moreover, since the states of the three FETs upon making the failure judgments is quite the same in a manner similar to that of the case of the timing t2 to the timing t3, the failure judgments of both of them may be simultaneously made as described in the second preferred embodiment. In this case, it is judged that the first bypass FET FB1 or the second bypass FET FB2 suffers a short-circuit failure if the voltage Vc is equal to or larger than the second threshold value Vth2 (=fifth threshold value Vth5=Vn). However, when the failure judgment from the timing t2 to the timing t3 is made before the electric storage device 21 is charged, the judgments of the short-circuit failure of the first bypass FET FB1 and the second bypass FET FB2 need to be separately made.

Moreover, the power of the electric storage device 21 is supplied to the load 15 in the state from the timing t5 to the timing t6. Therefore, since the first main path FET FC1 is normal from the timing t5 to the timing t6 as the result of failure judgments that have been made, the voltage Va of the load 15 becomes the voltage difference (Vt−ΔV) if the main path diode DC is normal. Therefore, the controller 29 judges that the main path diode DC suffers an open-circuit failure if the voltage Va of the load 15 detected by the voltage detector circuit 27 is equal to or smaller than a sixth threshold value Vth6 (which is set to the load driving minimum voltage Vmin also in this case).

As is apparent from the above, the judgments of the open-circuit failure of the second bypass FET FB2 and the open-circuit failure of the main path diode DC are simultaneously made from the timing t5 to the timing t6. Furthermore, since the failure judgment from the timing t2 to the timing t3 can be also simultaneously made as described above, the failure judgment can be made in a shorter time.

The failure judgments are thus ended. Therefore, after the first bypass FET FB1 and the second bypass FET FB2 are turned on and the first main path FET FC1 is turned off at the timing t6, the normal operation state is established.

By the operation of the electrical storage apparatus constructed as above, the judgments of the short-circuit failure and the open-circuit failure of the three FETs and the main path diode DC can be made on the basis of the voltage Va of the load, the voltage Vc at the connection point between the first bypass FET FB1 and the second bypass FET FB2, and the voltage Vd at the connection point between the first main path FET FC1 and the main path diode DC when the first bypass FET FB1, the second bypass FET FB2 and the first main path FET FC1 of the switchover circuit part are controlled to be turned on/off. Therefore, the electrical storage apparatus that has higher reliability can be provided.

As described in the sixth preferred embodiment, the controller 29 makes a judgment of the open-circuit failure of the first bypass FET FB1 or the second bypass FET FB2 after the startup of the vehicle, thereafter makes the remaining failure judgments after the electric storage device 21 is charged and performs control so that the first bypass FET FB1 and the second bypass FET FB2 are turned off and the first main path FET FC1 is turned on upon making a judgment of the short-circuit failure of the first bypass FET FB1, the failure judgments of the three FETs and the main path diode DC can be made without interrupting the power supply to the load 15.

Moreover, the failure judgments may be made after the use of the vehicle in a manner similar to that of the first preferred embodiment. The operations of signal communications with the external control circuit 50 and so on in this case are quite the same as those of the first preferred embodiment.

Seventh Preferred Embodiment

Figure 11:
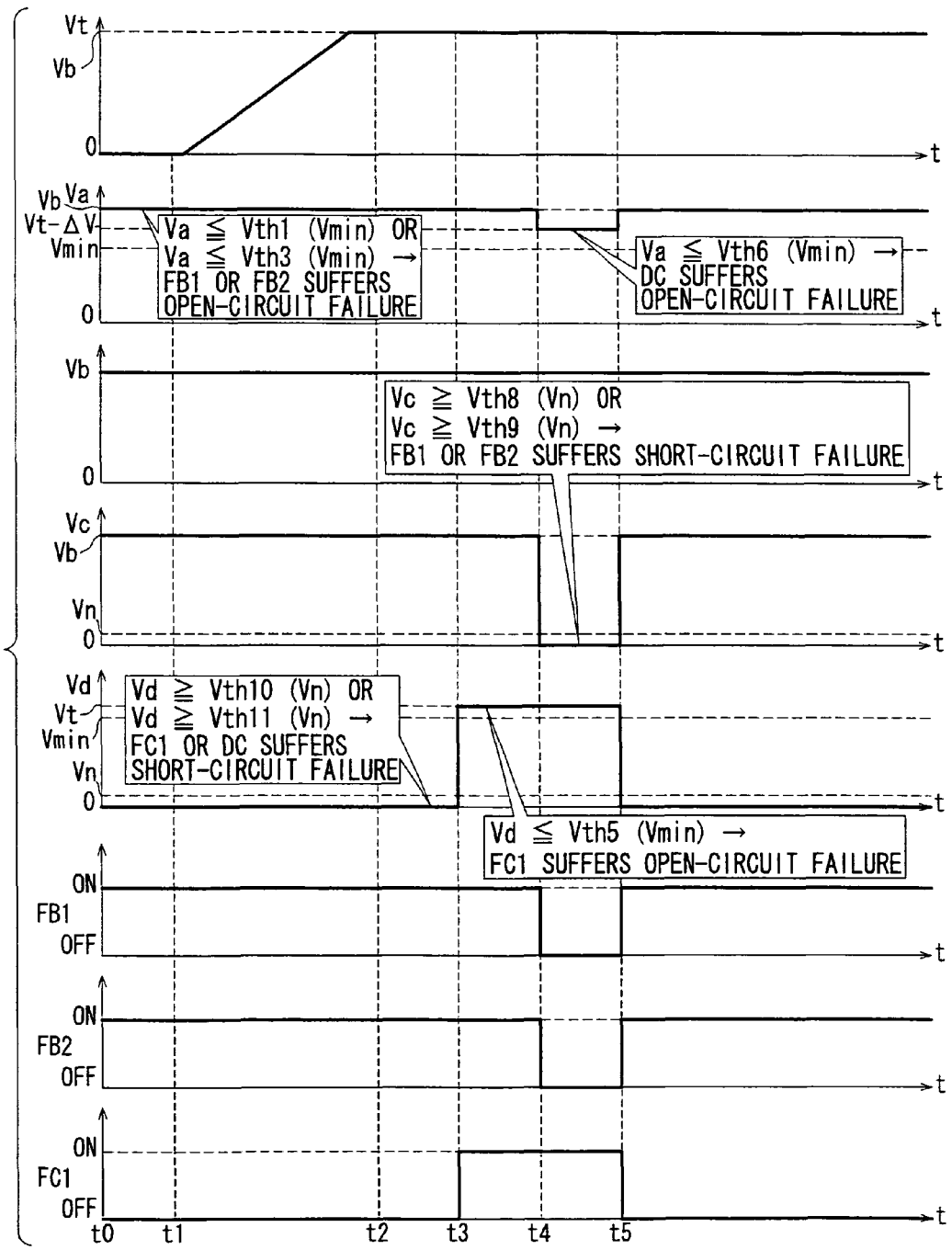
FIG. 11 is a timing chart of respective voltages upon failure judgments of an electrical storage apparatus according to a seventh preferred embodiment of the present invention.

FIG. 11 is a timing chart of respective voltages upon failure judgments of an electrical storage apparatus according to the seventh preferred embodiment of the present invention. Since the configuration of the electrical storage apparatus 11 according to the seventh preferred embodiment is the same as that of FIG. 9, no description is provided for the structure, and a failure judgment method which is the features of the seventh preferred embodiment will be described.

The failure judgments of the first bypass FET FB1, the second bypass FET FB2, the first main path FET FC1 and the main path diode DC can be made by the following combinations of conditions including the method of the sixth preferred embodiment. It is noted that the FETs which are not particularly described may be either on or off. Moreover, when plural conditions are described, any one of the conditions is used.

(1) When a judgment of the open-circuit failure of the first bypass FET FB1 is made:

(1-1) It is judged that the first bypass FET FB1 suffers an open-circuit failure if the voltage Va of the load 15 is equal to or smaller than a first threshold value Vth1 or if the voltage Vc at the connection point between the first bypass FET FB1 and the second bypass FET FB2 is equal to or smaller than a second threshold value Vth2 in such a state that the first bypass FET FB1 is turned on and the first main path FET FC1 is turned off.

(2) When a judgment of the open-circuit failure of the second bypass FET FB2 is made:

(2-1) It is judged that the second bypass FET FB2 suffers an open-circuit failure if the voltage Va of the load 15 is equal to or smaller than a third threshold value Vth3 in such a state that the first bypass FET FB1 is turned on and the first main path FET FC1 is turned off.

(2-2) It is judged that the second bypass FET FB2 suffers an open-circuit failure if the voltage Vc at the connection point between the first bypass FET FB1 and the second bypass FET FB2 is equal to or smaller than a fourth threshold value Vth4 in such a state that the first bypass FET FB1 is turned off and the second bypass FET FB2 and the first main path FET FC1 are turned on while or after the electric storage device 21 is charged by the electric charger circuit 19.

(3) When a judgment of the open-circuit failure of the first main path FET FC1 is made:

(3-1) It is judged that the first main path FET FC1 suffers an open-circuit failure if the voltage Vd at the connection point between the first main path FET FC1 and the main path diode DC is equal to or smaller than a fifth threshold value Vth5 in such a state that the first main path FET FC1 is turned on while or after the electric storage device 21 is charged by the electric charger circuit 19.

(4) When a judgment of the open-circuit failure of the main path diode DC is made:

(4-1) It is judged that the main path diode DC suffers an open-circuit failure if the voltage Va of the load 15 is equal to or smaller than a sixth threshold value Vth6 in such a state that the first bypass FET FB1 and the second bypass FET FB2 are turned off and the first main path FET FC1 is turned on while or after the electric storage device 21 is charged by the electric charger circuit 19.

(5) When a judgment of the short-circuit failure of the first bypass FET FB1 is made:

(5-1) It is judged that the first bypass FET FB1 suffers a short-circuit failure if the voltage Vc at the connection point between the first bypass FET FB1 and the second bypass FET FB2 is equal to or larger than an eighth threshold value Vth8 in such a state that the first bypass FET FB1 and the second bypass FET FB2 are turned off.

(5-2) It is judged that the first bypass FET FB1 suffers a short-circuit failure if the voltage Vc at the connection point between the first bypass FET FB1 and the second bypass FET FB2 is equal to or larger than the eighth threshold value Vth8 in such a state that the first bypass FET FB1 and the first main path FET FC1 are turned off.

(6) When a judgment of the short-circuit failure of the second bypass FET FB2 is made:

(6-1) It is judged that the second bypass FET FB2 suffers a short-circuit failure if the voltage Vc at the connection point between the first bypass FET FB1 and the second bypass FET FB2 is equal to or larger than a ninth threshold value Vth9 in such a state that the first bypass FET FB1 and the second bypass FET FB2 are turned off and the first main path FET FC1 is turned on while or after the electric storage device 21 is charged by the electric charger circuit 19.

(7) When a judgment of the short-circuit failure of the first main path FET FC1 is made:

(7-1) It is judged that the first main path FET FC1 suffers a short-circuit failure if the voltage Vd at the connection point between the first main path FET FC1 and the main path diode DC is equal to or larger than a tenth threshold value Vth10 in such a state that the first main path FET FC1 is turned off while or after the electric storage device 21 is charged by the electric charger circuit 19.

(8) When a judgment of the short-circuit failure of the main path diode DC is made:

(8-1) It is judged that the main path diode DC suffers a short-circuit failure if the voltage Vd at the connection point between the first main path FET FC1 and the main path diode DC is equal to or larger than an eleventh threshold value Vth1 in such a state that the first bypass FET FB1 is turned on and the first main path FET FC1 is turned off.

The operation may be done so as to appropriately determine the first threshold value Vth1 to the eleventh threshold value Vth11 in consideration of the state of charge of the electric storage device 21, variations in the characteristics of the FETs and so on during the failure judgments as described in the third preferred embodiment. Moreover, also in the seventh preferred embodiment, the first threshold value Vth1 to the seventh threshold value Vth7 are set to the load driving minimum voltage Vmin, and the eighth threshold value Vth8 to the eleventh threshold value Vth11 are set to the zero proximity threshold value Vn. Moreover, the first threshold value Vth1 to the sixth threshold value Vth6 as described in the sixth preferred embodiment are different from the first threshold value Vth1 to the sixth threshold value Vth6, respectively, as described in the seventh preferred embodiment.

Among the combinations of conditions as described above, an optimal failure judgment operation example will be described with reference to FIG. 11. It is noted that the form of the graphs of FIG. 11 is similar to that of FIG. 10.

First of all, the controller 29 turns on the first bypass FET FB1 and the second bypass FET FB2 and turns off the first main path FET FC1 at the timing t0. Since the state is the same as that at the timing t0 of FIG. 10, it is judged that the first bypass FET FB1 or the second bypass FET FB2 suffers an open-circuit failure if the voltage Va of the load 15 detected by the voltage detector circuit 27 is equal to or smaller than the first threshold value Vth1 (which is set to the load driving minimum voltage Vmin), equal to or smaller than the third threshold value Vth3 (which is set to the load driving minimum voltage Vmin).

When neither the first bypass FET FB1 nor the second bypass FET FB2 suffers an open-circuit failure, the controller 29 charges the electric storage device 21 at the timing t1. In this case, the charging is performed so that the voltage Vt of the electric storage device 21 coincides with the voltage Vb of the main power supply 13 within the charge accuracy of the electric charger circuit 19. Therefore, the voltage Vt of the electric storage device 21 becomes almost equal to the voltage Vb of the main power supply 13 at the timing t2 after the charging as shown in FIG. 11.

Next, at the timing t2 after the electric storage device 21 is charged, the controller 29 turns on the first bypass FET FB1 and the second bypass FET FB2 and turns off the first main path FET FC1. Since this state is the same as that at the timing t0, the controller 29 needs not perform the on/off control of the FETs at the timing t2 in the seventh preferred embodiment.

The states of the FETs are the same as those at the timing t3 to the timing t4 of FIG. 10. Therefore, in a manner similar to that of the sixth preferred embodiment, it is judged that the first main path FET FC1 or the main path diode DC suffers a short-circuit failure if the voltage Vd at the connection point between the first main path FET FC1 and the main path diode DC, which is detected by the voltage detector circuit 27, is equal to or larger than the tenth threshold value Vth10 (which is set to the zero proximity threshold voltage Vn), equal to or larger than the eleventh threshold value Vth11 (which is set to the zero proximity threshold voltage Vn).

Next, the controller 29 reads out the information of the voltage Vb of the main power supply 13 from the voltage detector circuit 27 and reads out the information of the voltage Vt of the electric storage device 21 from the electric charger circuit 19 at the timing t3. In this case, it is judged whether or not the voltage Vb of the main power supply 13 is equal to or larger than the voltage difference ($=Vt-\Delta V$) between the voltage Vt of the electric storage device 21 and the voltage drop $\Delta V$. It is noted that the voltage drop $\Delta V$ represents both of one caused due to the parasitic diode 35c and another one caused due to the main path diode DC, and the voltage drop $\Delta V$ is consistently equal in the seventh preferred embodiment. Since a current flows backward from the electric storage device 21 to the main power supply 13 when the FETs are controlled at the timing t3 if the voltage Vb is smaller than the difference, and the judgment is made in order to avoid this occurrence.

Upon judging that the voltage Vb is equal to or larger than the voltage difference (Vt−ΔV), the controller 29 turns on the first bypass FET FB1, the second bypass FET FB2 and the first main path FET FC1. However, since the first bypass FET FB1 and the second bypass FET FB2 have been already turned on from the timing t2 to the timing t3 of FIG. 11, it is turned only necessary to turn on the first main path FET FC1 in the seventh preferred embodiment. By this operation, the voltage Vd at the connection point between the first main path FET FC1 and the main path diode DC rises up to the voltage Vt of the electric storage device 21 if the first main path FET FC1 is normal. Therefore, it is judged that the first main path FET FC1 suffers an open-circuit failure if the voltage Vd at the connection point between the first main path FET FC1 and the main path diode DC, which is detected by the voltage detector circuit 27, is equal to or smaller than the fifth threshold value Vth5 (which is set to the load driving minimum voltage Vmin).

Next, the controller 29 reads out the information of the voltage Vb of the main power supply 13 from the voltage detector circuit 27 and reads out the information of the voltage Vt of the electric storage device 21 from the electric charger circuit 19 at the timing t4. In this case, it is judged whether or not the voltage Vb of the main power supply 13 is equal to or larger than a difference (=Vt−ΔV×2) between the voltage Vt of the electric storage device 21 and the voltage drop (ΔV×2) due to the parasitic diode 35c and the main path diode DC. If the voltage Vb of the main power supply 13 is smaller than the difference (=Vt−ΔV×2) between the voltage Vt of the electric storage device 21 and the voltage drop (ΔV×2) due to the parasitic diode 35c and the main path diode DC, a current suddenly flows from the main power supply 13 to the electric storage device 21 if the second bypass FET FB2 suffers a short-circuit failure when the FETs are controlled at the timing t4, and the judgment is made in order to avoid this occurrence. Upon judging that the voltage Vb of the main power supply 13 is equal to or larger than the difference (=Vt−ΔV×2) between the voltage Vt of the electric storage device 21 and the voltage drop (ΔV×2) due to the parasitic diode 35c and the main path diode DC, the controller 29 turns off the first bypass FET FB1 and the second bypass FET FB2, and turns on the first main path FET FC1. However, since the first main path FET FC1 has been already turned on from the timing t3 to the timing t4 of FIG. 11, it is turned only necessary to turn off the first bypass FET FB1 and the second bypass FET FB2 in the seventh preferred embodiment. By this operation, if the main path diode DC is normal, the voltage Vd at the connection point between the first main path FET FC1 and the main path diode DC becomes almost equal to the voltage Vt of the electric storage device 21. Therefore, it is judged that the main path diode DC suffers an open-circuit failure if the voltage Va of the load 15 detected by the voltage detector circuit 27 is equal to or smaller than the sixth threshold value Vth6 (which is set to the load driving minimum voltage Vmin).

Next, the controller 29 makes a judgment of the short-circuit failure of the first bypass FET FB1 and the second bypass FET FB2 subsequently to the aforementioned judgment. In this case, by first reading the voltage Vb of the main power supply 13 from the voltage detector circuit 27 and reading the voltage Vt of the electric storage device 21 from the electric charger circuit 19, it is judged whether or not the voltage Vb of the main power supply 13 is equal to or larger than the difference (=Vt−ΔV×2) between the voltage Vt of the electric storage device 21 and the voltage drop (ΔV×2) due to the parasitic diode 35c and the main path diode DC. The judgment has been already made at the timing t4. Further, upon judging that the voltage Vb of the main power supply 13 is equal to or larger than the difference (=Vt−ΔV×2) between the voltage Vt of the electric storage device 21 and the voltage drop (ΔV×2) due to the parasitic diode 35c and the main path diode DC, the controller 29 turns off the first bypass FET FB1 and the second bypass FET FB2 and turns on the first main path FET FC1. Since the state has been already established, the following judgment operation is subsequently performed. That is, since the first bypass FET FB1 and the second bypass FET FB2 are turned off, if these FETs are normal, the voltage Vc at the connection point between the first bypass FET FB1 and the second bypass FET FB2, which is detected by the voltage detector circuit 27, becomes close to 0 V by the voltage detector circuit 27. If the voltage is equal to or larger than the eighth threshold value Vth8 (which is set to the zero proximity threshold voltage Vn), equal to or larger than the ninth threshold value Vth9 (which is set to the zero proximity threshold voltage Vn), it is judged that the first bypass FET FB1 or the second bypass FET FB2 suffers a short-circuit failure. Since the first main path FET FC1 is turned on, the voltage Va of the load 15 at the timing t4 to the timing t5 becomes a voltage (=Vt−ΔV) lowered by the voltage drop ΔV of the main path diode DC from the voltage Vt of the electric storage device 21.

The failure judgments are thus ended. Therefore, after the first bypass FET FB1 and the second bypass FET FB2 are turned on and the first main path FET FC1 is turned off at the timing t5, the normal operation state is established.

By thus performing the failure judgment operation, the judgments of the open-circuit failure and the short-circuit failure of the three FETs and the main path diode DC can be made, and as is apparent from FIG. 11, it can be understood that the voltage Va of the load 15 scarcely fluctuates as a whole although the voltage value slightly rises at the timing t4 to the timing t5 in comparison with FIG. 10 even when the failure judgment is made. Therefore, a voltage more stable than in the sixth preferred embodiment can be supplied to the load 15 during the failure judgments. Furthermore, since the failure judgments are ended by the timing t5, the failure judgments can be made faster than in the sixth preferred embodiment.

By the operation of the electrical storage apparatus constructed as above, the judgments of the short-circuit failure and the open-circuit failure of the three FETs and the main path diode DC can be quickly made on the basis of the voltage Va of the load 15, the voltage Vc at the connection point between the first bypass FET FB1 and the second bypass FET FB2 and the voltage Vd at the connection point between the first main path FET FC1 and the main path diode DC in such a state that the fluctuation of the voltage supplied to the load 15 is reduced by arbitrarily controlling turning on/off of the first bypass FET FB1, the second bypass FET FB2 and the first main path FET FC1 within the limited conditions. Therefore, the electrical storage apparatus that has higher reliability can be provided.

In a manner similar to that of the second preferred embodiment, the controller 29 makes a judgment of the open-circuit failure of the first bypass FET FB1 and the second bypass FET FB2 after the startup of the vehicle, thereafter makes the remaining failure judgments after the electric storage device 21 is charged and performs control so that the first bypass FET FB1 and the second bypass FET FB2 are turned off and the first main path FET FC1 is turned on upon making a judgment of the short-circuit failure of the first bypass FET FB1 (from the timing t4 to the timing t5) also in the seventh preferred embodiment. By this operation, the failure judgments of the three FETs and the main path diode DC can be made without interrupting the power supply to the load 15.

Moreover, the failure judgments may be made after the use of the vehicle in a manner similar to that of the first preferred embodiment. The operations of signal communications with the external control circuit 50 and so on in this case are quite the same as those of the first preferred embodiment.

Eighth Preferred Embodiment

Figure 12:
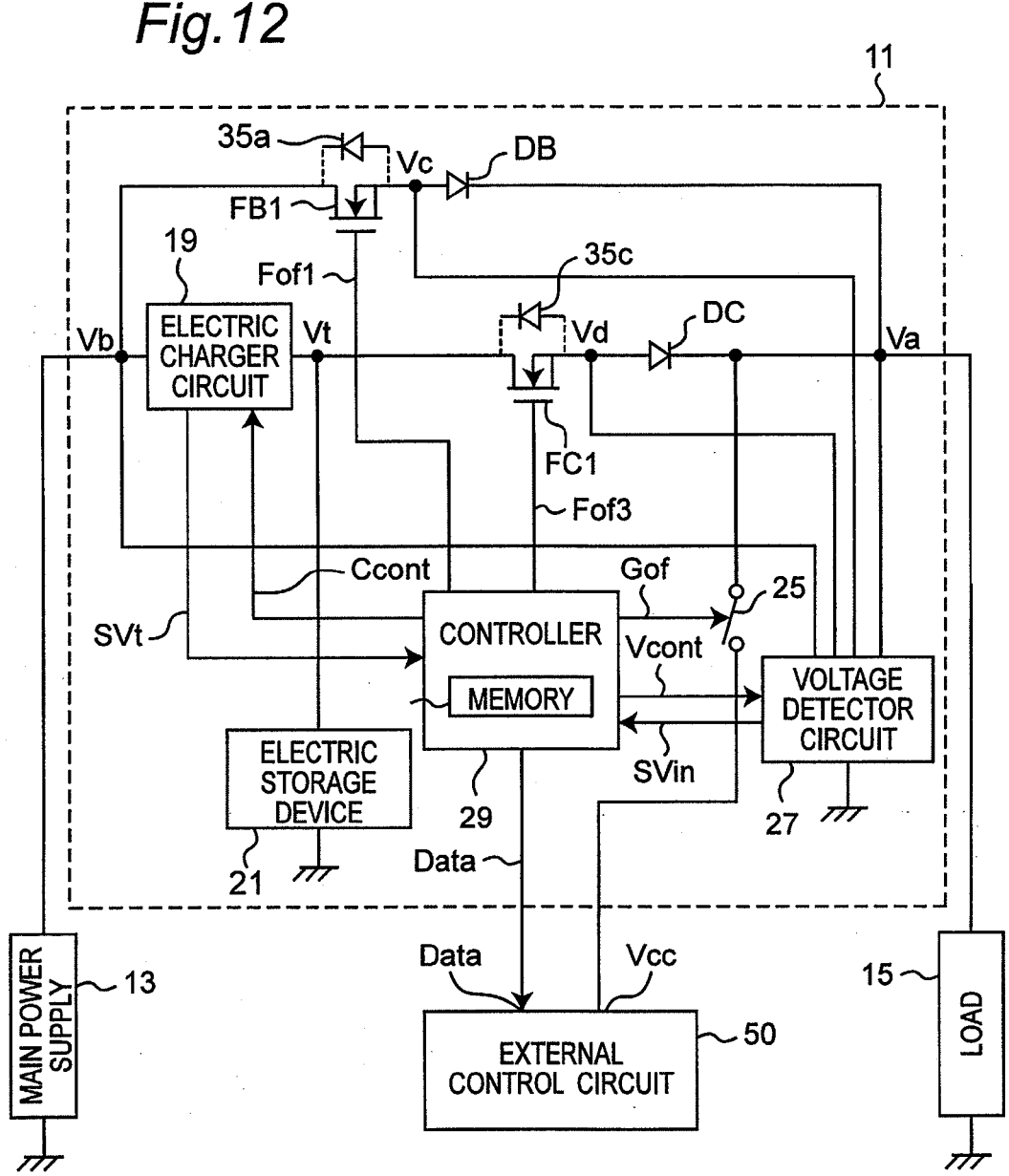
FIG. 12 is a block diagram of an electrical storage apparatus according to an eighth preferred embodiment of the present invention.
Figure 13:
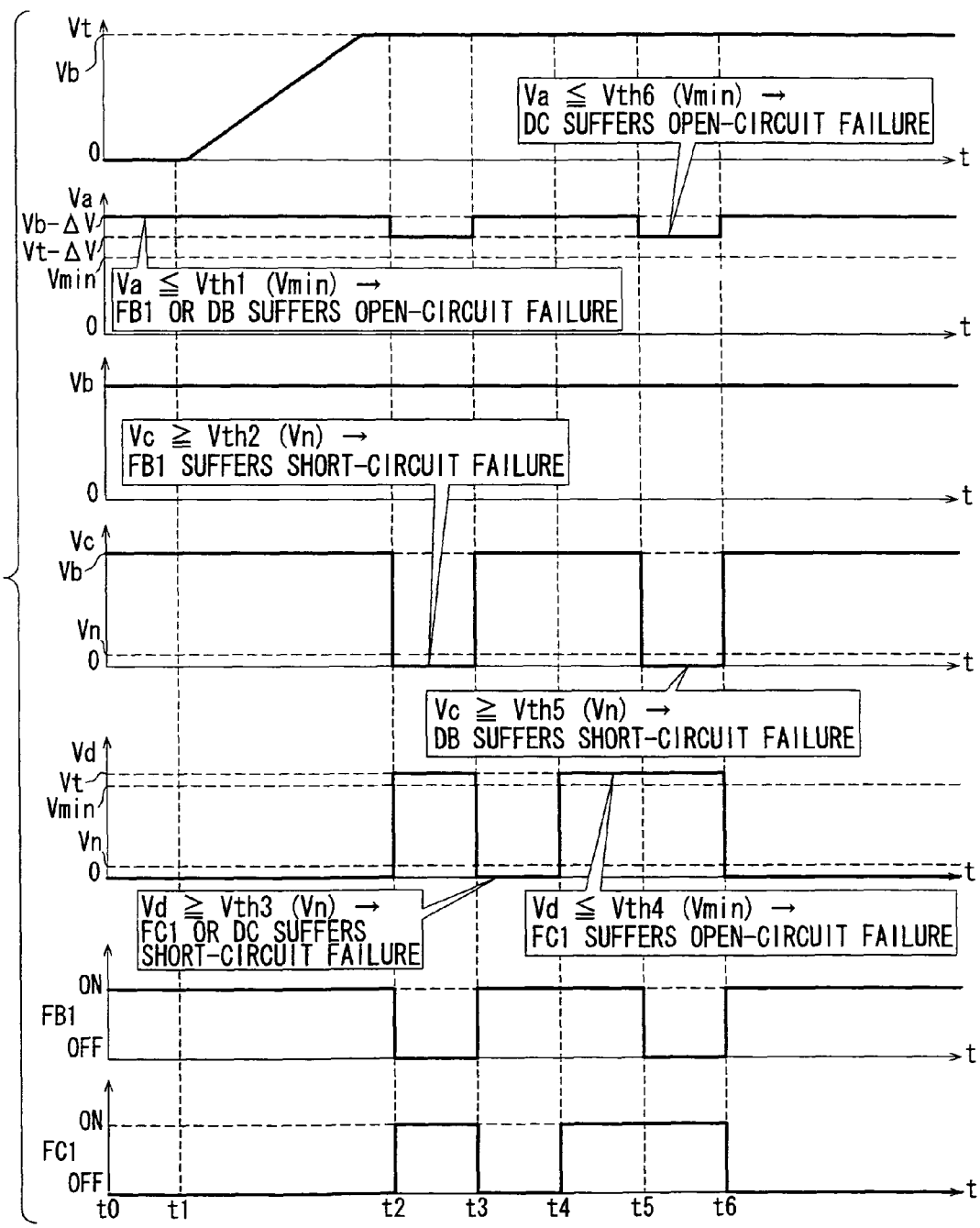
FIG. 13 is a timing chart of respective voltages upon failure judgments of the electrical storage apparatus according to the eighth preferred embodiment of the present invention.

FIG. 12 is a block diagram of an electrical storage apparatus according to the eighth preferred embodiment of the present invention. FIG. 13 is a timing chart of respective voltages upon failure judgments of the electrical storage apparatus according to the eighth preferred embodiment of the present invention. In the configuration of the eighth preferred embodiment in FIG. 12, components similar to those of the configurations of FIGS. 6 and 9 are denoted by the same reference numerals, and no detailed description is provided therefor. That is, the configuration of the eighth preferred embodiment differs from the configuration of the second preferred embodiment in the following points.

(1) A bypass diode DB having an anode connected to the first bypass FET FB1 and a cathode connected to the load 15 is provided in place of the second bypass FET FB2. Therefore, the first bypass FET FB1 and the bypass diode DB are connected in series.

(2) A main path diode DC having an anode connected to the first main path FET FC1 and a cathode connected to the load 15 is provided in place of the second main path FET FC2. Therefore, the first main path FET FC1 and the main path diode DC are connected in series.

(3) The controller 29 is constructed to transmit on/off control signals Fof1 and Fof3 in order to independently control turning on/off of the two FETs of the first bypass FET FB1 and the first main path FET FC1, respectively.

Providing the two diodes of the bypass diode DB and the main path diode DC as described above obviates the need for the second bypass FET FB2, the second main path FET FC2 and the control of the same, and therefore, a configuration simpler than those of the second to fourth preferred embodiments results.

The operation of the electrical storage apparatus 11 as described above will be described next. The fundamental operation is almost the same as that of the second preferred embodiment, and it may be done so as to turn on/off only the first bypass FET FB1 for the on/off control of the power supply directly from the main power supply 13 to the load 15 and to turn on/off only the first main path FET FC1 for the on/off control of the power supply from the electric storage device 21 to the load 15.

The failure judgment operation of the two FETs and the two diodes of the switchover circuit part will be described next with reference to FIG. 13. In FIG. 13, the horizontal axis represents the time, and the vertical axis represents the voltage Vt of the electric storage device 21, the voltage Va of the load 15, the voltage Vb of the main power supply 13, the voltage Vc at the connection point between the first bypass FET FB1 and the bypass diode DB, and the voltage Vd at the connection point between the first main path FET FC1 and the main path diode DC in an order from the top thereof. Moreover, in FIG. 13, the bottom two graphs indicate the timing chart of the two FETs.

The controller 29 turns on the first bypass FET FB1 and turns off the first main path FET FC1 at the timing t0. By this operation, the power of the main power supply 13 is supplied to the load 15. Assuming that the on/off setting of the first bypass FET FB1 is made normally on, and the on/off setting of the first main path FET FC1 is made normally off, then it is allowed to turn on the first bypass FET FB1 and to turn off the first main path FET FC1 from the startup time.

In this state, the voltage Va of the load 15 is detected by the voltage detector circuit 27. If the first bypass FET FB1 and the bypass diode DB are normal, then the voltage Va becomes equal to the value (Vb−ΔV) obtained by subtracting the voltage drop ΔV of the bypass diode DB from the voltage Vb of the main power supply 13. Therefore, it is judged that the first bypass FET FB1 or the bypass diode DB suffers an open-circuit failure if the voltage Va of the load 15 is equal to or smaller than a first threshold value Vth1 (which is set to the load driving minimum voltage Vmin also in the eighth preferred embodiment).

If neither the first bypass FET FB1 nor the bypass diode DB suffers an open-circuit failure, the controller 29 charges the electric storage device 21 at the timing t1. At the timing t2 after the charging, the controller 29 turns off the first bypass FET FB1 and turns on the first main path FET FC1. By this operation, the power of the electric storage device 21 is supplied to the load 15. However, the voltage Va is lowered by the voltage drop ΔV of the main path diode DC from the voltage Vt of the electric storage device 21 by way of the main path diode DC, whereas the load 15 can be continuously driven. If the first bypass FET FB1 is normally off in this state, the voltage Vc at the connection point between the first bypass FET FB1 and the bypass diode DB, which is detected by the voltage detector circuit 27, becomes close to 0 V. If the voltage is equal to or larger than a second threshold value Vth2 (which is set to the zero proximity threshold voltage Vn also in this case), it is judged that the first bypass FET FB1 suffers a short-circuit failure. The failure judgment can be made even when the first main path FET FC1 is turned off, and the power supply to the load 15 is interrupted during the failure judgment in this case. Moreover, the failure judgment is made after the electric storage device 21 is charged, and this is intended to continue supplying the power of the electric storage device 21 to the load 15 during the failure judgment. The failure judgment may be made before the electric storage device 21 is charged when the power supply to the load 15 may be interrupted.

Next, the controller 29 turns on the first bypass FET FB1 and turns off the first main path FET FC1 at the timing t3. By this operation, the power of the main power supply 13 is resupplied to the load 15. At this time, since the electric storage device 21 is in the charged state, if the first main path FET FC1 is normally in the off state and the main path diode DC is normal, the voltage Vd at the connection point between both of them becomes close to 0 V. However, the voltage Vd becomes the voltage Vt of the electric storage device 21 if the first main path FET FC1 suffers a short-circuit failure, and the voltage Vd becomes the voltage Va of the load 15 if the main path diode DC suffers a short-circuit failure. Therefore, if the voltage Vd at the connection point between the first main path FET FC1 and the main path diode DC, which is detected by the voltage detector circuit 27, is equal to or larger than a third threshold value Vth3 (which is set to the zero proximity threshold voltage Vn) in the aforementioned states of the two FETs, it is judged that the first main path FET FC1 or the main path diode DC suffers a short-circuit failure.

Next, the controller 29 turns on the first main path FET FC1 at the timing t4. By this operation, if the first main path FET FC1 is normal, the voltage Vd at the connection point between the first main path FET FC1 and the main path diode DC rises up to the voltage Vt of the electric storage device 21. Therefore, it is judged that the first main path FET FC1 suffers an open-circuit failure if the voltage Vd at the connection point between the first main path FET FC1 and the main path diode DC, which is detected by the voltage detector circuit 27, is equal to or smaller than a fourth threshold value Vth4 (which is set to the load driving minimum voltage Vmin also in this case).

Next, the controller 29 turns off the first bypass FET FB1 at the timing t5. At this time, since the first main path FET FC1 is turned on from the timing t4 to the timing t5, the power of the electric storage device 21 is supplied to the load 15. However, since the voltage drop ΔV of the main path diode DC is caused by way of the main path diode DC, the voltage Va of the load 15 becomes the voltage difference (Vt−ΔV). In this state, the first bypass FET FB1 is normally off, and if the bypass diode DB is normal, the voltage Vc at the connection point between both of them becomes close to 0 V. Therefore, the voltage Va of the load 15 enters the connection point if the voltage Vc at the connection point between the first bypass FET FB1 and the bypass diode DB, which is detected by the voltage detector circuit 27, is equal to or larger than a fifth threshold value Vth5 (which is set to the zero proximity threshold voltage Vn), and therefore, it is judged that the bypass diode DB suffers a short-circuit failure. It is noted that the conditions to make a judgment of the short-circuit failure need to turn off the first bypass FET FB1 and to turn on the first main path FET FC1. Moreover, since the states of two FETs upon making the failure judgment is quite the same in a manner similar to that of the case of the timing t2 to the timing t3, the failure judgments of both of them may be simultaneously made as described in the second preferred embodiment. In this case, it is judged that the first bypass FET FB1 or the bypass diode DB suffers a short-circuit failure if the voltage Vc is equal to or larger than the second threshold value Vth2 (=fifth threshold value Vth5=Vn). However, when the failure judgment from the timing t2 to the timing t3 is made before the electric storage device 21 is charged, the judgments of the short-circuit failure of the first bypass FET FB1 and the bypass diode DB need to be separately made.

Moreover, the power of the electric storage device 21 is supplied to the load 15 in the state from the timing t5 to the timing t6. Therefore, since the first main path FET FC1 is normal from the timing t5 to the timing t6 as the result of the failure judgments that have been made, the voltage Va of the load 15 becomes the voltage difference (Vt−ΔV) if the main path diode DC is normal. Therefore, the controller 29 judges that the main path diode DC suffers an open-circuit failure if the voltage Va of the load 15 detected by the voltage detector circuit 27 is equal to or smaller than the sixth threshold value Vth6 (which is set to the load driving minimum voltage Vmin also in this case).

As is apparent from the above, a judgment of the short-circuit failure of the bypass diode DB and a judgment of the open-circuit failure of the main path diode DC are simultaneously made from the timing t5 to the timing t6. Further, since the failure judgment from the timing t2 to the timing t3 can be simultaneously made as described above, the failure judgment can be made in a shorter time.

The failure judgments are thus ended. Therefore, after the first bypass FET FB1 is turned on and the first main path FET FC1 is turned off at the timing t6, the normal operation state is established.

By the operation of the electrical storage apparatus constructed as above, the judgments of the short-circuit failure and the open-circuit failure of the two FETs and the two diodes can be made on the basis of the voltage Va of the load, the voltage Vc at the connection point between the first bypass FET FB1 and the bypass diode DB, and the voltage Vd at the connection point between the first main path FET FC1 and the main path diode DC when the first bypass FET FB1 and the first main path FET FC1 of the switchover circuit part are controlled to be turned on/off. Therefore, the electrical storage apparatus that has higher reliability can be provided.

As described in the eighth preferred embodiment, the controller 29 makes a judgment of the open-circuit failure of the first bypass FET FB1 or the bypass diode DB after the startup of the vehicle, thereafter makes the remaining failure judgments after the electric storage device 21 is charged and performs control so that the first main path FET FC1 is turned on when making a judgment of the short-circuit failure of the first bypass FET FB1. By this operation, the failure judgments of the two FETs and the two diodes can be made without interrupting the power supply to the load 15.

Moreover, the failure judgments may be made after the use of the vehicle in a manner similar to that of the first preferred embodiment. The operations of signal communications with the external control circuit 50 and so on in this case are quite the same as those of the first preferred embodiment.

Ninth Preferred Embodiment

Figure 14:
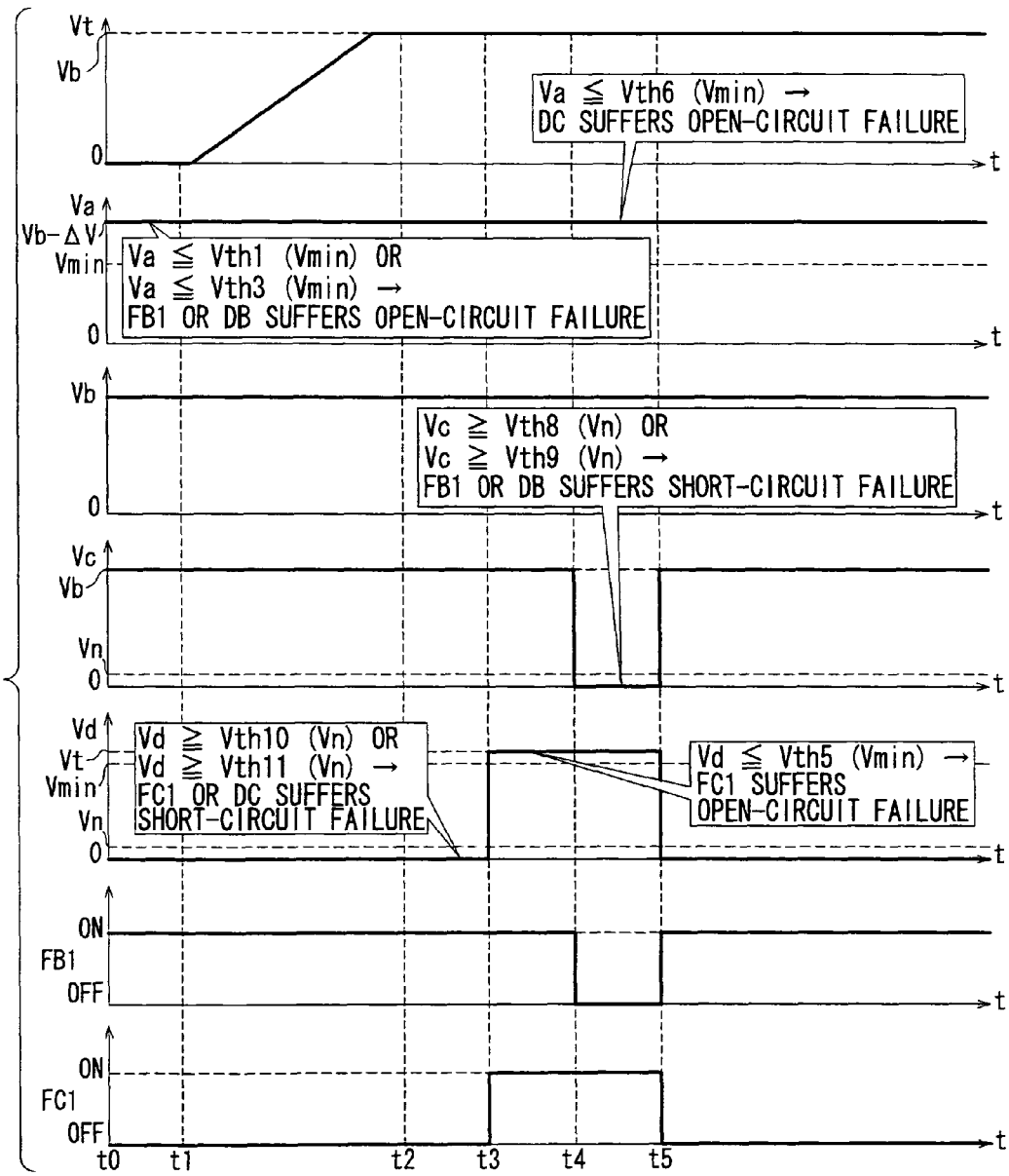
FIG. 14 is a timing chart of respective voltages upon failure judgments of an electrical storage apparatus according to a ninth preferred embodiment of the present invention.

FIG. 14 is a timing chart of respective voltages upon failure judgments of an electrical storage apparatus according to the ninth preferred embodiment of the present invention. Since the configuration of the electrical storage apparatus 11 according to the ninth preferred embodiment is the same as that of FIG. 12, no description is provided for the structure, and a failure judgment method which is the features of the ninth preferred embodiment will be described.

The failure judgments of the first bypass FET FB1, the bypass diode DB, the first main path FET FC1 and the main path diode DC can be made by the following combinations of conditions including the method of the eighth preferred embodiment. It is noted that the FETs which are not particularly described may be either on or off. Moreover, when plural conditions are described, any one of the conditions may be used.

(1) When a judgment of the open-circuit failure of the first bypass FET FB1 is made:

(1-1) It is judged that the first bypass FET FB1 suffers an open-circuit failure if the voltage Va of the load 15 is equal to or smaller than a first threshold value Vth1 in such a state that the first bypass FET FB1 is turned on and the first main path FET FC1 is turned off or if the voltage Vc at the connection point between the first bypass FET FB1 and the bypass diode DB is equal to or smaller than a second threshold value Vth2 in such a state that the first bypass FET FB1 is turned on.

(2) When a judgment of the open-circuit failure of the bypass diode DB is made:

(2-1) It is judged that the bypass diode DB suffers an open-circuit failure if the voltage Va of the load 15 is equal to or smaller than a third threshold value Vth3 in such a state that the first bypass FET FB1 is turned on and the first main path FET FC1 is turned off.

(3) When a judgment of the open-circuit failure of the first main path FET FC1 is made:

(3-1) It is judged that the first main path FET FC1 suffers an open-circuit failure if the voltage Vd at the connection point between the first main path FET FC1 and the main path diode DC is equal to or smaller than a fifth threshold value Vth5 in such a state that the first main path FET FC1 is turned on while or after the electric storage device 21 is charged by the electric charger circuit 19.

(4) When a judgment of the open-circuit failure of the main path diode DC is made:

(4-1) It is judged that the main path diode DC suffers an open-circuit failure if the voltage Va of the load 15 is equal to or smaller than a sixth threshold value Vth6 in such a state that the first bypass FET FB1 is turned off and the first main path FET FC1 is turned on while or after the electric storage device 21 is charged by the electric charger circuit 19.

(5) When a judgment of the short-circuit failure of the first bypass FET FB1 is made:

(5-1) It is judged that the first bypass FET FB1 suffers a short-circuit failure if the voltage Vc at the connection point between the first bypass FET FB1 and the bypass diode DB is equal to or larger than an eighth threshold value Vth8 in such a state that the first bypass FET FB1 is turned off.

(6) When a judgment of the short-circuit failure of the bypass diode DB is made:

(6-1) It is judged that the bypass diode DB suffers a short-circuit failure if the voltage Vc at the connection point between the first bypass FET FB1 and the bypass diode DB is equal to or larger than a ninth threshold value Vth9 in such a state that the first bypass FET FB1 is turned off and the first main path FET FC1 is turned on while or after the electric storage device 21 is charged by the electric charger circuit 19.

(7) When a judgment of the short-circuit failure of the first main path FET FC1 is made:

(7-1) It is judged that the first main path FET FC1 suffers a short-circuit failure if the voltage Vd at the connection point between the first main path FET FC1 and the main path diode DC is equal to or larger than a tenth threshold value Vth10 in such a state that the first main path FET FC1 is turned off while or after the electric storage device 21 is charged by the electric charger circuit 19.

(8) When a judgment of the short-circuit failure of the main path diode DC is made:

(8-1) It is judged that the main path diode DC suffers a short-circuit failure if the voltage Vd at the connection point between the first main path FET FC1 and the main path diode DC is equal to or larger than an eleventh threshold value Vth11 in such a state that the first bypass FET FB1 is turned on and the first main path FET FC1 is turned off.

The operation may be done so as to appropriately determine the first threshold value Vth1 to the eleventh threshold value Vth11 in consideration of the state of charge of the electric storage device 21, variations in the characteristics of the FETs and so on during the failure judgments as described in the third preferred embodiment. In addition, in the ninth preferred embodiment, the first threshold value Vth1 to the seventh threshold value Vth7 are set to the load driving minimum voltage Vmin, and the eighth threshold value Vth8 to the eleventh threshold value Vth11 are set to the zero proximity threshold value Vn. Moreover, the first threshold value Vth1 to the sixth threshold value Vth6 as described in the eighth preferred embodiment are different from the first threshold value Vth1 to the sixth threshold value Vth6, respectively, as described in the ninth preferred embodiment.

Among the combinations of conditions as described above, an optimal failure judgment operation example will be described with reference to FIG. 14. It is noted that the form of the graphs of FIG. 14 is similar to that of FIG. 13.

First of all, the controller 29 turns on the first bypass FET FB1 and turns off the first main path FET FC1 at the timing t0. Since the state is the same as that at the timing t0 of FIG. 13, it is judged that the first bypass FET FB1 or the bypass diode DB suffers an open-circuit failure if the voltage Va of the load 15 detected by the voltage detector circuit 27 is equal to or smaller than a first threshold value Vth1 (which is set to the load driving minimum voltage Vmin), equal to or smaller than a third threshold value Vth3 (which is set to the load driving minimum voltage Vmin).

When neither the first bypass FET FB1 nor the bypass diode DB suffers an open-circuit failure, the controller 29 charges the electric storage device 21 at the timing t1. In this case, the charging is performed so that the voltage Vt of the electric storage device 21 coincides with the voltage Vb of the main power supply 13 within the charge accuracy of the electric charger circuit 19. Therefore, the voltage Vt of the electric storage device 21 becomes almost equal to the voltage Vb of the main power supply 13 at the timing t2 after the charging as shown in FIG. 14.

Next, at the timing t2 after the electric storage device 21 is charged, the controller 29 turns on the first bypass FET FB1 and turns off the first main path FET FC1. Since the state is the same as that at the timing t0, the on/off control of the FETs at the timing t2 needs not be performed in the ninth preferred embodiment.

The states of the FETs are the same as those at the timing t3 to the timing t4 of FIG. 13. Therefore, in a manner similar to that of the eighth preferred embodiment, it is judged that the first main path FET FC1 or the main path diode DC suffers a short-circuit failure if the voltage Vd at the connection point between the first main path FET FC1 and the main path diode DC, which is detected by the voltage detector circuit 27, is equal to or larger than a tenth threshold value Vth10 (which is set to the zero proximity threshold voltage Vn), equal to or larger than an eleventh threshold value Vth11 (which is set to the zero proximity threshold voltage Vn).

Next, the controller 29 turns on the first bypass FET FB1 and the first main path FET FC1 at the timing t3. However, since the first bypass FET FB1 has been already turned on from the timing t2 to the timing t3 of FIG. 14, it is turned only necessary to turn on the first main path FET FC1 in the ninth preferred embodiment. By this operation, the voltage Vd at the connection point between the first main path FET FC1 and the main path diode DC rises up to the voltage Vt of the electric storage device 21 if the first main path FET FC1 is normal. Therefore, it is judged that the first main path FET FC1 suffers an open-circuit failure if the voltage Vd at the connection point between the first main path FET FC1 and the main path diode DC, which is detected by the voltage detector circuit 27, is equal to or smaller than a fifth threshold value Vth5 (which is set to the load driving minimum voltage Vmin).

Next, the controller 29 reads out the information of the voltage Vb of the main power supply 13 from the voltage detector circuit 27 and reads out the information of the voltage Vt of the electric storage device 21 from the electric charger circuit 19 at the timing t4. In this case, it is judged whether or not the voltage Vb of the main power supply 13 is equal to or larger than the voltage difference ($=Vt-\Delta V \times 2$) between the voltage Vt of the electric storage device 21 and a voltage drop ($\Delta V \times 2$) due to the parasitic diode 35c and the main path diode DC. If the voltage Vb of the main power supply 13 is smaller than the voltage Vt of the electric storage device 21 and the difference ($=Vt-\Delta V \times 2$) between the voltage Vt of the electric storage device 21 and the voltage drop ($\Delta V \times 2$) due to the parasitic diode 35c and the main path diode DC, a current suddenly flows from the main power supply 13 to the electric storage device 21 if the second bypass FET FB2 suffers a short-circuit failure when the FETs are controlled at the timing t4, and therefore, the judgment is made in order to avoid this occurrence. Upon judging that the voltage Vb of the main power supply 13 is equal to or larger than the voltage difference ($=Vt-\Delta V \times 2$) between the voltage Vt of the electric storage device 21 and the voltage drop (ΔV×2) due to the parasitic diode 35c and the main path diode DC, the controller 29 turns off the first bypass FET FB1 and turns on the first main path FET FC1. However, since the first main path FET FC1 has been already turned on from the timing t3 to the timing t4 of FIG. 14, it is turned only necessary to turn off the first bypass FET FB1 in the ninth preferred embodiment. By this operation, if the main path diode DC is normal, the voltage Vd at the connection point between the first main path FET FC1 and the main path diode DC becomes almost equal to the voltage Vt of the electric storage device 21. Therefore, it is judged that the main path diode DC suffers an open-circuit failure if the voltage Va of the load 15 detected by the voltage detector circuit 27 is equal to or smaller than a sixth threshold value Vth6 (which is set to the load driving minimum voltage Vmin).

Next, the controller 29 makes a judgment of the short-circuit failure of the first bypass FET FB1 and the bypass diode DB subsequently to the above judgments. In this case, first of all, the voltage Vb of the main power supply 13 is read from the voltage detector circuit 27 and the voltage Vt of the electric storage device 21 is read from the electric charger circuit 19, and it is judged whether or not the voltage Vb of the main power supply 13 is equal to or larger than the difference (=Vt−ΔV×2) between the voltage Vt of the electric storage device 21 and the voltage drop (ΔV×2) due to the parasitic diode 35c and the main path diode DC. This judgment has been already made at the timing t4. Further, upon judging that the voltage Vb of the main power supply 13 is equal to or larger than the voltage difference (=Vt−ΔV×2) between the voltage Vt of the electric storage device 21 and the voltage drop (ΔV×2) due to the parasitic diode 35c and the main path diode DC, the controller 29 turns off the first bypass FET FB1 and turns on the first main path FET FC1. This has been also already established, and therefore, the following judgment operation is continuously performed. That is, if it is normal, the first bypass FET FB1 is turned off, the voltage Vc at the connection point between first bypass FET FB1 and the bypass diode DB, which is detected by the voltage detector circuit 27, becomes close to 0 V by the voltage detector circuit 27. If the voltage is equal to or larger than an eighth threshold value Vth8 (which is set to the zero proximity threshold voltage Vn), equal to or larger than the ninth threshold value Vth9 (which is set to the zero proximity threshold voltage Vn), it is judged that the first bypass FET FB1 or the bypass diode DB suffers a short-circuit failure. Since the first main path FET FC1 is turned on, the voltage Va of the load 15 from the timing t4 to the timing t5 becomes a voltage (=Vt−ΔV) lowered by the voltage drop ΔV of the main path diode DC from the voltage Vt of the electric storage device 21. The voltage becomes almost equal to the voltage (=Vb−ΔV) before the timing t4 since the charging is performed so that the voltage Vb of the main power supply 13 and the voltage Vt of the electric storage device 21 become almost equal to each other.

The failure judgments are thus ended. Therefore, after the first bypass FET FB1 is turned on and the first main path FET FC1 is turned off at the timing t5, the normal operation state is established.

By thus performing the failure judgment operation, the judgments of the open-circuit failure and the short-circuit failure of the two FETs and the two diodes can be made, and as is apparent from FIG. 14, it can be understood that the voltage Va of the load 15 scarcely fluctuates as a whole in comparison with FIG. 13 even when the failure judgment is made. Therefore, a voltage more stable than in the eighth preferred embodiment can be supplied to the load 15 during the failure judgment. Furthermore, since the failure judgments are ended by the timing t5, the failure judgments can be made faster than in the eighth preferred embodiment.

By the operation of the electrical storage apparatus constructed as above, the judgments of the short-circuit failure and the open-circuit failure of the two FETs and the two diodes can be made on the basis of the voltage Va of the load 15, the voltage Vc at the connection point between the first bypass FET FB1 and the bypass diode DB and the voltage Vd at the connection point between the first main path FET FC1 and the main path diode DC in such a state that the fluctuation of the voltage supplied to the load 15 is reduced by arbitrarily controlling turning on/off of the first bypass FET FB1 and the first main path FET FC1 within the limited conditions. Therefore, an electrical storage apparatus that has still higher reliability can be provided.

In a manner similar to that of the second preferred embodiment, the controller 29 makes a judgment of the open-circuit failure of the first bypass FET FB1 or the bypass diode DB after the startup of the vehicle, thereafter makes the remaining failure judgments after the electric storage device 21 is charged and performs control so that the first bypass FET FB1 is turned off and the first main path FET FC1 is turned on when making a judgment of the short-circuit failure of the first bypass FET FB1 (from the timing t4 to the timing t5) also in the ninth preferred embodiment. By this operation, the failure judgments of the two FETs and the two diodes can be made without interrupting the power supply to the load 15.

Moreover, the failure judgments may be made after the use of the vehicle in a manner similar to that of the first preferred embodiment. The operations of signal communications with the external control circuit 50 and so on in this case are quite the same as those of the first preferred embodiment.

Tenth Preferred Embodiment

Figure 15:
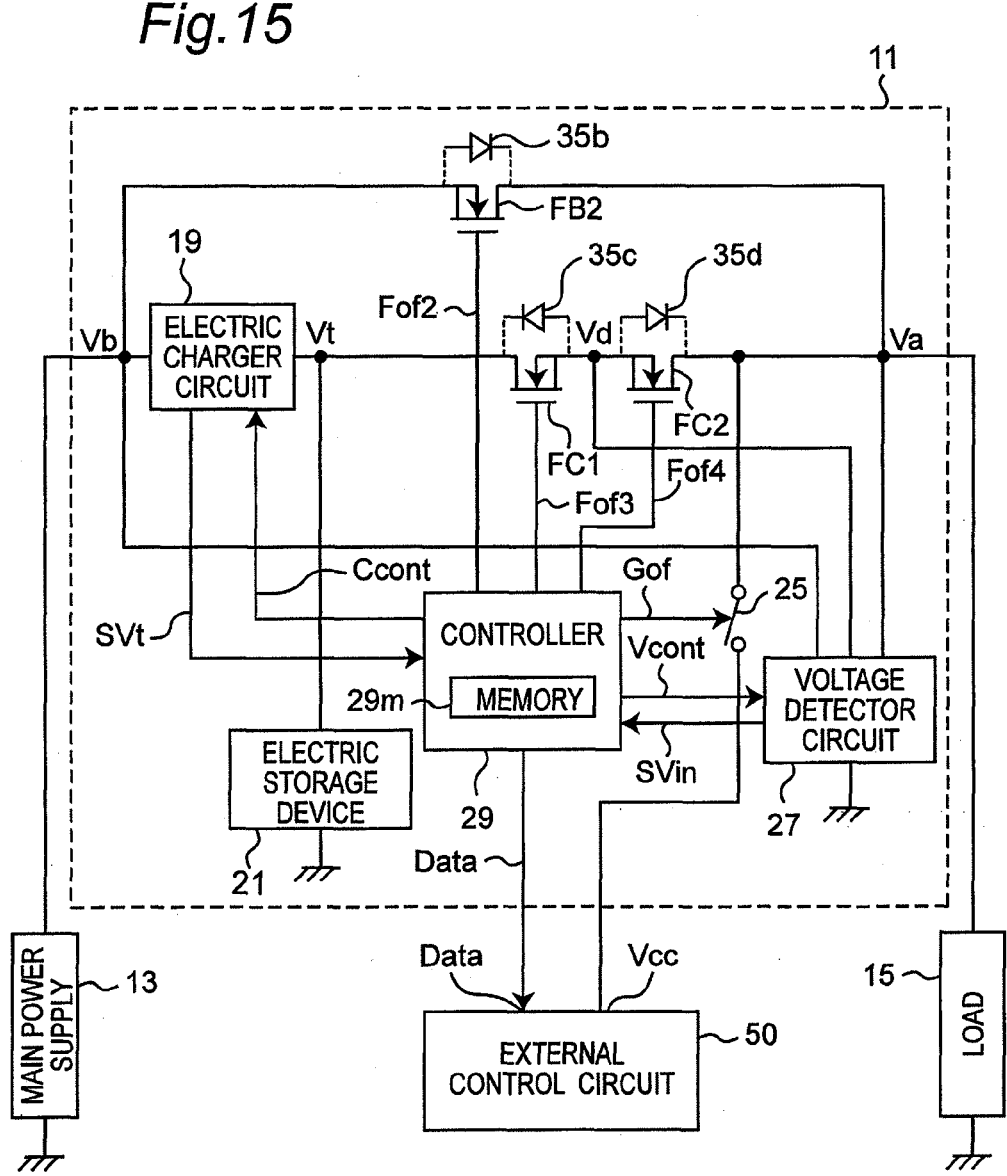
FIG. 15 is a block diagram of an electrical storage apparatus according to a tenth preferred embodiment of the present invention.
Figure 16:
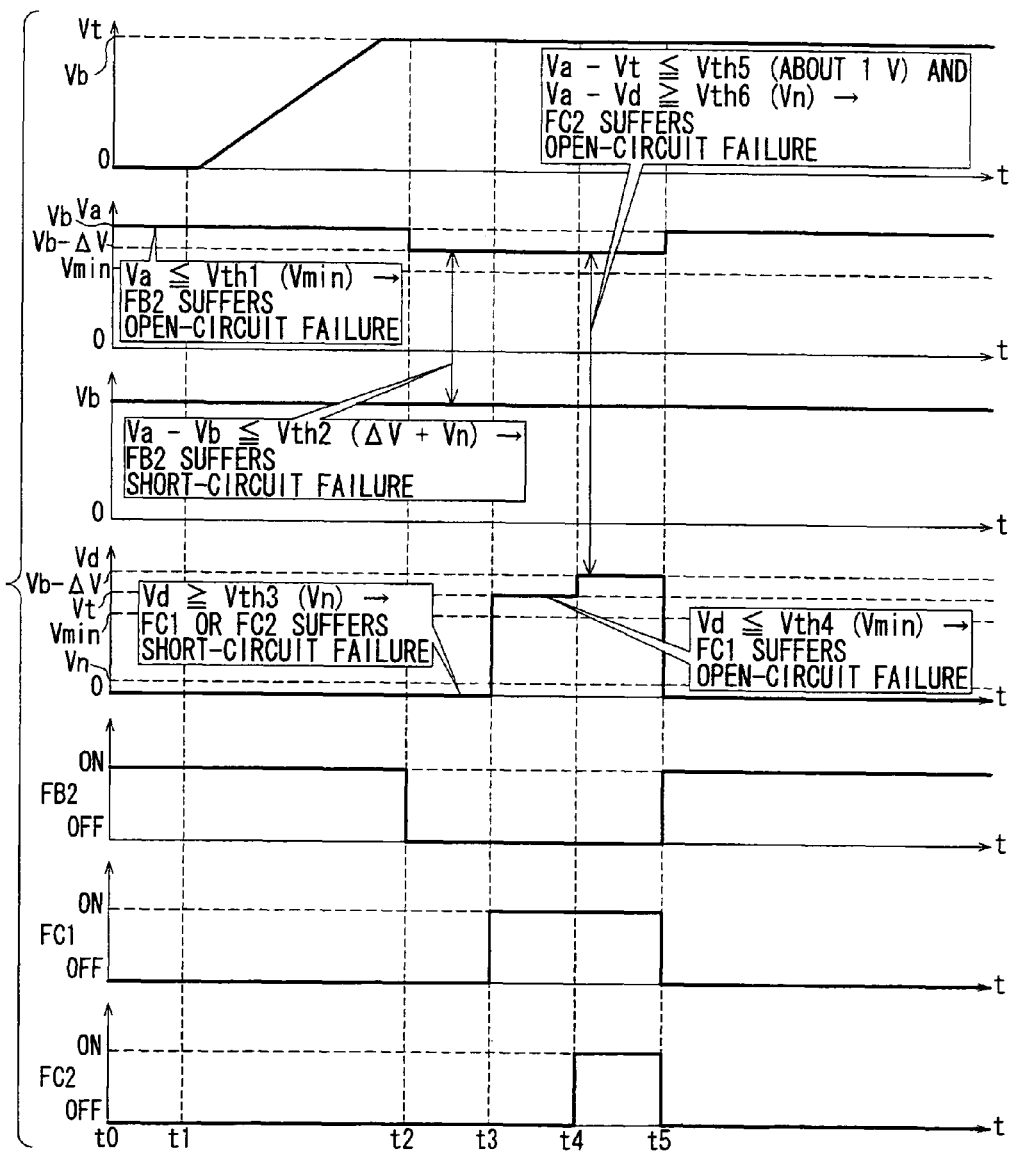
FIG. 16 is a timing chart of respective voltages upon failure judgments of the electrical storage apparatus according to the tenth preferred embodiment of the present invention.

FIG. 15 is a block diagram of an electrical storage apparatus according to the tenth preferred embodiment of the present invention. FIG. 16 is a timing chart of respective voltages upon failure judgments of the electrical storage apparatus according to the tenth preferred embodiment of the present invention. In the configuration of the tenth preferred embodiment of FIG. 15, components similar to those of FIG. 3 are denoted by the same reference numerals, and no detailed description is provided therefor. That is, the features of the tenth preferred embodiment are as follows.

(1) The first bypass FET FB1 is removed.
(2) The signal line of the on/off control signal Fof1 is removed in accordance with it.
(3) Since the voltage Vc of FIG. 3 becomes equal to the voltage Vb in the configuration of FIG. 15, the signal line connected from the voltage detector circuit 27 to detect the voltage Vc is removed.

With this arrangement, a configuration simpler than that of the second preferred embodiment is obtained.

The operation of the electrical storage apparatus 11 will be described next. The fundamental operation is almost the same as that of the second preferred embodiment, and it may be done so as to turn on only the second bypass FET FB2 for the on/off control of power supply directly from the main power supply 13 to the load 15.

Next, the failure judgment operation of three FETs of the switchover circuit part will be described next with reference to FIG. 16. In FIG. 16, the horizontal axis represents the time, and the vertical axis represents the voltage Vt of the electric storage device 21, the voltage Va of the load 15, the voltage Vb of the main power supply 13, and the voltage Vd at the connection point between the first main path FET FC1 and the second main path FET FC2 in an order from the top thereof. Moreover, in FIG. 16, the bottom three graphs indicate the timing chart of the three FETs.

Referring to FIG. 16, the controller 29 turns on the second bypass FET FB2 and turns off the first main path FET FC1 and the second main path FET FC2 at the timing t0. By this operation, the power of the main power supply 13 is supplied to the load 15. Assuming that the on/off setting of the second bypass FET FB2 is made normally on, and the on/off setting of the first main path FET FC1 and the second main path FET FC2 is made normally off, then it is allowed to turn on the second bypass FET FB2 and to turn off the first main path FET FC1 and the second main path FET FC2 from the startup time.

In this state, the voltage Va of the load 15 is detected by the voltage detector circuit 27. If the second bypass FET FB2 is normal, then the voltage Va becomes equal to the voltage Vb of the main power supply 13. Therefore, it is judged that the second bypass FET FB2 suffers an open-circuit failure if the voltage Va of the load 15 is equal to or smaller than a first threshold value Vth1 (which is set to the load driving minimum voltage Vmin also in the tenth preferred embodiment). It is noted that the second bypass FET FB2 may be turned off during the failure judgment. However, since a voltage drop $\Delta V$ ($\approx 0.7$ V) is caused due to the parasitic diode 35$b$ of the second bypass FET FB2 in this case, the voltage Va becomes the voltage difference (Vb−$\Delta V$).

If the second bypass FET FB2 does not suffer an open-circuit failure, the controller 29 charges the electric storage device 21 at the timing t1. The controller 29 turns off the second bypass FET FB2 and the first main path FET FC1 at the timing t2 after the charging. At this time, since the second main path FET FC2 has been already turned off, all the FETs are turned off. In this case, the power of the main power supply 13 is supplied to the load 15 by way of the parasitic diode 35$b$ of the second bypass FET FB2. Therefore, the voltage Va is lowered by the voltage drop $\Delta V$ of the parasitic diode 35$b$ from the voltage Vb of the main power supply 13, whereas the load 15 can be continuously driven. Since the second bypass FET FB2 is turned off in this state, the difference between the voltage Vb of the main power supply 13 and the voltage Va of the load 15, which is detected by the voltage detector circuit 27, ideally becomes $\Delta V$ as described above. However, a voltage value Vn (=about 0.1 V) due to the influences of a leakage current and noises is superimposed as described in the first preferred embodiment. Therefore, the controller 29 obtains a difference between the voltage Va and the voltage Vb and judges that the second bypass FET FB2 suffers a short-circuit failure if the difference is equal to or smaller than a second threshold value Vth2 (which is set to a voltage ($\Delta V$+Vn) in this case for the above reasons). Since the power supply from the main power supply 13 to the load 15 is continued even if the failure judgment is made, the failure judgment may be made before or while the electric storage device 21 is charged.

Moreover, in such a state that all the FETs are turned off from time t2 to time t3, the voltage Vd at the connection point between the first main path FET FC1 and the second main path FET FC2 becomes close to 0 V if they are normal. Therefore, it is judged that the first main path FET FC1 or the second main path FET FC2 suffers a short-circuit failure if the voltage Vd at the connection point between the first main path FET FC1 and the second main path FET FC2, which is detected by the voltage detector circuit 27, is equal to or larger than a third threshold value Vth3 (which is set to the zero proximity threshold voltage Vn also in this case). It is noted that the second bypass FET FB2 may be either on or off during the failure judgment.

Next, the controller 29 turns on the first main path FET FC1 at the timing t3. At this time, since the electric storage device 21 is in the charged state, if the first main path FET FC1 and the second main path FET FC2 are normal, the voltage Vd at the connection point between both of them becomes the voltage Vt of the electric storage device 21. Therefore, it is judged that the first main path FET FC1 suffers an open-circuit failure if the voltage Vd at the connection point between the first main path FET FC1 and the second main path FET FC2, which is detected by the voltage detector circuit 27, is equal to or smaller than a fourth threshold value Vth4 (which is set to the load driving minimum voltage Vmin). If the second main path FET FC2 is turned off and the first main path FET FC1 is turned on during the failure judgment, the second bypass FET FB2 may be either on or off. However, since the power is supplied to the load 15 via the parasitic diode 35$b$ when the second bypass FET FB2 is turned off, the voltage Va of the load 15 becomes the voltage difference (Vb−$\Delta V$).

Next, the controller 29 first takes in the voltage Va of the load 15 and the voltage Vt of the electric storage device 21 at the timing t4 and compares them with each other. Since the three FETs have the same states as those at the timing t3 to the timing t4 at this point of time, the second main path FET FC2 is turned off. Therefore, the voltage Vt of the electric storage device 21 is a full-charge voltage of 12.8 V, and the voltage Va of the load 15 is expressed by the following Equation (1):

$$Va=Vb-\Delta V \approx 14-0.7=13.3 \text{ V} \qquad (1).$$

Therefore, Va−Vt=0.5 V. With this voltage difference, a rush current, which might flow from the load 15 side to the electric storage device 21, is minute even if the second main path FET FC2 is turned on as described later, and influences on the FETs can be reduced. There is no problem if Va−Vt$\leq$1 V (1 V corresponds to the fifth threshold value Vth5 in this case) from the viewpoint of the rush current. Moreover, no rush current flows when the voltage difference (Va−Vt) is negative, i.e., when Vt>Va. For the above reasons, the controller 29 judges whether there is a condition such that the rush current scarcely flows by comparing the present voltage Va of the load 15 with the voltage Vt of the electric storage device 21 and awaits until the condition holds without making the subsequent failure judgments when the voltage Vt of the electric storage device 21 is not sufficiently high in, for example, the initial charging period or the like.

In this case, because Va−Vt=0.5 V, which is equal to or smaller than the fifth threshold value Vth5 as described above, the failure judgment can be made. Accordingly, the controller 29 turns on the second main path FET FC2. By this operation, if the second main path FET FC2 is normal, the voltage Va of the load 15 becomes almost equal to the voltage Vd at the connection point between the first main path FET FC1 and the second main path FET FC2. Therefore, the controller 29 obtains a difference between the voltage Va of the load 15 and the voltage Vd at the connection point between the first main path FET FC1 and the second main path FET FC2 detected by the voltage detector circuit 27 and judges that the second main path FET FC2 suffers an open-circuit failure if the difference is equal to or larger than a sixth threshold value Vth6 (which is set to the zero proximity threshold voltage Vn=0.1 V also in this case in consideration of the influences of the leakage current and noises). It is noted that the other FETs may be either on or off if the second main path FET FC2 is turned on during the failure judgment.

The failure judgments are thus ended. Therefore, after the second bypass FET FB2 is turned on and the first main path FET FC1 and the second main path FET FC2 are turned off at the timing t5, the normal operation state is established.

By the operation of the electrical storage apparatus constructed as above, the judgments of the short-circuit failure and the open-circuit failure of the three FETs can be made on the basis of the voltage Va of the load, the voltage Vb of the main power supply 13 and the voltage Vd at the connection point between the first main path FET FC1 and the second main path FET FC2 when the second bypass FET FB2, the first main path FET FC1 and the second main path FET FC2 of the switchover circuit part are controlled to be turned on/off. Therefore, the electrical storage apparatus that has higher reliability can be provided.

As described in the tenth preferred embodiment, the controller 29 makes a judgment of the open-circuit failure of the second bypass FET FB2 after the startup of the vehicle and thereafter makes the remaining failure judgments after the electric storage device 21 is charged, this leads to that the failure judgments of the three FETs can be made without interrupting the power supply to the load 15.

Moreover, the failure judgment may be made after the use of the vehicle in a manner similar to that of the first preferred embodiment. The operations of signal communications with the external control circuit 50 and so on in this case are quite the same as those of the first preferred embodiment.

Moreover, a configuration in which a bypass diode having an anode connected to the main power supply 13 and a cathode connected to the load 15 is connected in place of the second bypass FET FB2 may be provided. In this case, the failure judgments, which are the same as those described above, correspond to the normally off state in the timing chart of the second bypass FET FB2 of FIG. 16. Therefore, the voltage Va of the load 15 consistently becomes the voltage difference (Vb−ΔV). Moreover, the failure judgment of the bypass diode is made as follows.

First of all, the controller 29 detects the voltage Va of the load 15 and the voltage Vb of the main power supply 13 by the voltage detector circuit 27 in such a state that the first main path FET FC1 and the second main path FET FC2 are turned off (from the timing t0 to the timing t1 of FIG. 16).

Next, it is judged that the bypass diode suffers an open-circuit failure if the voltage Va of the load 15 is equal to or smaller than the first threshold value Vth1 (which is set to the load driving minimum voltage Vmin). At the same time, the difference between the voltage Va of the load 15 and the voltage Vb of the main power supply 13 is obtained, and it is judged that the bypass diode suffers a short-circuit failure if the difference is equal to or smaller than the second threshold value Vth2 (ΔV+Vn).

The above arrangement allows the FETs to be made two in number although the voltage Va of the load 15 is lowered by the voltage drop ΔV of the bypass diode when the power is supplied directly from the main power supply 13 to the load 15, and an electrical storage apparatus 11 of a simple configuration can be provided.

Moreover, a configuration in which a main path diode having an anode connected to the first main path FET FC1 and a cathode connected to the load 15 is connected in place of the second main path FET FC2 may be provided. In this case, the failure judgments, which are fundamentally the same as those described with reference to FIG. 16, correspond to the normally off state in the timing chart of the second main path FET FC2 of FIG. 16. Therefore, the operation from the timing t4 to the timing t5 is eliminated. The failure judgment of the main path diode in this case is made as follows.

First of all, the controller 29 detects the voltage Vd at the connection point between the first main path FET FC1 and the main path diode by the voltage detector circuit 27 in such a state that the first main path FET FC1 is turned off (from the timing t2 to the timing t3 of FIG. 16).

Next, it is judged that the main path diode suffers a short-circuit failure if the voltage Vd is equal to or larger than the third threshold value Vth3 (which is set to the zero proximity threshold voltage Vn).

Next, a difference between the voltage Va of the load 15 and the voltage Vd at the connection point between the first main path FET FC1 and the main path diode detected by the voltage detector circuit 27 is obtained when a difference between the voltage Va of the load 15 and the voltage Vt of the electric storage device 21 is equal to or smaller than the fifth threshold values Vth5 (1 V) or when the voltage Vt of the electric storage device 21 is larger than the voltage Va of the load 15 while or after the electric storage device 21 is charged by the electric charger circuit 19 (from the timing t3 to the timing t4 of FIG. 16).

Next, it is judged that the main path diode suffers an open-circuit failure if the difference is equal to or larger than the sixth threshold value Vth6 (which is set to the zero proximity threshold voltage Vn).

The above arrangement also allows the FETs to be made two in number, and an electrical storage apparatus 11 of a simple configuration can be provided.

Moreover, it is acceptable to concurrently provide the configuration in which the second bypass FET FB2 is replaced by the bypass diode and the configuration in which the second main path FET FC2 is replaced by the main path diode. The connection methods in this case are as described above. In addition, in this configuration, the operation from the timing t4 to the timing t5 of FIG. 16 is eliminated since there is no second main path FET FC2. Moreover, the failure judgments of these two diodes can be made by combining the methods described above.

That is, the failure judgment of the bypass diode is made as follows.

First of all, since there is no second main path FET FC2 in the configuration, the controller 29 detects the voltage Va of the load 15 and the voltage Vb of the main power supply 13 by the voltage detector circuit 27 in such a state that only the first main path FET FC1 is turned off (from the timing t0 to the timing t1 of FIG. 16).

Next, it is judged that the bypass diode suffers an open-circuit failure if the voltage Va of the load 15 is equal to or smaller than the first threshold value Vth1 (which is set to the load driving minimum voltage Vmin). At the same time, the difference between the voltage Va of the load 15 and the voltage Vb of the main power supply 13 is obtained, and it is judged that the bypass diode suffers a short-circuit failure if the difference is equal to or smaller than the second threshold value Vth2 (ΔV+Vn).

On the other hand, the failure judgment of the main path diode is made as follows in a manner similar to that of the method described above.

First of all, the controller 29 detects the voltage Vd at the connection point between the first main path FET FC1 and the main path diode by the voltage detector circuit 27 in such a state that the first main path FET FC1 is turned off (from the timing t2 to the timing t3 of FIG. 16). Next, it is judged that the main path diode suffers a short-circuit failure if the voltage Vd is equal to or larger than the third threshold value Vth3 (which is set to the zero proximity threshold voltage Vn). Next, a difference between the voltage Va of the load 15 and the voltage Vd at the connection point between the first main path FET FC1 and the main path diode detected by the voltage detector circuit 27 is obtained when the difference between the voltage Va of the load 15 and the voltage Vt of the electric storage device 21 is equal to or smaller than the fifth threshold value Vth5 (1 V) or when the voltage Vt of the electric storage device 21 is larger than the voltage Va while or after the electric storage device 21 is charged by the electric charger circuit 19 (from the timing t3 to the timing t4 of FIG. 16). Next, it is judged that the main path diode suffers an open-circuit failure if the difference is equal to or larger than the sixth threshold value Vth6 (which is set to the zero proximity threshold voltage Vn).

The above arrangement also allows the FETs to be made one in number, and an electrical storage apparatus 11 of a simpler configuration can be provided.

Eleventh Preferred Embodiment

Figure 17:
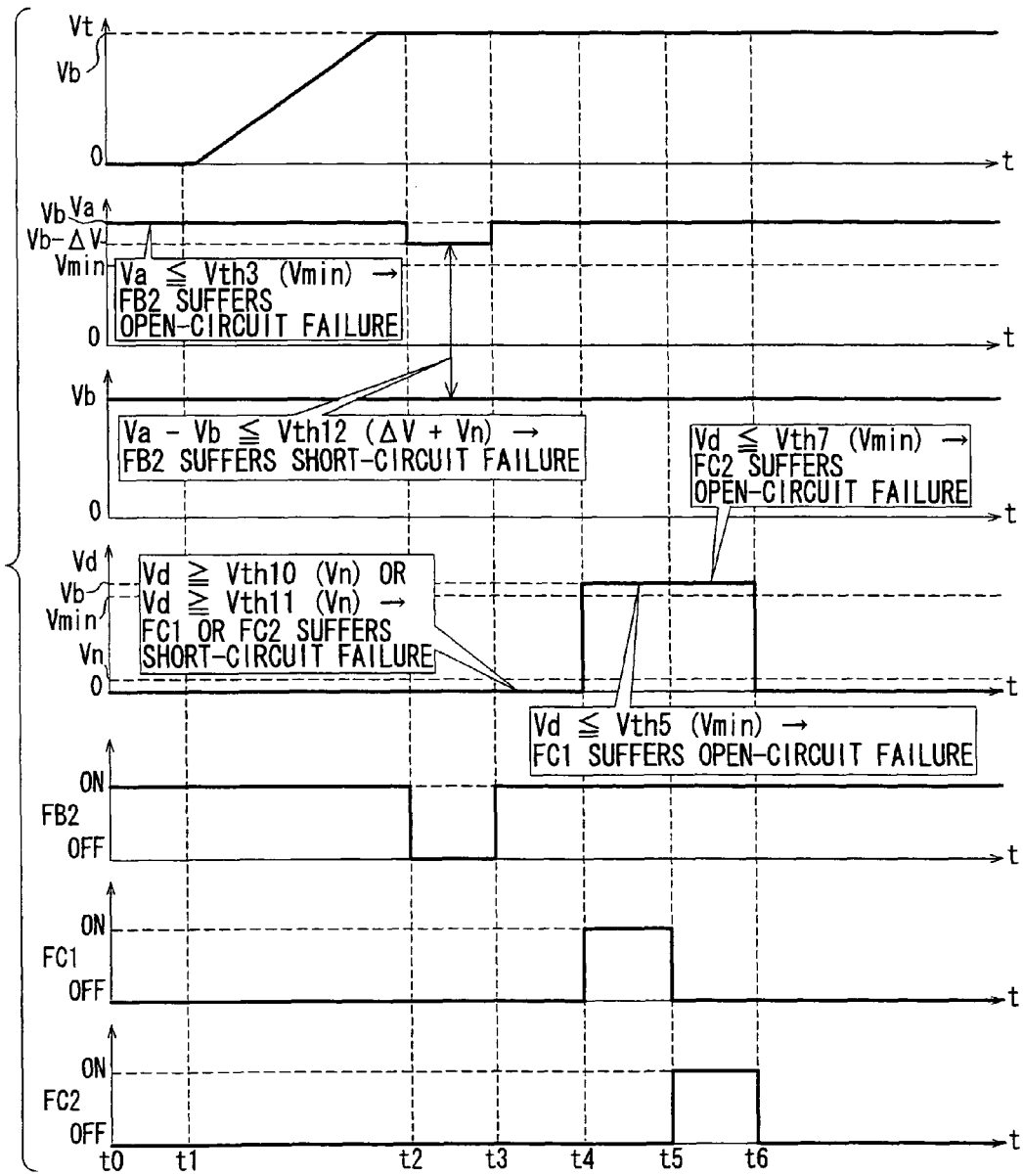
FIG. 17 is a timing chart of respective voltages upon failure judgments of an electrical storage apparatus according to an eleventh preferred embodiment of the present invention.

FIG. 17 is a timing chart of respective voltages upon failure judgments of an electrical storage apparatus according to the eleventh preferred embodiment of the present invention. Since the configuration of the electrical storage apparatus 11 according to the eleventh preferred embodiment is the same as that of FIG. 15, no description is provided for the structure, and a failure judgment method which is the features of the eleventh preferred embodiment will be described.

The failure judgments of the second bypass FET FB2, the first main path FET FC1 and the second main path FET FC2 can be made by the following combinations of conditions. It is noted that the FETs which are not particularly described may be either on or off.

(1) When a judgment of the open-circuit failure of the second bypass FET FB2 is made:

(1-1) It is judged that the second bypass FET FB2 suffers an open-circuit failure if the voltage Va of the load 15 is equal to or smaller than a third threshold value Vth3 in such a state that the first main path FET FC1 and the second main path FET FC2 are turned off.

(2) When a judgment of the open-circuit failure of the first main path FET FC1 is made:

(2-1) It is judged that the first main path FET FC1 suffers an open-circuit failure if the voltage Vd at the connection point between the first main path FET FC1 and the second main path FET FC2 is equal to or smaller than a fifth threshold value Vth5 in such a state that the first main path FET FC1 is turned on and the second main path FET FC2 is turned off while or after the electric storage device 21 is charged by the electric charger circuit 19.

(3) When a judgment of the open-circuit failure of the second main path FET FC2 is made:

(3-1) It is judged that the second main path FET FC2 suffers an open-circuit failure if the voltage Vd at the connection point between the first main path FET FC1 and the second main path FET FC2 is equal to or smaller than a seventh threshold value Vth7 in such a state that the second main path FET FC2 is turned on and the first main path FET FC1 is turned off while or after the electric storage device 21 is charged by the electric charger circuit 19.

(4) When a judgment of the short-circuit failure of the second bypass FET FB2 is made:

(4-1) It is judged that the second bypass FET FB2 suffers a short-circuit failure if the difference between the voltage Vb of the main power supply 13 and the voltage Va of the load 15 is equal to or smaller than a twelfth threshold value Vth12 in such a state that the second bypass FET FB2, the first main path FET FC1 and the second main path FET FC2 are turned off.

(5) When a judgment of the short-circuit failure of the first main path FET FC1 is made:

(5-1) It is judged that the first main path FET FC1 suffers a short-circuit failure if the voltage Vd at the connection point between the first main path FET FC1 and the second main path FET FC2 is equal to or larger than a tenth threshold value Vth10 in such a state that the first main path FET FC1 and the second main path FET FC2 are turned off while or after the electric storage device 21 is charged by the electric charger circuit 19.

(6) When a judgment of the short-circuit failure of the second main path FET FC2 is made:

(6-1) It is judged that the second main path FET FC2 suffers a short-circuit failure if the voltage Vd at the connection point between the first main path FET FC1 and the second main path FET FC2 is equal to or larger than an eleventh threshold value Vth11 in such a state that the first main path FET FC1 and the second main path FET FC2 are turned off.

The operation may be done so as to appropriately determine the third threshold value Vth3 to the eleventh threshold value Vth11 in consideration of the state of charge of the electric storage device 21, variations in the characteristics of the FETs and so on during the failure judgments as described in the third preferred embodiment. Moreover, in the eleventh preferred embodiment, the third threshold value Vth3, the fifth threshold value Vth5 and the seventh threshold value Vth7 are set to the load driving minimum voltage Vmin, and the tenth threshold value Vth10 and the eleventh threshold value Vth11 are set to the zero proximity threshold voltage Vn. The twelfth threshold value Vth12 is set to the voltage (ΔV+Vn) as described later. Moreover, the third threshold value Vth3 and the fifth threshold value Vth5 as described in the tenth preferred embodiment are different from the third threshold value Vth3 and the fifth threshold value Vth5 as described in the eleventh preferred embodiment.

Among the combinations of conditions as described above, an optimal failure judgment operation example will be described with reference to FIG. 17. It is noted that the form of the graphs of FIG. 17 is similar to that of FIG. 16.

First of all, the controller 29 turns on the second bypass FET FB2 and turns off the first main path FET FC1 and the second main path FET FC2 at the timing t0. Since the state is the same as that at the timing t0 of FIG. 16, it is judged that the second bypass FET FB2 suffers an open-circuit failure if the voltage Va of the load 15 detected by the voltage detector circuit 27 is equal to or smaller than a third threshold value Vth3 (which is set to the load driving minimum voltage Vmin).

When the second bypass FET FB2 does not suffer an open-circuit failure, the controller 29 charges the electric storage device 21 at the timing t1. In this case, the charging is performed so that the voltage Vt of the electric storage device 21 coincides with the voltage Vb of the main power supply 13 within the charge accuracy of the electric charger circuit 19. Therefore, the voltage Vt of the electric storage device 21 becomes almost equal to the voltage Vb of the main power supply 13 at the timing t2 after the charging as shown in FIG. 17.

Next, at the timing t2 after the electric storage device 21 is charged, the controller 29 turns off the second bypass FET FB2, the first main path FET FC1 and the second main path FET FC2. Since the first main path FET FC1 and the second main path FET FC2 have been already turned off at this time, it is turned only necessary to turn off the second bypass FET FB2 in the eleventh preferred embodiment. By this operation, all the FETs are turned off. In this case, the power of the main power supply 13 is supplied to the load 15 by way of the parasitic diode 35b of the second bypass FET FB2. Therefore, the voltage Va is lowered by the voltage drop ΔV of the parasitic diode 35b from the voltage Vb of the main power supply 13, whereas the load 15 can be continuously driven. Since the second bypass FET FB2 is turned off in this state, the difference between the voltage Vb of the main power supply 13 and the voltage Va of the load 15 detected by the voltage detector circuit 27 ideally becomes ΔV if it is normal. However, a voltage value Vn (=about 0.1 V) due to the influences of the leakage current and noises is superimposed as described in the first preferred embodiment. Therefore, the controller 29 obtains the difference between the voltage Va and the voltage Vb and judges that the second bypass FET FB2 suffers a short-circuit failure if the difference is equal to or smaller than a twelfth threshold value Vth12 (which is set to the voltage (ΔV+Vn) in this case for the above reasons). Since the power supply from the main power supply 13 to the load 15 is continued even if the failure judgment is made, the failure judgment may be made before or while the electric storage device 21 is charged. It is noted that the voltage drop ΔV due to the parasitic diode 35b of each FET is consistently equal in the eleventh preferred embodiment.

Next, the controller 29 turns on the second bypass FET FB2 and turns off the first main path FET FC1 and the second main path FET FC2 at the timing t3. However, since the first main path FET FC1 and the second main path FET FC2 are turned off from the timing t2 to the timing t3 of FIG. 17, it is turned only necessary to turn on the second bypass FET FB2 in the eleventh preferred embodiment. By this operation, if the first main path FET FC1 and the second main path FET FC2 are normal, the voltage Vd at the connection point between the first main path FET FC1 and the second main path FET FC2 maintains 0 V by the voltage detector circuit 27. Therefore, it is judged that the first main path FET FC1 or the second main path FET FC2 suffers a short-circuit failure if the voltage Vd at the connection point between the first main path FET FC1 and the second main path FET FC2 detected by the voltage detector circuit 27 is equal to or larger than a tenth threshold value Vth10 (which is set to the zero proximity threshold voltage Vn), equal to or larger than an eleventh threshold value Vth11 (which is set to the zero proximity threshold voltage Vn).

Next, the controller 29 reads out the information of the voltage Vb of the main power supply 13 from the voltage detector circuit 27 and reads out the information of the voltage Vt of the electric storage device 21 from the electric charger circuit 19, respectively, at the timing t4. In this case, it is judged whether or not the voltage Vb of the main power supply 13 is equal to or larger than the difference (=Vt−ΔV) between the voltage Vt of the electric storage device 21 and the voltage drop ΔV due to the parasitic diodes 35c and 35d. Since a current flows backward from the electric storage device 21 to the main power supply 13 when the FETs are controlled at the timing t4 if the voltage Vb is smaller than the voltage difference, the judgment is made in order to avoid this occurrence.

Upon judging that the voltage Vb is equal to or larger than the voltage difference (Vt−ΔV), the controller 29 turns on the second bypass FET FB2 and the first main path FET FC1 and turns off the second main path FET FC2. However, since the second bypass FET FB2 has been already turned on and the second main path FET FC2 has been already turned off from the timing t3 to the timing t4 of FIG. 17, it is turned only necessary to turn on the first main path FET FC1 in the eleventh preferred embodiment. By this operation, the voltage Vd at the connection point between the first main path FET FC1 and the second main path FET FC2 rises up to the voltage Vt of the electric storage device 21 if the first main path FET FC1 is normal. Therefore, it is judged that the first main path FET FC1 suffers an open-circuit failure if the voltage Vd at the connection point between the first main path FET FC1 and the second main path FET FC2 detected by the voltage detector circuit 27 is equal to or smaller than a fifth threshold value Vth5 (which is set to the load driving minimum voltage Vmin).

Next, the controller 29 reads out the information of the voltage Vb of the main power supply 13 from the voltage detector circuit 27 and reads out the information of the voltage Vt of the electric storage device 21 from the electric charger circuit 19 at the timing t5. In this case, it is judged whether or not the voltage Vt of the electric storage device 21 is equal to or larger than a difference (=Vb−ΔV) between the voltage Vb of the main power supply 13 and the voltage drop ΔV due to the parasitic diode 35c. If the voltage Vt is smaller than the difference, a current suddenly flows from the main power supply 13 to the electric storage device 21 when the FETs are controlled at the timing t5, and therefore, the above judgment is made to avoid this occurrence. Upon judging that the voltage Vb is equal to or larger than the difference, the controller 29 turns on the second bypass FET FB2 and the second main path FET FC2 and turns off the first main path FET FC1. However, since the second bypass FET FB2 has been already turned on from the timing t4 to the timing t5 of FIG. 17, it is turned only necessary to turn off the first main path FET FC1 and to turn on the second main path FET FC2 in the eleventh preferred embodiment. By this operation, the voltage Vd at the connection point between the first main path FET FC1 and the second main path FET FC2 becomes almost equal to the voltage Vb of the main power supply 13 if the second main path FET FC2 is normal. Therefore, it is judged that the second main path FET FC2 suffers an open-circuit failure if the voltage Vd at the connection point between the first main path FET FC1 and the second main path FET FC2 detected by the voltage detector circuit 27 is equal to or smaller than a seventh threshold value Vth7 (which is set to the load driving minimum voltage Vmin).

The failure judgments are thus ended. Therefore, after the second bypass FET FB2 is turned on and the first main path FET FC1 and the second main path FET FC2 are turned off at the timing t6, the normal operation state is established.

By thus performing the failure judgment operation, the judgments of the open-circuit failure and the short-circuit failure of the three FETs can be made, and as is apparent from FIG. 17, it can be understood that the voltage Va of the load 15 scarcely fluctuates although the voltage value slightly falls at the timing t2 to the timing t3 in comparison with FIG. 16 even when the failure judgment is made. Therefore, a voltage more stable than in the tenth preferred embodiment can be supplied to the load 15 during the failure judgments.

By the operation of the electrical storage apparatus constructed as above, the judgments of the short-circuit failure and the open-circuit failure of the three FETs can be made on the basis of the voltage Va of the load 15, the voltage Vb of the main power supply 13, and the voltage Vd at the connection point between the first main path FET FC1 and the second main path FET FC2 in such a state that the fluctuation of the voltage supplied to the load 15 is reduced by arbitrarily controlling turning on/off of the second bypass FET FB2, the first main path FET FC1 and the second main path FET FC2 of the switchover circuit part within the limited conditions. Therefore, the electrical storage apparatus that has higher reliability and a simpler configuration can be provided.

In a manner similar to that of the tenth preferred embodiment, the controller 29 may make a judgment of the open-circuit failure of the second bypass FET FB2 after the startup of the vehicle and thereafter make the remaining failure judgments after the electric storage device 21 is charged also in the eleventh preferred embodiment. Moreover, the failure judgments may be made after the use of the vehicle in a manner similar to that of the first preferred embodiment. The operations of signal communications with the external control circuit 50 and so on in this case are quite the same as those of the first preferred embodiment.

Twelfth Preferred Embodiment

Figure 18:
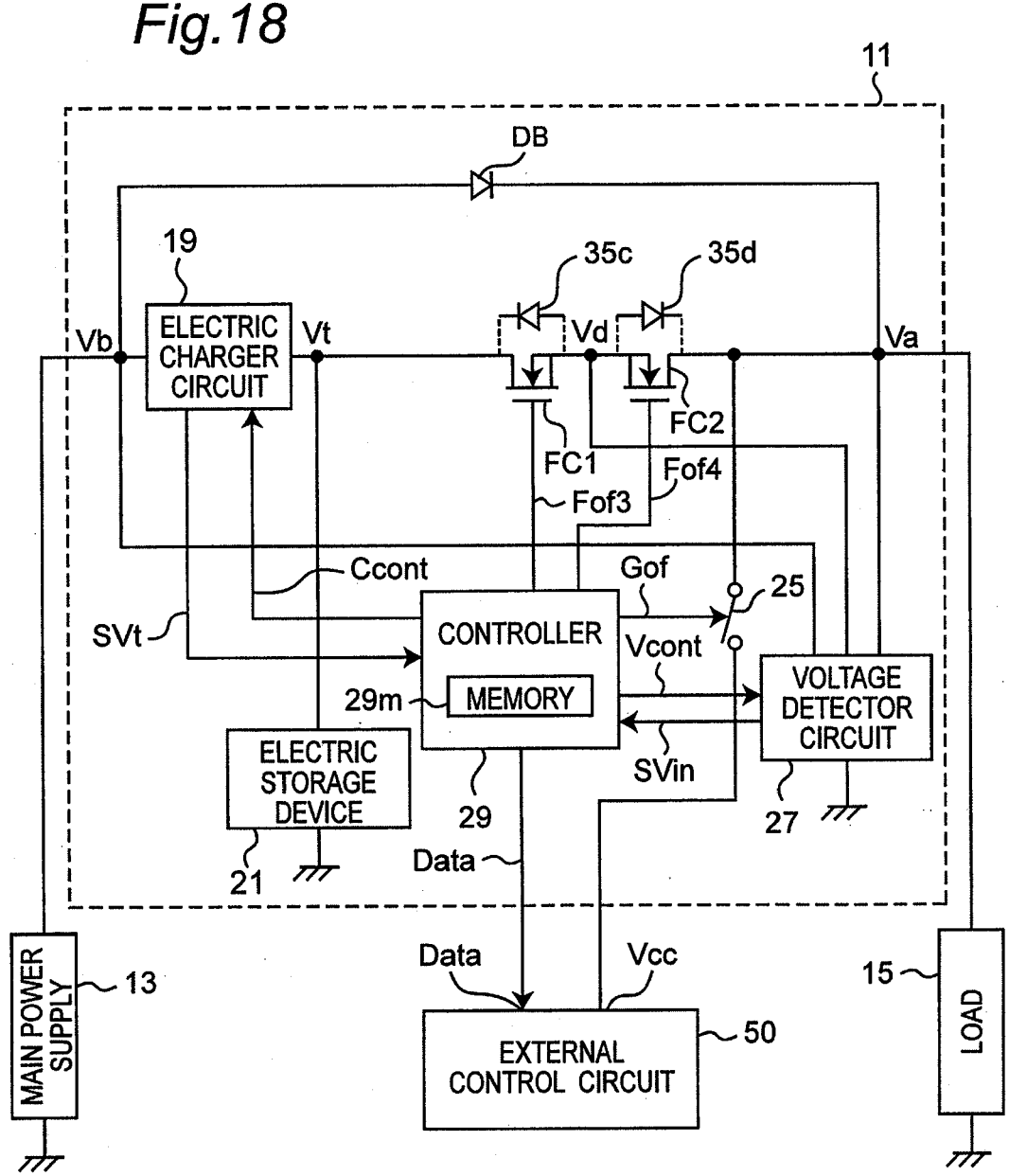
FIG. 18 is a block diagram of an electrical storage apparatus according to a twelfth preferred embodiment of the present invention.
Figure 19:
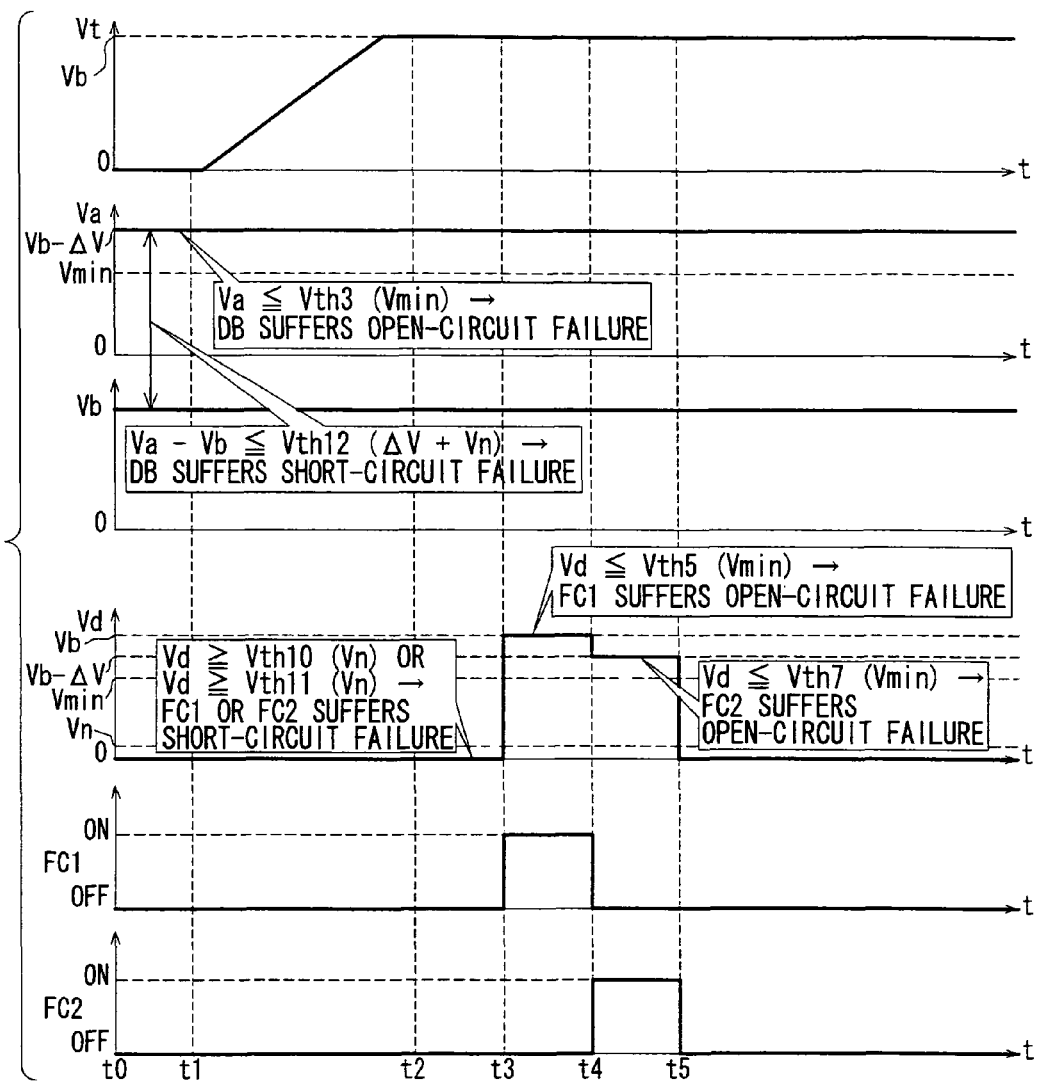
FIG. 19 is a timing chart of respective voltages upon failure judgments of the electrical storage apparatus according to the twelfth preferred embodiment of the present invention.
Figure 20:
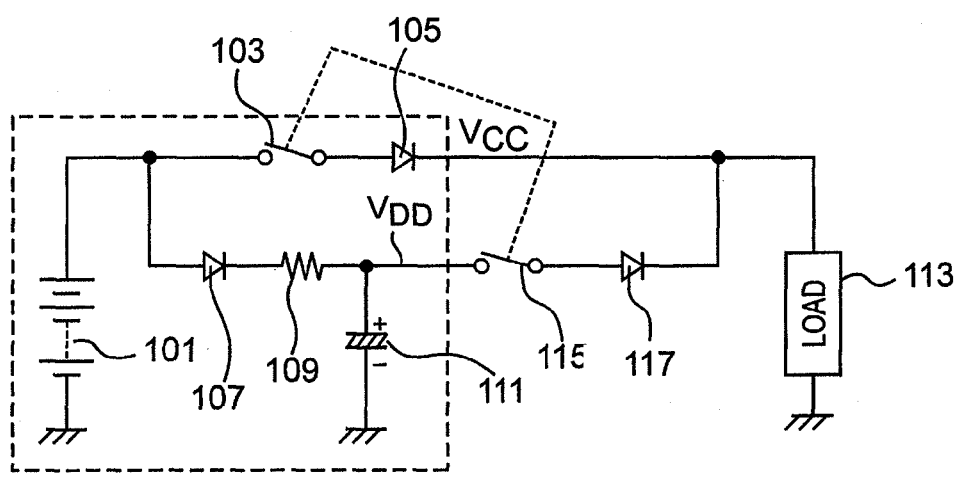
FIG. 20 is a circuit diagram of an electrical storage apparatus according to a prior art.

FIG. 18 is a block diagram of an electrical storage apparatus according to the twelfth preferred embodiment of the present invention. FIG. 19 is a timing chart of respective voltages upon failure judgments of the electrical storage apparatus according to the twelfth preferred embodiment of the present invention. The configuration of the electrical storage apparatus 11 according to the twelfth preferred embodiment is similar to the configuration of the tenth preferred embodiment (FIG. 15) except that a bypass diode DB having an anode connected to the main power supply 13 and a cathode connected to the load 15 is connected in place of the second bypass FET FB2. Therefore, no description is provided for the block diagram and other structures of the electrical storage apparatus 11, and a failure judgment method which is the features of the twelfth preferred embodiment will be described.

The failure judgments of the bypass diode DB, the first main path FET FC1 and the second main path FET FC2 can be made by the following combinations of conditions. It is noted that the FETs which are not particularly described may be either on or off.

(1) When a judgment of the open-circuit failure of the bypass diode DB is made:

(1-1) It is judged that the bypass diode DB suffers an open-circuit failure if the voltage Va of the load 15 is equal to or smaller than a third threshold value Vth3 in such a state that the first main path FET FC1 and the second main path FET FC2 are turned off.

(2) When a judgment of the open-circuit failure of the first main path FET FC1 is made:

(2-1) It is judged that the first main path FET FC1 suffers an open-circuit failure if the voltage Vd at the connection point between the first main path FET FC1 and the second main path FET FC2 is equal to or smaller than a fifth threshold value Vth5 in such a state that the first main path FET FC1 is turned on and the second main path FET FC2 is turned off while or after the electric storage device 21 is charged by the electric charger circuit 19.

(3) When a judgment of the open-circuit failure of the second main path FET FC2 is made:

(3-1) It is judged that the second main path FET FC2 suffers an open-circuit failure if the voltage Vd at the connection point between the first main path FET FC1 and the second main path FET FC2 is equal to or smaller than a seventh threshold value Vth7 in such a state that the second main path FET FC2 is turned on and the first main path FET FC1 is turned off while or after the electric storage device 21 is charged by the electric charger circuit 19.

(4) When a judgment of the short-circuit failure of the bypass diode DB is made:

(4-1) It is judged that the bypass diode DB suffers a short-circuit failure if the difference between the voltage Vb of the main power supply 13 and the voltage Va of the load 15 is equal to or smaller than a twelfth threshold value Vth12 in such a state that the first main path FET FC1 and the second main path FET FC2 are turned off.

(5) When a judgment of the short-circuit failure of the first main path FET FC1 is made:

(5-1) It is judged that the first main path FET FC1 suffers a short-circuit failure if the voltage Vd at the connection point between the first main path FET FC1 and the second main path FET FC2 is equal to or larger than a tenth threshold value Vth10 in such a state that the first main path FET FC1 and the second main path FET FC2 are turned off while or after the electric storage device 21 is charged by the electric charger circuit 19.

(6) When a judgment of the short-circuit failure of the second main path FET FC2 is made:

(6-1) It is judged that the second main path FET FC2 suffers a short-circuit failure if the voltage Vd at the connection point between the first main path FET FC1 and the second main path FET FC2 is equal to or larger than an eleventh threshold value Vth11 in such a state that the first main path FET FC1 and the second main path FET FC2 are turned off.

The operation may be done so as to appropriately determine the third threshold value Vth3 to the eleventh threshold value Vth11 in consideration of the state of charge of the electric storage device 21, variations in the characteristics of the FETs and so on during the failure judgments as described in the third preferred embodiment. Moreover, in the twelfth preferred embodiment, the third threshold value Vth3, the fifth threshold value Vth5 and the seventh threshold value Vth7 are set to the load driving minimum voltage Vmin, and the tenth threshold value Vth10 and the eleventh threshold value Vth11 are set to the zero proximity threshold value Vn. The twelfth threshold value Vth12 is set to the voltage ($\Delta$V+ Vn) for the reasons as described in the eleventh preferred embodiment. Moreover, the third threshold value Vth3 and the fifth threshold value Vth5 as described in the tenth preferred embodiment are different from the third threshold value Vth3 and the fifth threshold value Vth5 as described in the twelfth preferred embodiment.

Among the combinations of conditions as described above, an optimal failure judgment operation example will be described with reference to FIG. 19. It is noted that the form of the graphs of FIG. 19 is similar to that of FIG. 17 except that the timing chart of the second bypass FET FB2 is eliminated.

First of all, the controller 29 turns off the first main path FET FC1 and the second main path FET FC2 at the timing t0. Since the second bypass FET FB2 corresponds to the off state at the timing t0 of FIG. 17, the voltage Va of the load 15 comes to have a value (=Vb−$\Delta$V) that is lowered by the voltage drop $\Delta$V of the bypass diode DB from the voltage Vb of the main power supply 13 as shown in FIG. 19. However, since the state is substantially equivalent to the state at the timing t0 of FIG. 17, it is judged that the bypass diode DB suffers an open-circuit failure if the voltage Va of the load 15 detected by the voltage detector circuit 27 is equal to or smaller than the third threshold value Vth3 (which is set to the load driving minimum voltage Vmin). It is postulated that the voltage drop $\Delta$V due to the parasitic diodes 35$b$ and 35$c$ of the FETs and the bypass diode DB is consistently equal also in the twelfth preferred embodiment.

Next, the controller 29 subsequently makes a judgment of the short-circuit failure of the bypass diode DB. Although the judgment may be made after the electric storage device 21 is charged in a manner similar to that of the eleventh preferred embodiment, reference is made to a case where the judgment of the short-circuit failure is made before the charging in this case. That is, the controller 29 obtains the difference between the voltage Vb of the main power supply 13 and the voltage Va of the load 15 detected by the voltage detector circuit 27 in such a state that the first main path FET FC1 and the second main path FET FC2 are turned off and judges that the bypass diode DB suffers a short-circuit failure if the difference is equal to or smaller than the twelfth threshold value Vth12 (=ΔV+Vn). The failure judgment is the same as that of the operation from the timing t2 to the timing t3 of FIG. 17.

If the bypass diode DB suffers neither the short-circuit failure nor the open-circuit failure, the controller 29 charges the electric storage device 21 at the timing t1. In this case, the charging is performed so that the voltage Vt of the electric storage device 21 coincides with the voltage Vb of the main power supply 13 within the charge accuracy of the electric charger circuit 19. Therefore, the voltage Vt of the electric storage device 21 becomes almost equal to the voltage Vb of the main power supply 13 at the timing t2 after the charging as shown in FIG. 19.

Next, the controller 29 turns off the first main path FET FC1 and the second main path FET FC2 at the timing t2 after the electric storage device 21 is charged. Since the first main path FET FC1 and the second main path FET FC2 have been already turned off in the twelfth preferred embodiment, the controller 29 subsequently makes a judgment of the short-circuit failure of the first main path FET FC1 and the second main path FET FC2. That is, if the first main path FET FC1 and the second main path FET FC2 are normal at the timing t2, the voltage Vd at the connection point between the first main path FET FC1 and the second main path FET FC2 maintains 0 V by the voltage detector circuit 27. Therefore, it is judged that the first main path FET FC1 or the second main path FET FC2 suffers a short-circuit failure if the voltage Vd at the connection point between the first main path FET FC1 and the second main path FET FC2 detected by the voltage detector circuit 27 is equal to or larger than the tenth threshold value Vth10 (which is set to the zero proximity threshold voltage Vn), equal to or larger than the eleventh threshold value Vth11 (which is set to the zero proximity threshold voltage Vn).

Next, the controller 29 turns on the first main path FET FC1 and turns off the second main path FET FC2 at the timing t3. However, since the second main path FET FC2 has been already turned off from the timing t2 to the timing t3 of FIG. 19, it is turned only necessary to turn on the first main path FET FC1 in the twelfth preferred embodiment. By this operation, the voltage Vd at the connection point between the first main path FET FC1 and the second main path FET FC2 rises up to the voltage Vt of the electric storage device 21 if the first main path FET FC1 is normal. Therefore, it is judged that the first main path FET FC1 suffers an open-circuit failure if the voltage Vd at the connection point between the first main path FET FC1 and the second main path FET FC2 detected by the voltage detector circuit 27 is equal to or smaller than the fifth threshold value Vth5 (which is set to the load driving minimum voltage Vmin).

Next, the controller 29 reads out the information of the voltage Vb of the main power supply 13 from the voltage detector circuit 27 and reads out the information of the voltage Vt of the electric storage device 21 from the electric charger circuit 19 at the timing t4. In this case, it is judged whether or not the voltage Vt of the electric storage device 21 is equal to or larger than a difference (=Vb−ΔV×2) between the voltage Vb of the main power supply 13 and the voltage drop (ΔV×2) due to the parasitic diode 35b and the bypass diode DB. If the voltage Vt of the electric storage device 21 is smaller than the difference (=Vb−ΔV×2) between the voltage Vb of the main power supply 13 and the voltage drop (ΔV×2) due to the parasitic diode 35b and the bypass diode DB, a current suddenly flows from the main power supply 13 to the electric storage device 21 when the FETs are controlled at the timing t4, and therefore, the above judgment is made to avoid this occurrence. Upon judging that the voltage Vt of the electric storage device 21 is equal to or larger than the difference (=Vb−ΔV×2) between the voltage Vb of the main power supply 13 and the voltage drop (ΔV×2) due to the parasitic diode 35b and the bypass diode DB, the controller 29 turns on the second main path FET FC2 and turns off the first main path FET FC1. By this operation, the voltage Vd at the connection point between the first main path FET FC1 and the second main path FET FC2 becomes almost equal to the voltage Va of the load 15 if the second main path FET FC2 is normal. In this case, as is apparent from FIG. 19, the voltage Va of the load 15 at the timing t4 to the timing t5 is the voltage (=Vb−ΔV) that is lowered by the voltage drop ΔV of the bypass diode DB from the voltage Vb of the main power supply 13. Therefore, if the second main path FET FC2 is normal, the relation of the following Equation (2) holds:

$$Vd = Va = Vb - \Delta V \quad (2).$$

From this fact, it is judged that the second main path FET FC2 suffers an open-circuit failure if the voltage Vd at the connection point between the first main path FET FC1 and the second main path FET FC2 detected by the voltage detector circuit 27 does not reach the voltage difference (Vb−ΔV) and is equal to or smaller than the seventh threshold value Vth7 (which is set to the load driving minimum voltage Vmin).

The failure judgments are thus ended. Therefore, after the first main path FET FC1 and the second main path FET FC2 are turned off at the timing t5, the normal operation state is established.

By thus performing the failure judgment operation, the judgments of the open-circuit failure and the short-circuit failure of the two FETs and the bypass diode DB can be made, and as is apparent from FIG. 19, it can be understood that the voltage Va of the load 15 scarcely fluctuates in comparison with FIG. 17 even upon the failure judgments. Therefore, a voltage more stable than in the eleventh preferred embodiment can be supplied to the load 15 during the failure judgments. It is noted that a loss caused due to the bypass diode DB consistently is caused since the power of the main power supply 13 is infallibly supplied to the load 15 via the bypass diode DB during the normal operation.

By the operation of the electrical storage apparatus constructed as above, the judgments of the short-circuit failure and the open-circuit failure of the two FETs and the bypass diode DB can be made on the basis of the voltage Va of the load 15, the voltage Vb of the main power supply 13, and the voltage Vd at the connection point between the first main path FET FC1 and the second main path FET FC2 in such a state that the fluctuation of the voltage supplied to the load 15 is reduced by arbitrarily controlling turning on/off of the bypass diode DB, the first main path FET FC1 and the second main path FET FC2 within the limited conditions. Therefore, the electrical storage apparatus that has higher reliability and a simpler configuration can be provided.

Modified Preferred Embodiments

In a manner similar to that of the tenth preferred embodiment, the controller 29 may make a judgment of the open-circuit failure of the bypass diode DB after the startup of the vehicle and thereafter make the remaining failure judgments after the electric storage device 21 is charged also in the twelfth preferred embodiment. Moreover, the failure judgments may be made after the use of the vehicle in a manner similar to that of the first preferred embodiment. The operations of signal communications with the external control circuit 50 and so on in this case are quite the same as those of the first preferred embodiment.

Moreover, the failure judgments to be made after the charging as described in the first to twelfth preferred embodiments may be made during the charging if the electric storage device 21 is charged up to a voltage higher than the load driving minimum voltage Vmin (=10.5 V).

Moreover, the order of the failure judgments as described in the first to twelfth preferred embodiments are not limited to them but allowed to be made in an arbitrary order. However, the operation may be done so as to make the failure judgments made while or after the electric storage device 21 is charged in an arbitrary order under the conditions. In order to supply the power from the main power supply 13 to the load 15 promptly with high reliability after the startup of the vehicle, it is desirable to first make judgments of the open-circuit failure of the switch SW1, the first bypass FET FB1, the second bypass FET FB2 and the bypass diode DB, which directly connect the main power supply 13 to the load 15.

Moreover, if the failure judgments are made in the first to twelfth preferred embodiments, it is acceptable to stop the subsequent failure judgment operation and to issue a failure signal.

Moreover, the failure judgments of the switchover circuit part as described in the first to twelfth preferred embodiments may be made, for example, appropriately repetitively every definite period while the electrical storage apparatus 11 is used.

Moreover, it is acceptable to provide a plurality of switches SW1, second bypass FETs FB2, bypass diodes DB, series circuits of the first bypass FET FB1 and the second bypass FET FB2 or series circuits of the first bypass FET FB1 and the second bypass FET FB2 and to connect them parallel in the first to twelfth preferred embodiments. In this case, the current flowing through the switches SW1, the second bypass FETs FB2 and the bypass diodes DB is branched in accordance with the number of the parallel connections. Therefore, switches, FETs and diodes of small current capacities can be employed, and this makes it possible to downsize the electrical storage apparatus 11. Likewise, it is acceptable to provide a plurality of switches SW2, series circuits of the first main path FET FC1 and the second main path FET FC2 or series circuits of the first main path FET FC1 and the main path diode DC and to connect them parallel.

Moreover, it is acceptable to provide a plurality of loads 15 and to provide a path (path including a series circuit of the switch SW1, the second bypass FET FB2, the bypass diode DB, the first bypass FET FB1 and the second bypass FET FB2 or a series circuit of the first bypass FET FB1 and the bypass diode DB) that supplies the power of the main power supply 13 and a path (path including a series circuit of the switch SW2, the first main path FET FC1 and the second main path FET FC2 or a series circuit of the first main path FET FC1 and the main path diode DC) that supplies the power of the electric storage device 21 to the respective loads 15 in the first to twelfth preferred embodiments. With this arrangement, the current capacities of the switches, the FETs and the diodes can be made optimal in accordance with the consumption currents of the respective loads 15.

Moreover, it is acceptable to insert a circuit protection device constructed of a fuse, a semiconductor device of FET or the like, a relay or the like between the main power supply 13 and the load 15 or between the electric storage device 21 and the load 15 at need in the configurations of the first to twelfth preferred embodiments. In this case, influences exerted on the voltage value during the failure judgments can be reduced if a circuit protection device of a minute voltage drop is selected.

Moreover, although the electric double layer capacitor is employed for the electric storage device 21 in the first to twelfth preferred embodiments, another electric storage device such as an electrochemical capacitor may be employed instead.

Moreover, the electrical storage apparatus applied to the idling-stop car will be described in the first to twelfth preferred embodiments. However, the present invention is not limited to this but able to be applied to a vehicle auxiliary power supply in each of the systems of a hybrid car, an electric power steering, an electric turbo, vehicle braking by electric hydraulic control and so on or a general emergency backup power supply or the like.

The phrase of "after the startup of the vehicle", which has the meaning of "after the startup of the vehicle in which the electrical storage apparatus is provided" in the above preferred embodiments, may similarly has the meaning of "after the startup of the electrical storage apparatus".

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The electrical storage apparatus of the present invention capable of making failure judgments of the switchover circuit part obtaining high reliability is therefore useful as an electrical storage apparatus for an auxiliary power supply or the like to supply power from the electric storage device particularly when the voltage of the main power supply is lowered.

What is claimed is:

1. An electrical storage apparatus connected between a main power supply and a load, the electrical storage apparatus comprising:

a first bypass FET (Field Effect Transistor) and a bypass diode connected in series between the main power supply and the load;

an electric charger circuit connected to the main power supply;

an electric storage device connected to the electric charger circuit;

a first main path FET (Field Effect Transistor) and a second main path FET (Field Effect Transistor) connected in series between the electric storage device and the load;

a voltage detector circuit that detects a voltage (Vb) of the main power supply, a voltage (Va) of the load, a voltage (Vc) at a connection point between the first bypass FET and the bypass diode, and a voltage (Vd) at a connection point between the first main path FET and the second main path FET; and a controller connected to the first bypass FET, the first main path FET, the second main path FET, the electric charger circuit and the voltage detector circuit, wherein the bypass diode has an anode connected to the first bypass FET and a cathode connected to the load, wherein the controller judges that the first bypass FET suffers an open-circuit failure in either one of a case where the voltage (Va) of the load detected by the voltage detector circuit is equal to or smaller than a first threshold value Vth1, and another case where the voltage (Vc) at the connection point between the first bypass FET and the bypass diode is equal to or smaller than a second threshold value Vth2, in such a state that the first bypass FET is turned on and the first main path FET and the second main path FET are turned off, wherein the controller judges that the bypass diode suffers an open-circuit failure if the voltage (Va) of the load is equal to or smaller than a third threshold value Vth3, in such a state that the first bypass FET is turned on and the first main path FET and the second main path FET are turned off, wherein the controller judges that the second main path FET suffers an open-circuit failure if the voltage (Va) of the load is equal to or smaller than a sixth threshold value Vth6, in such a state that the first bypass FET is turned off and the first main path FET and the second main path FET are turned on while or after the electric storage device is charged by the electric charger circuit, wherein the controller judges that the second main path FET suffers an open-circuit failure if the voltage (Vd) at the connection point between the first main path FET and the second main path FET is equal to or smaller than a seventh threshold value Vth7, in such a state that the first bypass FET and the second main path FET are turned on and the first main path FET is turned off while or after the electric storage device is charged by the electric charger circuit, wherein the controller judges that the first bypass FET suffers a short-circuit failure if the voltage (Vc) at the connection point between the first bypass FET and the bypass diode is equal to or larger than an eighth threshold value Vth8, in such a state that the first bypass FET is turned off, and wherein the controller judges that the bypass diode suffers a short-circuit failure if the voltage (Vc) at the connection point between the first bypass FET and the bypass diode is equal to or larger than a ninth threshold value Vth9, in such a state that the first bypass FET is turned off and the first main path FET is turned on while or after the electric storage device is charged by the electric charger circuit.

2. The electrical storage apparatus as claimed in claim 1, wherein each of the first bypass FET, the first main path FET and the second main path FET has a voltage drop ($\Delta V$) generated by a parasitic diode in an off state, and the bypass diode has the voltage drop ($\Delta V$), wherein the controller judges that the first bypass FET suffers an open-circuit failure if the voltage (Va) of the load is equal to or smaller than the first threshold value Vth1, and judges that the bypass diode suffers an open-circuit failure if the voltage (Va) of the load is equal to or smaller than the third threshold value Vth3, in such a state that the first bypass FET is turned on and the first main path FET and the second main path FET are turned off, wherein the controller judges that the first main path FET suffers a short-circuit failure if the voltage (Vd) at the connection point between the first main path FET and the second main path FET is equal to or larger than a tenth threshold value Vth10, and judges that the second main path FET suffers a short-circuit failure if the voltage (Vd) at the connection point is equal to or larger than an eleventh threshold value Vth11, in such a state that the first bypass FET is turned on and the first main path FET and the second main path FET are turned off while or after the electric storage device is charged by the electric charger circuit, wherein the controller judges that the first main path FET suffers an open-circuit failure if the voltage (Vd) at the connection point between the first main path FET and the second main path FET is equal to or smaller than a fifth threshold value Vth5, in such a state that the first bypass FET and the first main path FET are turned on and the second main path FET is turned off while or after the electric storage device is charged by the electric charger circuit, wherein the controller judges that the second main path FET suffers an open-circuit failure if the voltage (Vd) at the connection point between the first main path FET and the second main path FET is equal to or smaller than the seventh threshold value Vth7, in such a state that the first bypass FET and the second main path FET are turned on and the first main path FET is turned off in a case where the voltage (Vt) of the electric storage device is equal to or larger than a difference (Vb−$\Delta V$×2) between the voltage (Vb) of the main power supply and the voltage drop ($\Delta V$) while or after the electric storage device is charged by the electric charger circuit, and wherein the controller judges that the first bypass FET suffers a short-circuit failure if the voltage (Vc) at the connection point between the first bypass FET and the bypass diode is equal to or larger than the eighth threshold value Vth8, and judges that the bypass diode suffers a short-circuit failure if the voltage (Vc) at the connection point is equal to or larger than the ninth threshold value Vth9, in such a state that the first bypass FET is turned off and the first main path FET and the second main path FET are turned on in a case where an absolute value (|Vb−Vt|) of a difference between the voltage (Vb) of the main power supply and the voltage (Vt) of the electric storage device is equal to or smaller than the voltage drop ($\Delta V$) while or after the electric storage device is charged by the electric charger circuit.

3. An electrical storage apparatus connected between a main power supply and a load, the electrical storage apparatus comprising:

a first bypass FET and a second bypass FET which are connected in series between the main power supply and the load;

an electric charger circuit connected to the main power supply;

an electric storage device connected to the electric charger circuit;

a first main path FET and a main path diode which are connected in series between the electric storage device and the load;

a voltage detector circuit which detects a voltage (Vb) of the main power supply, a voltage (Va) of the load, a voltage (Vc) at a connection point between the first bypass FET and the second bypass FET, and a voltage (Vd) at a connection point between the first main path FET and the main path diode; and a controller connected to the first bypass FET, the second bypass FET, the first main path FET, the electric charger circuit and the voltage detector circuit, wherein the main path diode has an anode connected to the first main path FET and a cathode connected to the load, wherein the controller judges that the first bypass FET suffers an open-circuit failure in either one of a case where the voltage (Va) of the load detected by the voltage detector circuit is equal to or smaller than a first threshold value Vth1, and another case where the voltage (Vc) at the connection point between the first bypass FET and the second bypass FET is equal to or smaller than a second threshold value Vth2, in such a state that the first bypass FET is turned on and the first main path FET is turned off, wherein the controller judges that the second bypass FET suffers an open-circuit failure if the voltage (Va) of the load is equal to or smaller than a third threshold value Vth3, in such a state that the first bypass FET is turned on and the first main path FET is turned off, wherein the controller judges that the second bypass FET suffers an open-circuit failure if the voltage (Vc) at the connection point between the first bypass FET and the second bypass FET is equal to or smaller than a fourth threshold value Vth4, in such a state that the first bypass FET is turned off and the second bypass FET and the first main path FET are turned on while or after the electric storage device is charged by the electric charger circuit, wherein the controller judges that the first main path FET suffers an open-circuit failure if the voltage (Vd) at the connection point between the first main path FET and the main path diode is equal to or smaller than a fifth threshold value Vth5, in such a state that the first main path FET is turned on while or after the electric storage device is charged by the electric charger circuit, wherein the controller judges that the main path diode suffers an open-circuit failure if the voltage (Va) of the load is equal to or smaller than a sixth threshold value Vth6, in such a state that the first bypass FET and the second bypass FET are turned off and the first main path FET is turned on while or after the electric storage device is charged by the electric charger circuit, wherein the controller judges that the first main path FET suffers a short-circuit failure if the voltage (Vd) at the connection point between the first main path FET and the main path diode is equal to or larger than a tenth threshold value Vth10, in such a state that the first main path FET is turned off while or after the electric storage device is charged by the electric charger circuit, and wherein the controller judges that the main path diode suffers a short-circuit failure if the voltage (Vd) at the connection point between the first main path FET and the main path diode is equal to or larger than an eleventh threshold value Vth11, in such a state that the first bypass FET is turned on and the first main path FET is turned off.

4. The electrical storage apparatus as claimed in claim 3, wherein each of the first bypass FET, the second bypass FET and the first main path FET has a voltage drop ($\Delta V$) generated by a parasitic diode in an off state, and the main path diode has a voltage drop ($\Delta V$), wherein the controller judges that the first bypass FET suffers an open-circuit failure if the voltage (Va) of the load is equal to or smaller than the first threshold value Vth1, and judges that the second bypass FET suffers an open-circuit failure if the voltage (Va) of the load is equal to or smaller than the third threshold value Vth3, in such a state that the first bypass FET and the second bypass FET are turned on and the first main path FET is turned off, wherein the controller judges that the first main path FET suffers a short-circuit failure if the voltage (Vd) at the connection point between the first main path FET and the main path diode is equal to or larger than the tenth threshold value Vth10, and judges that the main path diode suffers a short-circuit failure if the voltage (Vd) at the connection point is equal to or larger than the eleventh threshold value Vth11, in such a state that the first bypass FET and the second bypass FET are turned on and the first main path FET is turned off while or after the electric storage device is charged by the electric charger circuit, wherein the controller judges that the first main path FET suffers an open-circuit failure if the voltage (Vd) at the connection point between the first main path FET and the main path diode is equal to or smaller than the fifth threshold value Vth5, in such a state that the first bypass FET, the second bypass FET and the first main path FET are turned on in a case where the voltage (Vb) of the main power supply is equal to or larger than a difference (Vt−$\Delta V$) between the voltage (Vt) of the electric storage device and the voltage drop ($\Delta V$), wherein the controller judges that the main path diode suffers an open-circuit failure if the voltage (Va) of the load is equal to or smaller than the sixth threshold value Vth6, in such a state that the first bypass FET and the second bypass FET are turned off and the first main path FET is turned on in a case where the voltage (Vb) of the main power supply is equal to or larger than a difference (Vt−$\Delta V \times 2$) between the voltage (Vt) of the electric storage device and the voltage drop ($\Delta V$) due to the parasitic diode and the main path diode, while or after the electric storage device is charged by the electric charger circuit, and wherein the controller judges that the first bypass FET suffers a short-circuit failure if the voltage (Vc) at the connection point between the first bypass FET and the second bypass FET is equal to or larger than an eighth threshold value Vth8, and judges that the second bypass FET suffers a short-circuit failure if the voltage (Vc) at the connection point is equal to or larger than a ninth threshold value Vth9, in such a state that the first bypass FET and the second bypass FET are turned off and the first main path FET is turned on in the case where the voltage (Vb) of the main power supply is equal to or larger than the difference (Vt−$\Delta V \times 2$) between the voltage (Vt) of the electric storage device and the voltage drop ($\Delta V$) due to the parasitic diode and the main path diode while or after the electric storage device is charged by the electric charger circuit.

5. An electrical storage apparatus connected between a main power supply and a load, the electrical storage apparatus comprising:

a first bypass FET and a bypass diode which are connected in series between the main power supply and the load;

an electric charger circuit connected to the main power supply;

an electric storage device connected to the electric charger circuit;

a first main path FET and a main path diode which are connected in series between the electric storage device and the load;

a voltage detector circuit which detects a voltage (Vb) of the main power supply, a voltage (Va) of the load, a voltage (Vc) at a connection point between the first bypass FET and the bypass diode, and a voltage (Vd) at a connection point between the first main path FET and the main path diode; and a controller connected to the first bypass FET, the first main path FET, the electric charger circuit and the voltage detector circuit, wherein the bypass diode has an anode connected to the first bypass FET and a cathode connected to the load, wherein the main path diode has an anode connected to the first main path FET and a cathode connected to the load, wherein the controller judges that the first bypass FET suffers an open-circuit failure if the voltage (Va) of the load detected by the voltage detector circuit is equal to or smaller than a first threshold value Vth1, in such a state that the first bypass FET is turned on and the first main path FET is turned off, wherein the controller judges that the first bypass FET suffers an open-circuit failure if the voltage (Vc) at the connection point between the first bypass FET and the bypass diode is equal to or smaller than a second threshold value Vth2, in such a state that the first bypass FET is turned on, wherein the controller judges that the bypass diode suffers an open-circuit failure if the voltage (Va) of the load is equal to or smaller than a third threshold value Vth3, in such a state that the first bypass FET is turned on and the first main path FET is turned off, wherein the controller judges that the first main path FET suffers an open-circuit failure if the voltage (Vd) at the connection point between the first main path FET and the main path diode is equal to or smaller than a fifth threshold value Vth5, in such a state that the first main path FET is turned on while or after the electric storage device is charged by the electric charger circuit, wherein the controller judges that the main path diode suffers an open-circuit failure if the voltage (Va) of the load is equal to or smaller than a sixth threshold value Vth6, in such a state that the first bypass FET is turned off and the first main path FET is turned on while or after the electric storage device is charged by the electric charger circuit, wherein the controller judges that the first bypass FET suffers a short-circuit failure if the voltage (Vc) at the connection point between the first bypass FET and the bypass diode is equal to or larger than an eighth threshold value Vth8, in such a state that the first bypass FET is turned off, wherein the controller judges that the bypass diode suffers a short-circuit failure if the voltage (Vc) at the connection point between the first bypass FET and the bypass diode is equal to or larger than a ninth threshold value Vth9, in such a state that the first bypass FET is turned off and the first main path FET is turned on while or after the electric storage device is charged by the electric charger circuit, wherein the controller judges that the first main path FET suffers a short-circuit failure if the voltage (Vd) at the connection point between the first main path FET and the main path diode is equal to or larger than a tenth threshold value Vth10, in such a state that the first main path FET is turned off while or after the electric storage device is charged by the electric charger circuit, and wherein the controller judges that the main path diode suffers a short-circuit failure if the voltage (Vd) at the connection point between the first main path FET and the main path diode is equal to or larger than an eleventh threshold value Vth11, in such a state that the first bypass FET is turned on and the first main path FET is turned off.

6. The electrical storage apparatus as claimed in claim 5, wherein each of the first bypass FET and the first main path FET has a voltage drop ($\Delta V$) generated by a parasitic diode in an off state, and the bypass diode and the main path diode have a voltage drop ($\Delta V$), wherein the controller judges that the first bypass FET suffers an open-circuit failure if the voltage (Va) of the load is equal to or smaller than the first threshold value Vth1, and judges that the bypass diode suffers an open-circuit failure if the voltage (Va) of the load is equal to or smaller than the third threshold value Vth3, in such a state that the first bypass FET is turned on and the first main path FET is turned off, wherein the controller judges that the first main path FET suffers a short-circuit failure if the voltage (Vd) at the connection point between the first main path FET and the main path diode is equal to or larger than the tenth threshold value Vth10, and judges that the main path diode suffers a short-circuit failure if the voltage (Vd) at the connection point is equal to or larger than the eleventh threshold value Vth11, in such a state that the first bypass FET is turned on and the first main path FET is turned off while or after the electric storage device is charged by the electric charger circuit, wherein the controller judges that the first main path FET suffers an open-circuit failure if the voltage (Vd) at the connection point between the first main path FET and the main path diode is equal to or smaller than the fifth threshold value Vth5, in such a state that the first bypass FET and the first main path FET are turned on while or after the electric storage device is charged by the electric charger circuit, wherein the controller judges that the main path diode suffers an open-circuit failure if the voltage (Va) of the load is equal to or smaller than the sixth threshold value Vth6, in such a state that the first bypass FET is turned off and the first main path FET is turned on in a case where the voltage (Vb) of the main power supply is equal to or larger than a difference (Vt−$\Delta V$×2) between the voltage (Vt) of the electric storage device and the voltage drop ($\Delta V$) due to the parasitic diode and the main path diode while or after the electric storage device is charged by the electric charger circuit, and wherein the controller judges that the first bypass FET suffers a short-circuit failure if the voltage (Vc) at the connection point between the first bypass FET and the bypass diode is equal to or larger than the eighth threshold value Vth8, and judges that the bypass diode suffers a short-circuit failure if the voltage (Vc) at the connection point is equal to or larger than the ninth threshold value Vth9, in such a state that the first bypass FET is turned off and the first main path FET is turned on in the case where the voltage (Vb) of the main power supply is equal to or larger than the difference (Vt−$\Delta V$×2) between the voltage (Vt) of the electric storage device and the voltage drop ($\Delta V$) due to the parasitic diode and the main path diode while or after the electric storage device is charged by the electric charger circuit.

7. An electrical storage apparatus connected between a main power supply and a load, the electrical storage apparatus comprising:
 a second bypass FET connected between the main power supply and the load;
 an electric charger circuit connected to the main power supply;
 an electric storage device connected to the electric charger circuit;
 a first main path FET and a second main path FET which are connected in series between the electric storage device and the load;
 a voltage detector circuit which detects a voltage (Vb) of the main power supply, a voltage (Va) of the load, and a voltage (Vd) at a connection point between the first main path FET and the second main path FET; and
a controller connected to the second bypass FET, the first main path FET, the second main path FET, the electric charger circuit and the voltage detector circuit,
wherein the controller judges that the second bypass FET suffers an open-circuit failure if the voltage (Va) of the load is equal to or smaller than a third threshold value Vth3, in such a state that the first main path FET and the second main path FET are turned off,
wherein the controller judges that the first main path FET suffers an open-circuit failure if the voltage (Vd) at the connection point between the first main path FET and the second main path FET is equal to or smaller than a fifth threshold value Vth5, in such a state that the first main path FET is turned on and the second main path FET is turned off while or after the electric storage device is charged by the electric charger circuit,
wherein the controller judges that the second main path FET suffers an open-circuit failure if the voltage (Vd) at the connection point between the first main path FET and the second main path FET is equal to or smaller than a seventh threshold value Vth7, in such a state that the second main path FET is turned on and the first main path FET is turned off while or after the electric storage device is charged by the electric charger circuit,
wherein the controller judges that the second bypass FET suffers a short-circuit failure if a difference between the voltage (Vb) of the main power supply and the voltage (Va) of the load is equal to or smaller than a twelfth threshold value Vth12, in such a state that the second bypass FET, the first main path FET and the second main path FET are turned off,
wherein the controller judges that the first main path FET suffers a short-circuit failure if the voltage (Vd) at the connection point between the first main path FET and the second main path FET is equal to or larger than a tenth threshold value Vth10, in such a state that the first main path FET and the second main path FET are turned off while or after the electric storage device is charged by the electric charger circuit, and
wherein the controller judges that the second main path FET suffers a short-circuit failure if the voltage (Vd) at the connection point between the first main path FET and the second main path FET is equal to or larger than an eleventh threshold value Vth11, in such a state that the first main path FET and the second main path FET are turned off.

8. The electrical storage apparatus as claimed in claim 7, wherein each of the second bypass FET, the first main path FET and the second main path FET has a voltage drop ($\Delta V$) generated by a parasitic diode in an off state,
wherein the controller judges that the second bypass FET suffers an open-circuit failure if the voltage (Va) of the load is equal to or smaller than the third threshold value Vth3, in such a state that the second bypass FET is turned on and the first main path FET and the second main path FET are turned off,
wherein the controller judges that the second bypass FET suffers a short-circuit failure if the difference between the voltage (Vb) of the main power supply and the voltage (Va) of the load is equal to or smaller than the twelfth threshold value Vth12, in such a state that the second bypass FET, the first main path FET and the second main path FET are turned off,
wherein the controller judges that the first main path FET suffers a short-circuit failure if the voltage (Vd) at the connection point between the first main path FET and the second main path FET is equal to or larger than the tenth threshold value Vth10, and judges that the voltage (Vd) at the connection point is equal to or larger than the eleventh threshold value Vth11, in such a state that the second bypass FET is turned on and the first main path FET and the second main path FET are turned off while or after the electric storage device is charged by the electric charger circuit,
wherein the controller judges that the first main path FET suffers an open-circuit failure if the voltage (Vd) at the connection point between the first main path FET and the second main path FET is equal to or smaller than the fifth threshold value Vth5, in such a state that the second bypass FET and the first main path FET are turned on and the second main path FET is turned off in a case where the voltage (Vb) of the main power supply is equal to or larger than a difference (Vt−$\Delta V$) between the voltage (Vt) of the electric storage device and the voltage drop ($\Delta V$) while or after the electric storage device is charged by the electric charger circuit, and
wherein the controller judges that the second main path FET suffers an open-circuit failure if the voltage (Vd) at the connection point between the first main path FET and the second main path FET is equal to or smaller than the seventh threshold value Vth7, in such a state that the second bypass FET and the second main path FET are turned on and the first main path FET is turned off in the case where the voltage (Vt) of the electric storage device is equal to or larger than the difference (Vb−$\Delta V$) between the voltage (Vb) of the main power supply and the voltage drop ($\Delta V$) while or after the electric storage device is charged by the electric charger circuit.

9. The electrical storage apparatus as claimed in claim 7, further comprising:
a first bypass FET which is connected between the main power supply and the second bypass FET and connected to the controller,
wherein the controller judges that the first bypass FET suffers an open-circuit failure in either one of a case where the voltage (Va) of the load is equal to or smaller than a first threshold value Vth1, and another case where the voltage (Vc) at the connection point between the first bypass FET and the second bypass FET is equal to or smaller than the second threshold value Vth2, in such a state that the first bypass FET is turned on and the first main path FET and the second main path FET are turned off,
wherein the controller judges that the second bypass FET suffers an open-circuit failure in either one of a case where the voltage (Va) of the load is equal to or smaller than the third threshold value Vth3 in such a state that the first bypass FET is turned on and the first main path FET and the second main path FET are turned off, and another case where the voltage (Vc) at the connection point between the first bypass FET and the second bypass FET is equal to or smaller than the fourth threshold value Vth4, in such a state that the first bypass FET is turned off and the second bypass FET and the first main path FET are turned on while or after the electric storage device is charged by the electric charger circuit,
wherein the controller judges that the first main path FET suffers an open-circuit failure if the voltage (Vd) at the connection point between the first main path FET and the second main path FET is equal to or smaller than the fifth threshold value Vth5 in either one of such a state that the first bypass FET is turned off and the first main path FET is turned on while or after the electric storage device is charged by the electric charger circuit, and such another state that the first main path FET is turned on and the second main path FET is turned off while or after the electric storage device is charged by the electric charger circuit, wherein the controller judges that the second main path FET suffers an open-circuit failure in either one of a case where the voltage (Va) of the load is equal to or smaller than a sixth threshold value Vth6 in such a case that the first bypass FET and the second bypass FET are turned off and the first main path FET and the second main path FET are turned on while or after the electric storage device is charged by the electric charger circuit, and another case where the voltage (Vd) at the connection point between the first main path FET and the second main path FET is equal to or smaller than the seventh threshold value Vth7 in such a state that the first bypass FET and the second main path FET are turned on and the first main path FET is turned off while or after the electric storage device is charged by the electric charger circuit, wherein the controller judges that the first bypass FET suffers a short-circuit failure if the voltage (Vc) at the connection point between the first bypass FET and the second bypass FET is equal to or larger than an eighth threshold value Vth8, in either one of such a state that the first bypass FET and the second bypass FET are turned off, and such another state that the first bypass FET and the first main path FET are turned off, wherein the controller judges that the second bypass FET suffers a short-circuit failure if the voltage (Vc) at the connection point between the first bypass FET and the second bypass FET is equal to or larger than a ninth threshold value Vth9, in such a state that the first bypass FET and the second bypass FET are turned off and the first main path FET is turned on while or after the electric storage device is charged by the electric charger circuit, wherein the controller judges that the first main path FET suffers a short-circuit failure if the voltage (Vd) at the connection point between the first main path FET and the second main path FET is equal to or larger than the tenth threshold value Vth10, in either one of such a state that the first main path FET and the second main path FET are turned off while or after the electric storage device is charged by the electric charger circuit, and such another state that the first bypass FET and the first main path FET are turned off while or after the electric storage device is charged by the electric charger circuit, and wherein the controller judges that the second main path FET suffers a short-circuit failure if the voltage (Vd) at the connection point between the first main path FET and the second main path FET is equal to or larger than the eleventh threshold value Vth11, in such a state that the first bypass FET is turned on and the first main path FET and the second main path FET are turned off.

10. The electrical storage apparatus as claimed in claim 9, wherein each of the first bypass FET, the second bypass FET, the first main path FET and the second main path FET has a voltage drop ($\Delta V$) generated by a parasitic diode in an off state, wherein the controller judges that the first bypass FET suffers an open-circuit failure if the voltage (Va) of the load is equal to or smaller than the first threshold value Vth1, and judges that the second bypass FET suffers an open-circuit failure if the voltage (Va) of the load is equal to or smaller than the third threshold value Vth3, in such a state that the first bypass FET and the second bypass FET are turned on and the first main path FET and the second main path FET are turned off, wherein the controller judges that the first main path FET suffers a short-circuit failure if the voltage (Vd) at the connection point between the first main path FET and the second main path FET is equal to or larger than the tenth threshold value Vth10, and judges that the second main path FET suffers a short-circuit failure if the voltage (Vd) at the connection point is equal to or larger than the eleventh threshold value Vth11, in such a state that the first bypass FET and the second bypass FET are turned on and the first main path FET and the second main path FET are turned off while or after the electric storage device is charged by the electric charger circuit, wherein the controller judges that the first main path FET suffers an open-circuit failure if the voltage (Vd) at the connection point between the first main path FET and the second main path FET is equal to or smaller than the fifth threshold value Vth5, in such a state that the first bypass FET, the second bypass FET and the first main path FET are turned on and the second main path FET is turned off in the case where the voltage (Vb) of the main power supply is equal to or larger than a difference (Vt−$\Delta V$) between the voltage (Vt) of the electric storage device and the voltage drop ($\Delta V$) while or after the electric storage device is charged by the electric charger circuit, wherein the controller judges that the second main path FET suffers an open-circuit failure if the voltage (Vd) at the connection point between the first main path FET and the second main path FET is equal to or smaller than the seventh threshold value Vth7, in such a state that the first bypass FET, the second bypass FET and the second main path FET are turned on and the first main path FET is turned off in the case where the voltage (Vt) of the electric storage device is equal to or larger than the difference (Vb−$\Delta V$) between the voltage (Vb) of the main power supply and the voltage drop ($\Delta V$) while or after the electric storage device is charged by the electric charger circuit, and wherein the controller judges that the first bypass FET suffers a short-circuit failure if the voltage (Vc) at the connection point between the first bypass FET and the second bypass FET is equal to or larger than the eighth threshold value Vth8, and judges that the second bypass FET suffers a short-circuit failure if the voltage (Vc) at the connection point is equal to or larger than the ninth threshold value Vth9 in such a state that the first bypass FET and the second bypass FET are turned off and the first main path FET and the second main path FET are turned on in a case where an absolute value (|Vb−Vt|) of a difference between the voltage (Vb) of the main power supply and the voltage (Vt) of the electric storage device is equal to or smaller than the voltage drop ($\Delta V$) while or after the electric storage device is charged by the electric charger circuit.

11. An electrical storage apparatus connected between a main power supply and a load, the electrical storage apparatus comprising:
a bypass diode connected between the main power supply and the load;
an electric charger circuit connected to the main power supply;
an electric storage device connected to the electric charger circuit;

a first main path FET and a second main path FET which are connected between the electric storage device and the load;

a voltage detector circuit which detects a voltage (Vb) of the main power supply, a voltage (Va) of the load, and a voltage (Vd) at a connection point between the first main path FET and the second main path FET; and a controller connected to the first main path FET, the second main path FET, the electric charger circuit and the voltage detector circuit, wherein the bypass diode has an anode connected to the main power supply and a cathode connected to the load, wherein the controller judges that the bypass diode suffers an open-circuit failure if the voltage (Va) of the load is equal to or smaller than a third threshold value Vth3, in such a state that the first main path FET and the second main path FET are turned off, wherein the controller judges that the first main path FET suffers an open-circuit failure if the voltage (Vd) at the connection point between the first main path FET and the second main path FET is equal to or smaller than a fifth threshold value Vth5, in such a state that the first main path FET is turned on and the second main path FET is turned off while or after the electric storage device is charged by the electric charger circuit, wherein the controller judges that the second main path FET suffers an open-circuit failure if the voltage (Vd) at the connection point between the first main path FET and the second main path FET is equal to or smaller than a seventh threshold value Vth7, in such a state that the second main path FET is turned on and the first main path FET is turned off while or after the electric storage device is charged by the electric charger circuit, wherein the controller judges that the bypass diode suffers a short-circuit failure if a difference between the voltage (Vb) of the main power supply and the voltage (Va) of the load is equal to or smaller than a twelfth threshold value Vth12, in such a state that the first main path FET and the second main path FET are turned off, wherein the controller judges that the first main path FET suffers a short-circuit failure if the voltage (Vd) at the connection point between the first main path FET and the second main path FET is equal to or larger than a tenth threshold value Vth10, in such a state that the first main path FET and the second main path FET are turned off while or after the electric storage device is charged by the electric charger circuit, and wherein the controller judges that the second main path FET suffers a short-circuit failure if the voltage (Vd) at the connection point between the first main path FET and the second main path FET is equal to or larger than an eleventh threshold value Vth11, in such a state that the first main path FET and the second main path FET are turned off.

12. The electrical storage apparatus as claimed in claim 11, wherein each of the first main path FET and the second main path FET has a voltage drop ($\Delta V$) generated by a parasitic diode in an off state, and the bypass diode has the voltage drop ($\Delta V$), wherein the controller judges that the bypass diode suffers an open-circuit failure if the voltage (Va) of the load is equal to or smaller than the third threshold value Vth3, in such a state that the first main path FET and the second main path FET are turned off, wherein the controller judges that the bypass diode suffers a short-circuit failure if the difference between the voltage (Vb) of the main power supply and the voltage (Va) of the load is equal to or smaller than the twelfth threshold value Vth12, in such a state that the first main path FET and the second main path FET are turned off, wherein the controller judges that the first main path FET suffers a short-circuit failure if the voltage (Vd) at the connection point between the first main path FET and the second main path FET is equal to or larger than the tenth threshold value Vth10, and judges that the second main path FET suffers a short-circuit failure if the voltage (Vd) at the connection point is equal to or larger than the eleventh threshold value Vth11, in such a state that the first main path FET and the second main path FET are turned off while or after the electric storage device is charged by the electric charger circuit, wherein the controller judges that the first main path FET suffers an open-circuit failure if the voltage (Vd) at the connection point between the first main path FET and the second main path FET is equal to or smaller than the fifth threshold value Vth5, in such a state that the first main path FET is turned on and the second main path FET is turned off in a case where the voltage (Vt) of the electric storage device is equal to or larger than a difference (Vt−$\Delta V$×2) between the voltage (Vb) of the main power supply and the voltage drop ($\Delta V$) due to the parasitic diode and the bypass diode while or after the electric storage device is charged by the electric charger circuit, and wherein the controller judges that the second main path FET suffers an open-circuit failure if the voltage (Vd) at the connection point between the first main path FET and the second main path FET is equal to or smaller than the seventh threshold value Vth7, in such a state that the second main path FET is turned on and the first main path FET is turned off while or after the electric storage device is charged by the electric charger circuit.

13. The electrical storage apparatus as claimed in claim 9, wherein the controller makes a judgment of the open-circuit failure of either one of the first bypass FET and the second bypass FET after startup of the electrical storage apparatus, thereafter makes a judgment of the short-circuit failure of the second bypass FET and failure judgments of the devices other than the first bypass FET and the second bypass FET after the electric storage device is charged and operates to turn off the first bypass FET and the second bypass FET and to turn on the first main path FET upon making a judgment of the short-circuit failure of the first bypass FET.

14. The electrical storage apparatus as claimed in claim 1, wherein the controller makes a judgment of the open-circuit failure of either one of the first bypass FET and the bypass diode after startup of the electrical storage apparatus, thereafter makes a judgment of the short-circuit failure of the bypass diode and failure judgments of the devices other than the first bypass FET and the bypass diode after the electric storage device is charged and operates to turn on the first main path FET upon making a judgment of the short-circuit failure of the first bypass FET.

15. The electrical storage apparatus as claimed in claim 5, wherein the controller makes a judgment of the open-circuit failure of either one of the first bypass FET and the bypass diode after startup of the electrical storage apparatus, thereafter makes a judgment of the short-circuit failure of the bypass diode and failure judgments of the devices other than the first bypass FET and the bypass diode after the electric storage device is charged and operates to turn on the first main path FET upon making a judgment of the short-circuit failure of the first bypass FET.

16. The electrical storage apparatus as claimed in claim 7, wherein the controller makes a judgment of the open-circuit failure of the second bypass FET after startup of the electrical storage apparatus, thereafter makes a judgment of the short-circuit failure of the second bypass FET and failure judgments of devices other than the second bypass FET after the electric storage device is charged.

17. The electrical storage apparatus as claimed in claim 9, wherein the controller outputs a failure signal upon making a judgment of any failure.

18. The electrical storage apparatus as claimed in claim 9, wherein the controller makes a failure judgment after ending use and stores a failure judgment result into a built-in memory of the controller.

19. The electrical storage apparatus as claimed in claim 18, wherein the controller transmits a signal that represents the failure judgment result to an external control circuit after the startup of the electrical storage apparatus.

20. The electrical storage apparatus as claimed in claim 18, wherein the power of the electric storage device is discharged after the failure judgment.

21. The electrical storage apparatus as claimed in claim 9, wherein the controller makes a failure judgment after ending use and transmits a signal that represents its result to an external control circuit.

22. The electrical storage apparatus as claimed in claim 21, wherein the external control circuit is driven by the power of the electric storage device when the signal that represents the failure judgment is transmitted to the external control circuit.

\* \* \* \* \*